(12) United States Patent
Volta et al.

(10) Patent No.: US 10,496,858 B2
(45) Date of Patent: Dec. 3, 2019

(54) CODED IMAGE CAPTURE SYSTEM OF COMPONENTS AND POWER PROVISIONING THEREFOR

(71) Applicant: Datalogic IP Tech S.r.l., Bologna (IT)

(72) Inventors: Valentina Volta, Bologna (IT); Claudio Mazzone, Bologna (IT); Marco Pifferi, Predosa (IT)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 15/946,776

(22) Filed: Apr. 6, 2018

(65) Prior Publication Data

US 2018/0293412 A1    Oct. 11, 2018

Related U.S. Application Data

(63) Continuation-in-part of application No. 15/481,621, filed on Apr. 7, 2017, now Pat. No. 10,025,966.

(51) Int. Cl.
*G06K 7/10* (2006.01)
*G07G 1/00* (2006.01)
(Continued)

(52) U.S. Cl.
CPC ..... *G06K 7/10158* (2013.01); *G06K 7/10217* (2013.01); *G06K 7/10712* (2013.01); *G06K 7/10881* (2013.01); *G07G 1/009* (2013.01); *G07G 1/0045* (2013.01); *H02J 7/0052* (2013.01); *H02J 7/025* (2013.01); *H02J 50/10* (2016.02); *G06K 7/0004* (2013.01)

(58) Field of Classification Search
USPC .................................................. 235/462.45
See application file for complete search history.

(56) References Cited

U.S. PATENT DOCUMENTS 5,070,293 A    12/1991    Ishii et al.
7,683,572 B2    3/2010    Toya
(Continued)

FOREIGN PATENT DOCUMENTS

| CN | 2044331741 U | 5/2015 |
|---|---|---|
| CN | 205581887 U | 9/2016 |
| WO | 2014161083 A1 | 10/2014 |

OTHER PUBLICATIONS

ISR and Written Opinion for PCT/EP2018/058934 dated Aug. 2, 2018 (16 pages).
(Continued)

*Primary Examiner* — Daniel A Hess
(74) *Attorney, Agent, or Firm* — The Juhasz Law Firm

(57) ABSTRACT

A reader includes a scanning head that comprises an optical sensor to capture an indicia that encodes data and a processor to interpret the indicia to decode the data, and an elongate handle connected at a first end to the scanning head and graspable to orient the optical sensor toward the indicia. A selected one of the scanning head and the elongate handle includes: a first receiving coil; a second receiving coil; a battery to provide electric power to the processor and the optical sensor; and a power receiving circuit coupled to the first and second receiving coils in series, and configured to operate the first and second receiving coils together to wirelessly receive electric power to charge the battery.

29 Claims, 37 Drawing Sheets

(51) Int. Cl.
*H02J 7/00* (2006.01)
*H02J 50/10* (2016.01)
*H02J 7/02* (2016.01)
*G06K 7/00* (2006.01)

(56) References Cited

U.S. PATENT DOCUMENTS

| | | |
|---|---|---|
| 9,087,251 B2 | 7/2015 | Tamburrini et al. |
| 9,172,268 B2 | 10/2015 | Chang et al. |
| 9,478,113 B2 | 10/2016 | Xie et al. |
| 9,515,512 B2 | 12/2016 | O'Donnell et al. |
| 10,025,966 B1 * | 7/2018 | Volta ............ G06K 7/10217 |
| 2015/0379838 A1 | 12/2015 | Xie et al. |
| 2016/0285319 A1 | 9/2016 | Maniktala |
| 2016/0350563 A1 | 12/2016 | Ye et al. |
| 2018/0013310 A1 | 1/2018 | Moussaoui et al. |

OTHER PUBLICATIONS

Effect of Coupling Between Multiple Transmitters or Multiple Receivers on Wireless Power Transfer, Dukju Ahn and Songcheol Hong, IEEE Trans. on Industrial Electronics, vol. 60, No. 7, Jul. 2013, 12 pages.
Optimal Coil Size Ratios for Wireless Power Transfer Applications, Benjamin Waters, Brody J. Mahoney, Gunbok Lee and Joshua Smith, 2014 IEEE Int'l Symposium on Circuits and Systems (ISCAS), 4 pages.

* cited by examiner

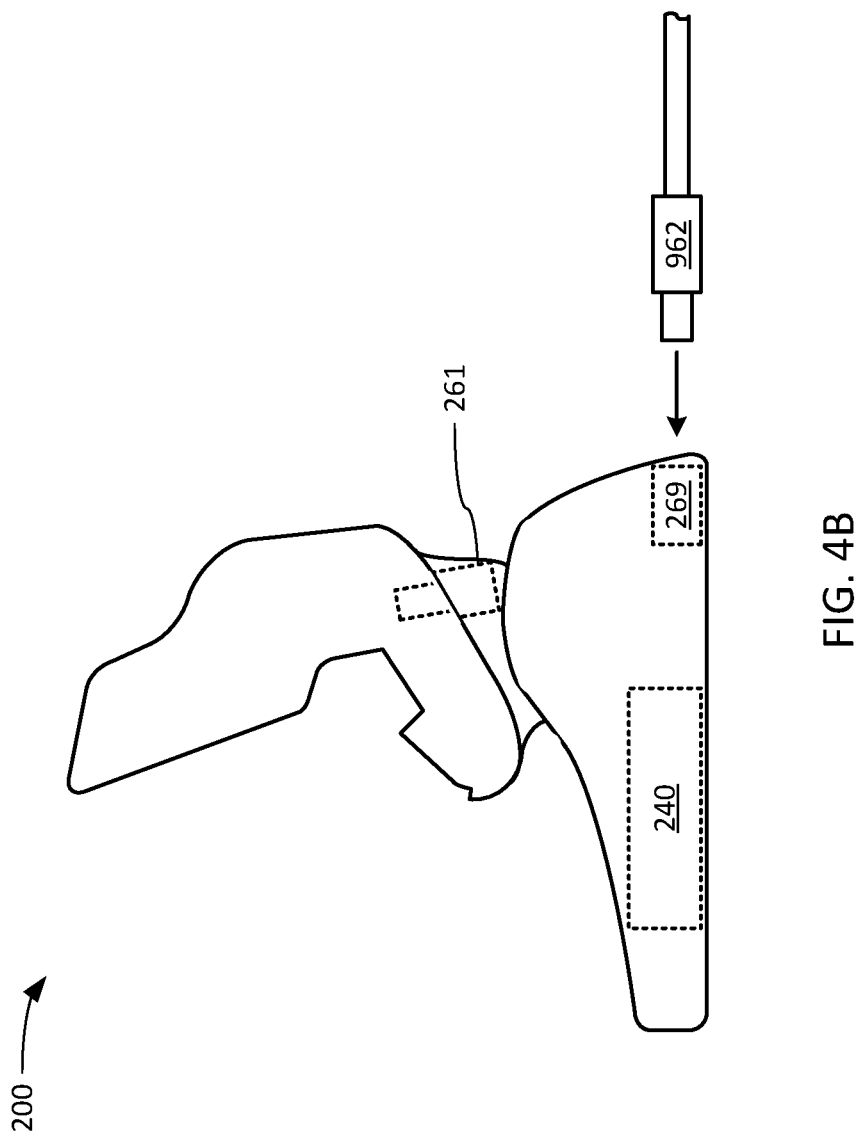

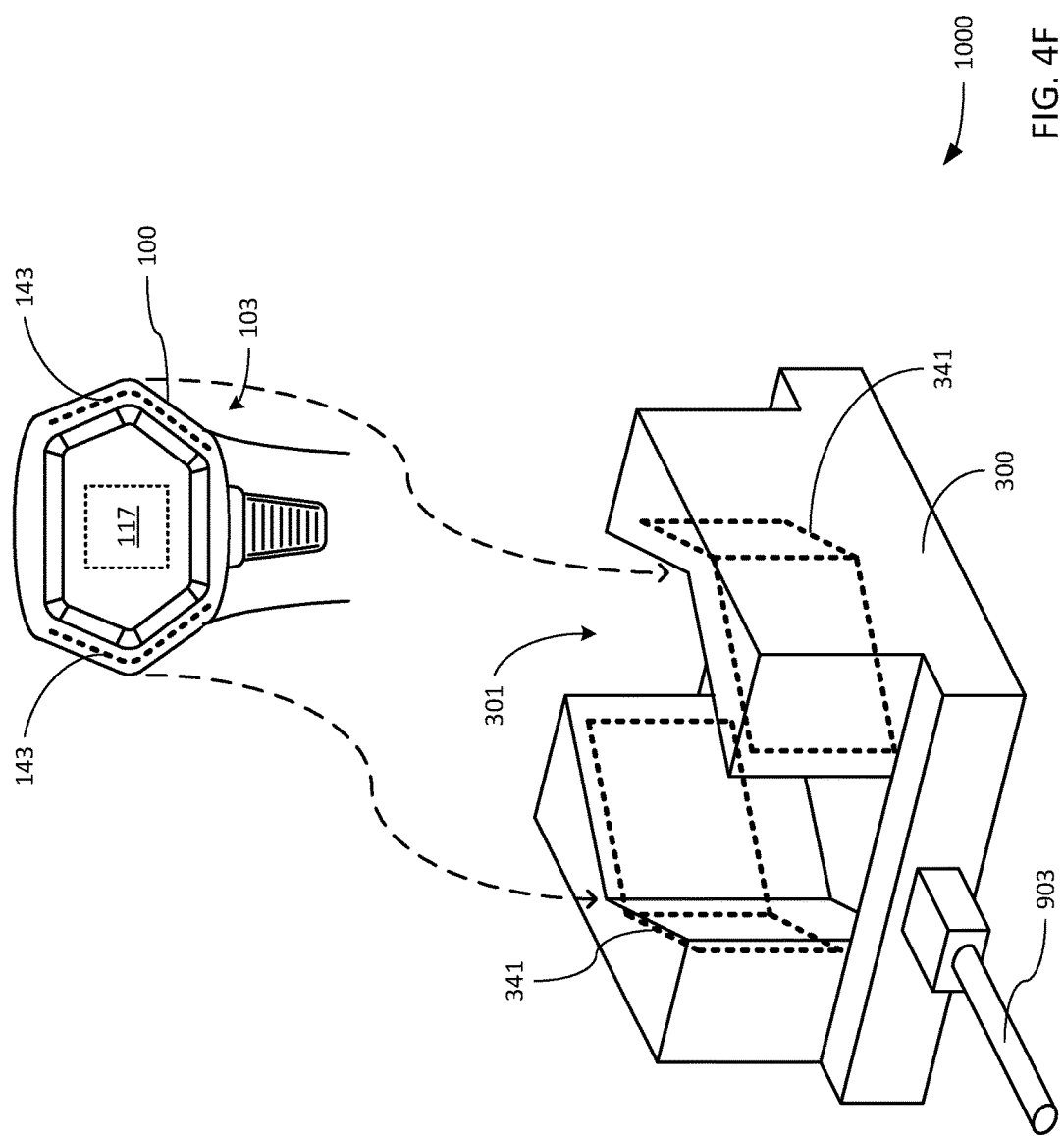

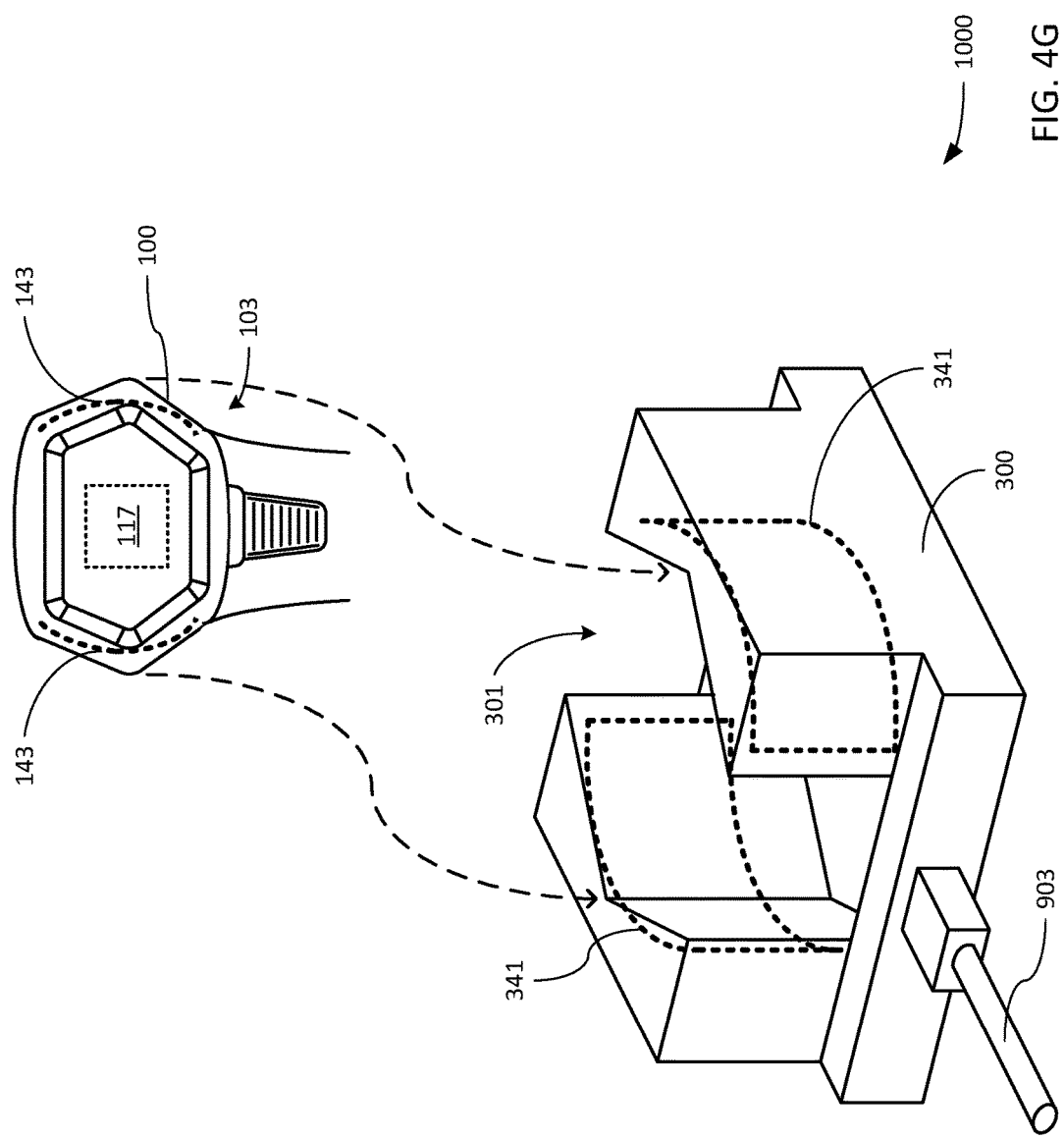

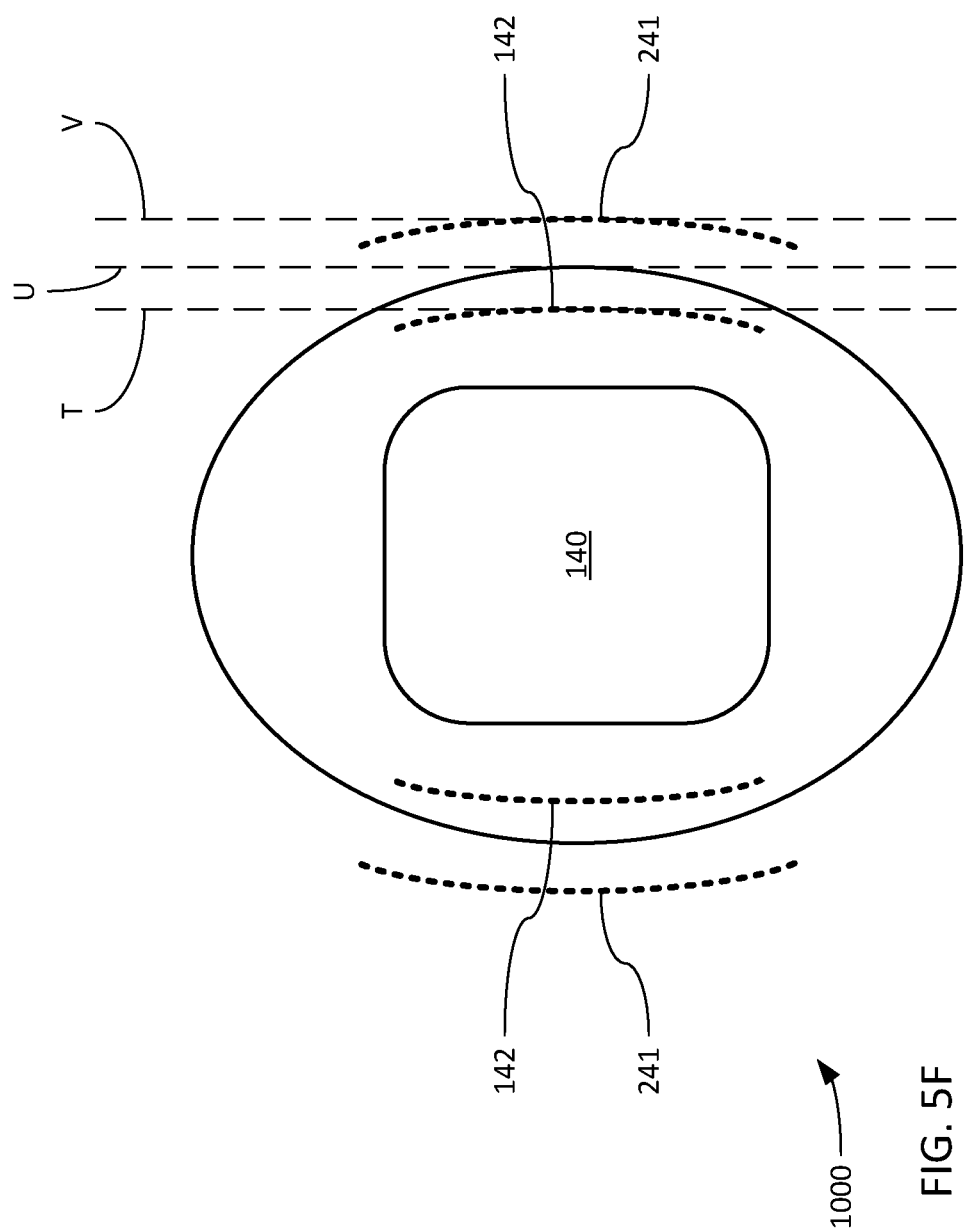

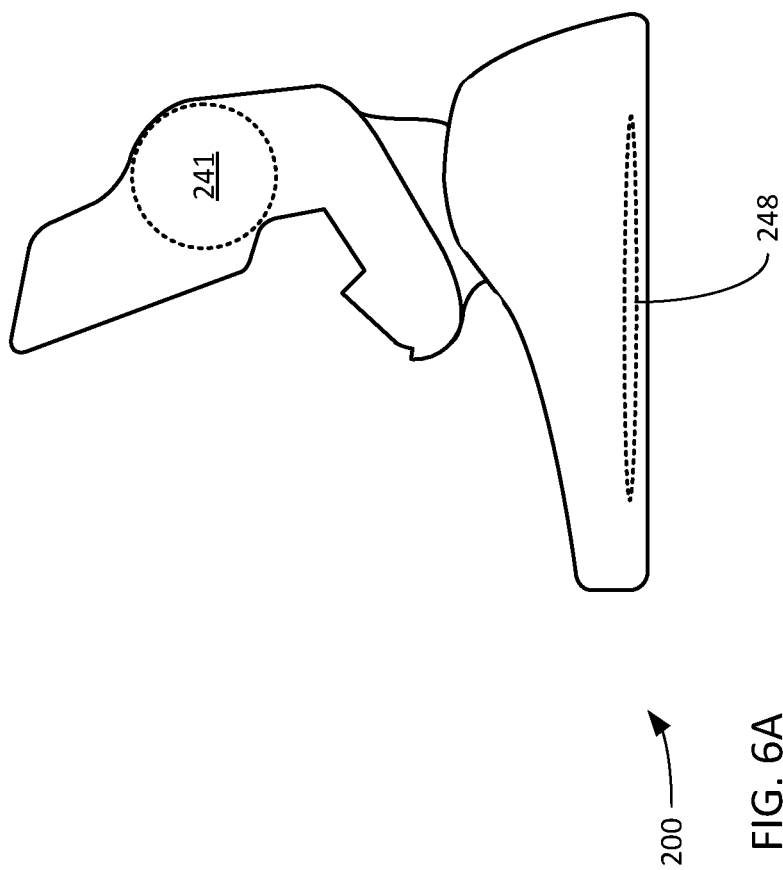

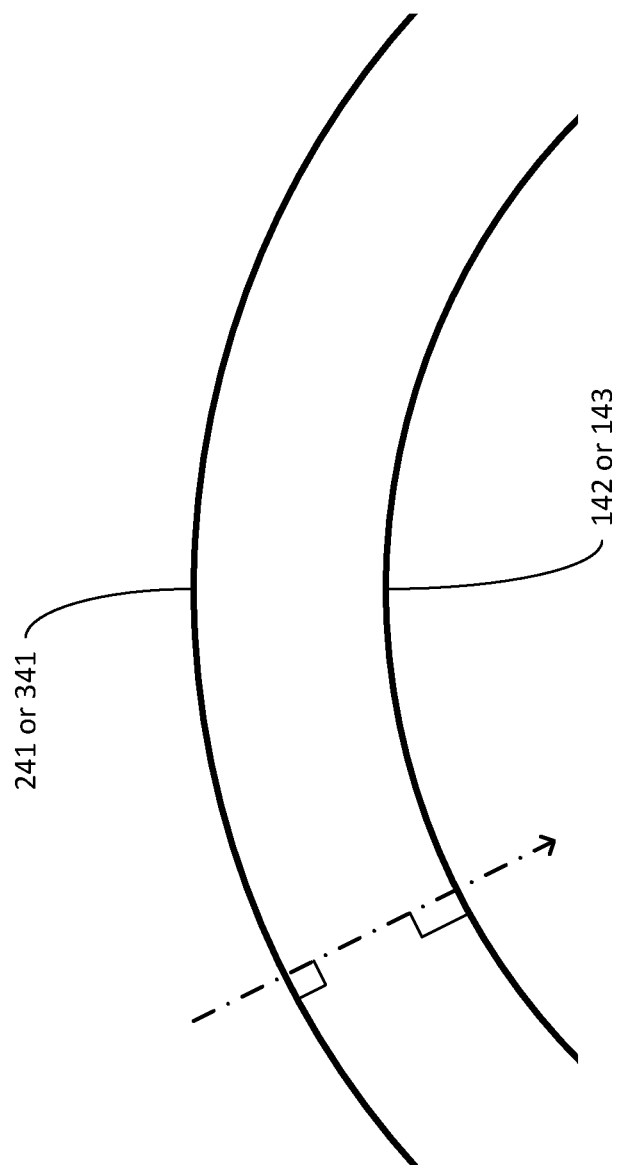

US 10,496,858 B2

CODED IMAGE CAPTURE SYSTEM OF COMPONENTS AND POWER PROVISIONING THEREFOR

RELATED APPLICATIONS

This application is a continuation-in-part of U.S. patent application Ser. No. 15/481,621, filed on Apr. 7, 2017, which is hereby incorporated by reference in its entirety.

BACKGROUND OF THE INVENTION

1. Field of the Invention

The present invention relates to devices for wirelessly capturing encoded data.

2. Description of the Related Art

Handheld scanning devices are well known and used in a wide range of enterprise applications. Barcode scanners are regularly used in connection with checkout stations at supermarkets and other retail establishments for reading barcodes on consumer goods. They are also useful in inventory collection and control for warehousing, shipping and storage of products.

The conditions under which such handheld scanning devices are used can vary greatly from location to location, and industry to industry. Purveyors of such handheld scanning devices have long sought to provide a widely varied product line of differing configurations having different physical attributes, as well as different approaches to the provision of electric power and communicating scanned data to other devices. Such wide ranging product lines also tend to include a wide assortment of accessories that may be specific to differing ones of such configurations. The intention of these purveyors is to enable a business to select the particular configuration of handheld scanning device that most easily fits in the working environments of their places of business.

However, such ongoing provision of numerous physical, electrical and/or communications configuration, and associated accessories, can quickly become unwieldy for both a purveyor to cost-effectively provide and for their customers to choose from. These problems are rapidly compounded as each new innovation that necessitates a change in the design of such handheld scanning devices causes the design, manufacture and offering of more sets of physical, electrical and/or communications configurations, as well as more sets of associated accessories.

Additionally, many of such new innovations include the shrinkage in physical size of various internal components, thereby providing opportunities to make handheld scanning devices ever lighter and smaller. In addition to adding to the changes in physical design that must somehow be accommodated, such ongoing reductions in physical size of handheld scanning devices makes the use of wireless transmission of electric power to handheld scanning devices ever more challenging.

Thus, a system of handheld scanner components of reduced variety and increased flexibility is needed.

SUMMARY OF THE INVENTION

Technologies are described for optical barcode scanning devices, and in particular to a system of a reduced variety of components that enables the provision of multiple useful configurations.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle, a second handle receiving coil disposed at the second end, and oriented parallel to a second side of the elongate handle that is opposite the first side of the elongate handle, and a battery to provide electric power to the processor and the optical sensor, and configured to be recharged via the first and second handle receiving coils.

A scanning system may include a reader, a charging cradle and a presentation base. The reader may include a scanning head that includes a head receiving coil, an optical sensor to capture an indicia that encodes data, and a processor to interpret the indicia to decode the data. The reader may also include an elongate handle connected at a first end to the scanning head and graspable to orient the optical sensor toward the indicia. The elongate handle may include a handle electrical connector disposed at a second end of the elongate handle opposite the first end, and a first battery to provide electric power to the processor and the optical sensor, wherein the first battery may be configured to be recharged via the head receiving coil or the handle electrical connector. The charging cradle may be configured to receive the scanning head, and may include a cradle transmitting coil configured to wirelessly transmit electric power to the head receiving coil when the scanning head is received in the charging cradle, and a cradle electrical connector to receive the electric power transmitted by the cradle transmitting coil. The presentation base may be configured to be releasably connected to the second end of the elongate handle. When the base is connected to the second end, the presentation base may be configured to support the reader atop a first support surface in a presentation scanning mode, and the presentation base may be configured to engage a second support surface atop which the charging cradle is also supported to orient the head receiving coil into parallel alignment with the cradle transmitting coil to enable charging of the first battery via the cradle transmitting coil.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first side that extends at least partially between the first end and a second end of the handle that is opposite the first end, and that has a first tangent plane that extends tangent to the first side; a second side that extends at least partially between the first and second ends, that is distinct from the first side, and that has a second tangent plane that extends tangent to the second side; a first handle receiving coil, wherein at least a portion of the first handle receiving coil is configured to extend in a third plane parallel to the first tangent plane; a second handle receiving coil, wherein at least a portion of the second handle receiving coil is configured to extend in a fourth plane parallel to the second tangent plane; a battery to provide electric power to the processor and the optical sensor; and a handle power receiving circuit coupled to the first and second handle receiving coils in series, and configured to operate the first and second handle receiving coils together to wirelessly receive electric power to charge the battery.

A scanning system may include a reader and a base. The reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil, wherein at least a portion of the first handle receiving coil is configured to extend at least partially in a third plane; a second handle receiving coil, wherein at least a portion of the second handle receiving coil is configured to extend at least partially in a fourth plane; a battery to provide electric power to the processor and the optical sensor; and a handle power receiving circuit coupled to the first and second handle receiving coils in series, and configured to operate the first and second handle receiving coils together to wirelessly receive electric power to charge the battery. The base may be configured to be releasably connected to a second end of the elongate handle opposite the first end. The base may include a first base transmitting coil configured to extend at least partially in parallel to the third plane when the base is releasably connected to the second end of the elongate handle; a second base transmitting coil configured to extend at least partially in parallel to the fourth plane when the base is releasably connected to the second end of the elongate handle; and a base power transmitting circuit coupled to the first and second base transmitting coils in series, and configured to operate the first and second base transmitting coils to transmit electric power to the first and second handle receiving coils, respectively, when the base is releasably connected to the second end of the elongate handle.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. A selected one of the scanning head and the elongate handle may include a first receiving coil; a second receiving coil; a battery to provide electric power to the processor and the optical sensor; and a power receiving circuit coupled to the first and second receiving coils in series, and configured to operate the first and second receiving coils together to wirelessly receive electric power to charge the battery.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle; a second handle receiving coil disposed at the second end, and oriented parallel to a second side of the elongate handle that is opposite the first side of the elongate handle; and a battery to provide electric power to the processor and the optical sensor, and configured to be recharged via the first and second handle receiving coils. The second end may be configured to be releasably connected to a presentation base. The presentation base may include a first base transmitting coil configured to be oriented parallel to the first handle receiving coil and to transmit electric power to the first handle receiving coil when the presentation base is releasably connected to the second end of the elongate handle; and a second base transmitting coil configured to be oriented parallel to the second handle receiving coil and to transmit electric power to the second handle receiving coil when the presentation base is releasably connected to the second end of the elongate handle.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a battery to provide electric power to the processor and the optical sensor. The scanning head may include a first side that has a first tangent plane that extends tangent to the first side; a second side that is distinct from the first side, and that has a second tangent plane that extends tangent to the second side; a first head receiving coil, wherein at least a portion of the first head receiving coil is configured to extend in a third plane parallel to the first tangent plane; a second head receiving coil, wherein at least a portion of the second head receiving coil is configured to extend in a fourth plane parallel to the second tangent plane; and a handle power receiving circuit coupled to the first and second head receiving coils in series, and configured to operate the first and second head receiving coils together to wirelessly receive electric power to charge the battery.

BRIEF DESCRIPTION OF THE DRAWINGS

FIGS. 4A, 4B, 4C, 4D, 4E, 4F and 4G, collectively referred to herein as FIG. 4, are depictions of various embodiments of a second handheld scanning device configuration of the system of FIG. 1.

FIGS. 5A, 5B, 5C, 5D, 5E, 5F, 5G and 5H, collectively referred to herein as FIG. 5, are depictions of various embodiments of a third handheld scanning device configuration of the system of FIG. 1.

FIGS. 6A, 6B and 6C, collectively referred to herein as FIG. 6, are depictions of a fourth handheld scanning device configuration of the system of FIG. 1.

FIGS. 8A, 8B, 8C, 8D and 8E, collectively referred to herein as FIG. 7, show aspects of serial coupling of coils, and of coils with portions extending in two intersecting planes.

DETAILED DESCRIPTION OF THE INVENTION

Figure 1A:
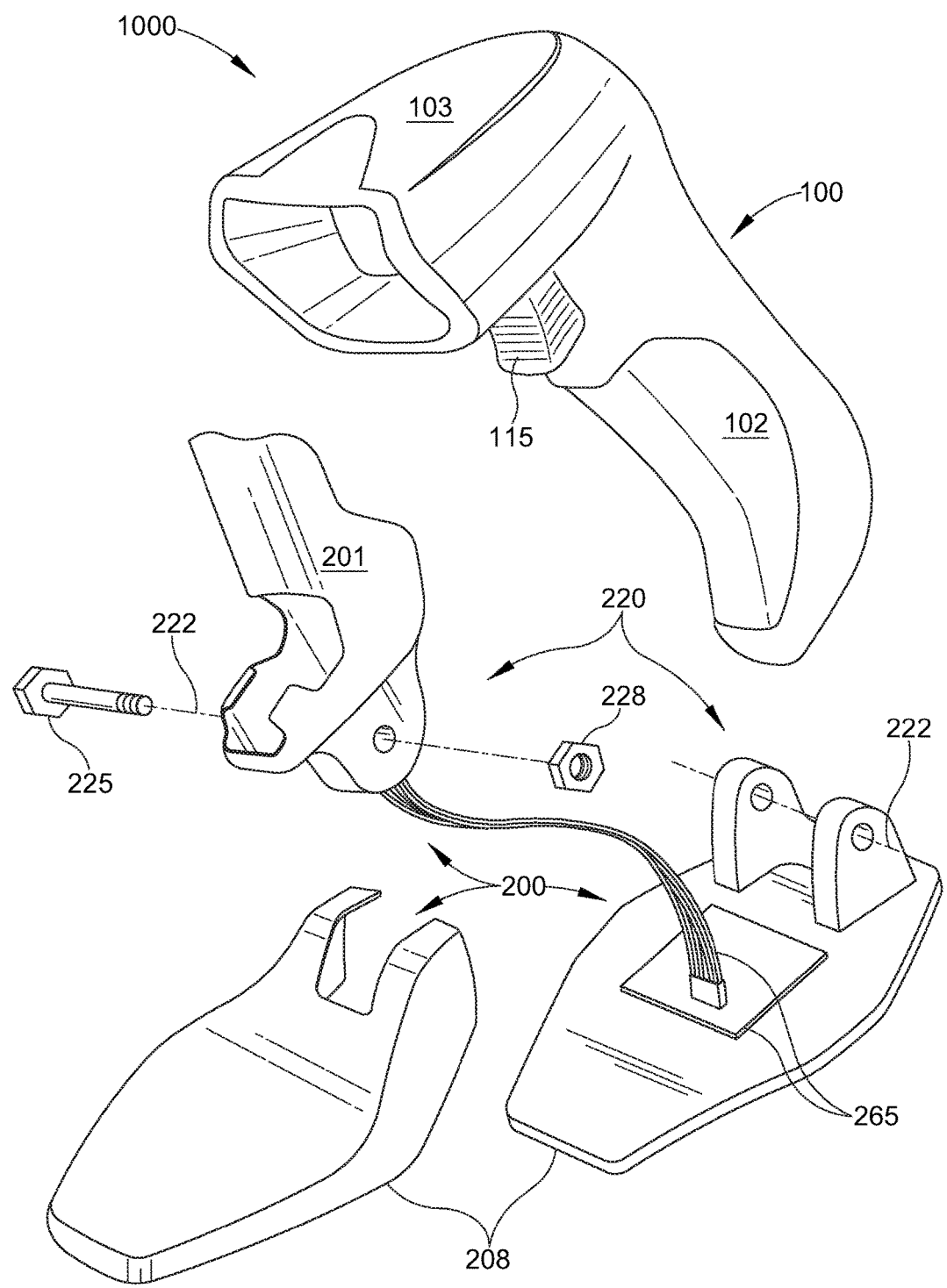
FIGS. 1A, 1B and 1C, collectively referred to herein as FIG. 1, show aspects of a system of handheld scanner components.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a reader to wirelessly collect data and that is wirelessly rechargeable. Generally, the reader includes a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle, a second handle receiving coil disposed at the second end, and oriented parallel to a second side of the elongate handle that is opposite the first side of the elongate handle, and a battery to provide electric power to the processor and the optical sensor, and configured to be recharged via the first and second handle receiving coils.

Alternatively, the reader includes a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first side that extends at least partially between the first end and a second end of the handle that is opposite the first end, and that has a first tangent plane that extends tangent to the first side; a second side that extends at least partially between the first and second ends, that is distinct from the first side, and that has a second tangent plane that extends tangent to the second side; a first handle receiving coil, wherein at least a portion of the first handle receiving coil is configured to extend in a third plane parallel to the first tangent plane; a second handle receiving coil, wherein at least a portion of the second handle receiving coil is configured to extend in a fourth plane parallel to the second tangent plane; a battery to provide electric power to the processor and the optical sensor; and a handle power receiving circuit coupled to the first and second handle receiving coils in series, and configured to operate the first and second handle receiving coils together to wirelessly receive electric power to charge the battery.

Alternatively, the reader includes a scanning head that includes an optical sensor to capture an indicia that encodes data and a processor to interpret the indicia to decode the data, and an elongate handle connected at a first end to the scanning head and graspable to orient the optical sensor toward the indicia. A selected one of the scanning head and the elongate handle may include a first receiving coil; a second receiving coil; a battery to provide electric power to the processor and the optical sensor; and a power receiving circuit coupled to the first and second receiving coils in series, and configured to operate the first and second receiving coils together to wirelessly receive electric power to charge the battery.

Alternatively, the reader includes a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle; a second handle receiving coil disposed at the second end, and oriented parallel to a second side of the elongate handle that is opposite the first side of the elongate handle; and a battery to provide electric power to the processor and the optical sensor, and configured to be recharged via the first and second handle receiving coils. The second end may be configured to be releasably connected to a presentation base. The presentation base may include a first base transmitting coil configured to be oriented parallel to the first handle receiving coil and to transmit electric power to the first handle receiving coil when the presentation base is releasably connected to the second end of the elongate handle; and a second base transmitting coil configured to be oriented parallel to the second handle receiving coil and to transmit electric power to the second handle receiving coil when the presentation base is releasably connected to the second end of the elongate handle.

Alternatively, the reader includes a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a battery to provide electric power to the processor and the optical sensor. The scanning head may include a first side that has a first tangent plane that extends tangent to the first side; a second side that is distinct from the first side, and that has a second tangent plane that extends tangent to the second side; a first head receiving coil, wherein at least a portion of the first head receiving coil is configured to extend in a third plane parallel to the first tangent plane; a second head receiving coil, wherein at least a portion of the second head receiving coil is configured to extend in a fourth plane parallel to the second tangent plane; and a handle power receiving circuit coupled to the first and second head receiving coils in series, and configured to operate the first and second head receiving coils together to wirelessly receive electric power to charge the battery.

FIG. 1 depicts aspects of an example embodiment of a system 1000 of handheld scanner components 100, 200, 300 and/or 800 that may be assembled and/or otherwise used together in various ways to provide various physical, electrical and/or communications configurations of a handheld scanning device. Turning more specifically to FIG. 1A, an exploded perspective view is provided of a combination of a reader 100 and a presentation base 200 of the system 1000. As will be described in greater detail, the reader 100 includes a scanning head 103 and an elongate handle 102 connected at one end to the scanning head 103. The reader 100 may be used independently from the presentation base 200 and/or the other components 300 and 800 as a "mobile scanner" having an entirely handheld gun-like physical configuration for being easily carried to various locations and/or used in relatively tight spaces to capture images in which data is encoded, such as one-dimensional and/or two-dimensional barcodes.

Figure 1B:
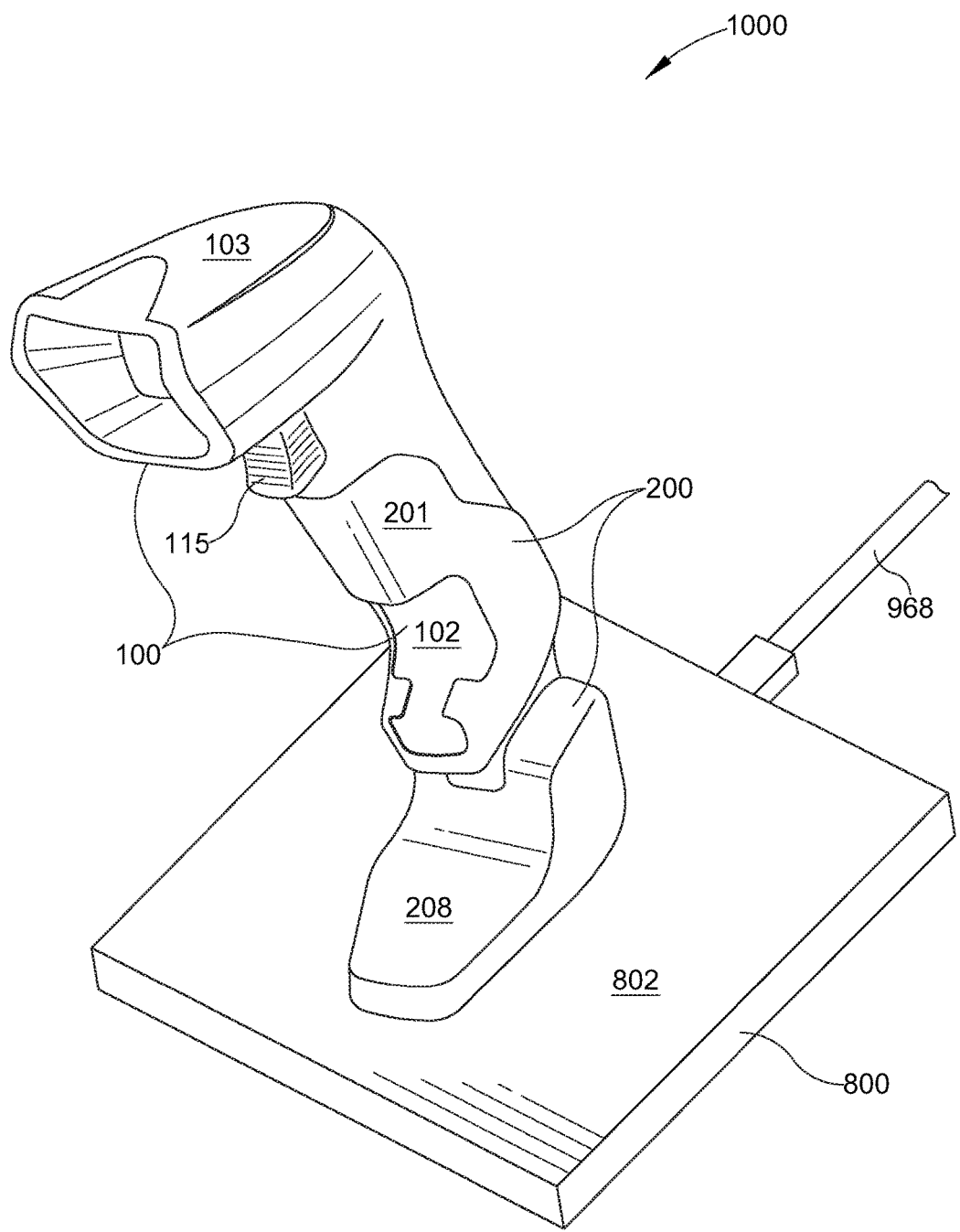

However, and turning more specifically to FIG. 1B, the upper portion 201 of the presentation base 200 is configured to receive and releasably retain a portion of an end of the elongate handle 102 of the reader 100, thereby enabling the reader 100 to also be used in conjunction with the presentation base 200 as a "presentation scanner." When used in this manner, the reader 100 may be kept in a relatively stationary position supported by the presentation base 200 atop a support surface (e.g., a table top, a counter top, or other substantially horizontal support surface). As depicted, the presentation base 200 may be of relatively compact shape and size such that it may not be deemed too encumbering to use the reader 100 in a physical configuration of mobile scanner in which the presentation base 200 is allowed to remain connected to the elongate handle 102 of the reader 100. More precisely, the presentation base 200 may be said to cooperate with the elongate handle 102 of the reader in a manner akin to adding a "foot" to one end of the elongate handle 102 that enables the reader 100 to remain supported in an upright orientation atop a support surface, while not being so large as to tend to encourage personnel to detach the presentation base 200 from the elongate handle 102 at times when the reader 100 is used as a mobile scanner.

Any of a variety of mechanical mechanisms may be employed to releasably retain the elongate handle 102 of the reader 100 within the upper portion 201 of the presentation base 200. By way of example, the elongate handle 102 may be releasably retained within upper portion 201 through use of friction between external surfaces of the elongate handle 102 and interior surfaces of the upper portion 201.

As also depicted, the support surface atop which the reader 100 may be supported, through the presentation base 200, may be a charging pad 800 of the system 1000. As will be explained in greater detail, the charging pad 800 may employ an electromagnetic field to wirelessly convey electric power to the presentation base 200, which in turn, may relay the electric power it wirelessly receives from the charging pad 800 onward to the reader 100 to recharge the reader 100. The ability to so provide electric power to the reader 100 from the charging pad 800 and through the presentation base 200 advantageously allows the reader 100 to be both recharged and used in the physical configuration of a presentation scanner at the same time. Additionally, the fact that the combination of the reader 100 and the presentation base 200 is simply physically supported atop the charging pad 800 without being connected thereto by any form of electrical and/or retentive mechanical connection, and the fact of the relatively compact size of the presentation base 200, may both serve to make easier the occasional use of the reader 100 as a mobile scanner with the presentation base 200 still attached Returning more specifically to FIG. 1A, as depicted in the exploded perspective view, the upper portion 201 and the lower portion 208 of the presentation base 200 may be connected by a hinge portion 220 that enables the upper portion 201 to rotate to some degree relative to the lower portion 208 about a pivot axis 222. In some embodiments, and as also depicted, the hinge portion 220 may include a combination of a bolt 225 and corresponding nut 228 that may cooperate with aligned holes defined by the upper portion 201 and the lower portion 208 to define the pivot axis 222. However, as will be readily recognizable to those skilled in the art, the hinge portion 220 may be formed from any of a variety of hardware components that may be carried by the upper portion 208 and the lower power 201, and that may interact in any of a variety of ways to enable rotation of the upper portion 208 relative to the lower portion 201. With the elongate handle 102 of the reader 100 inserted and releasably retained within the upper portion 201 of the base 200, the inclusion of the hinge portion 220 interposed between the upper portion 201 and the lower portion 208 enables some degree of pivoting of the reader 100 relative to a support surface atop which the reader 100 may be supported through the presentation base 200.

Figure 1C:
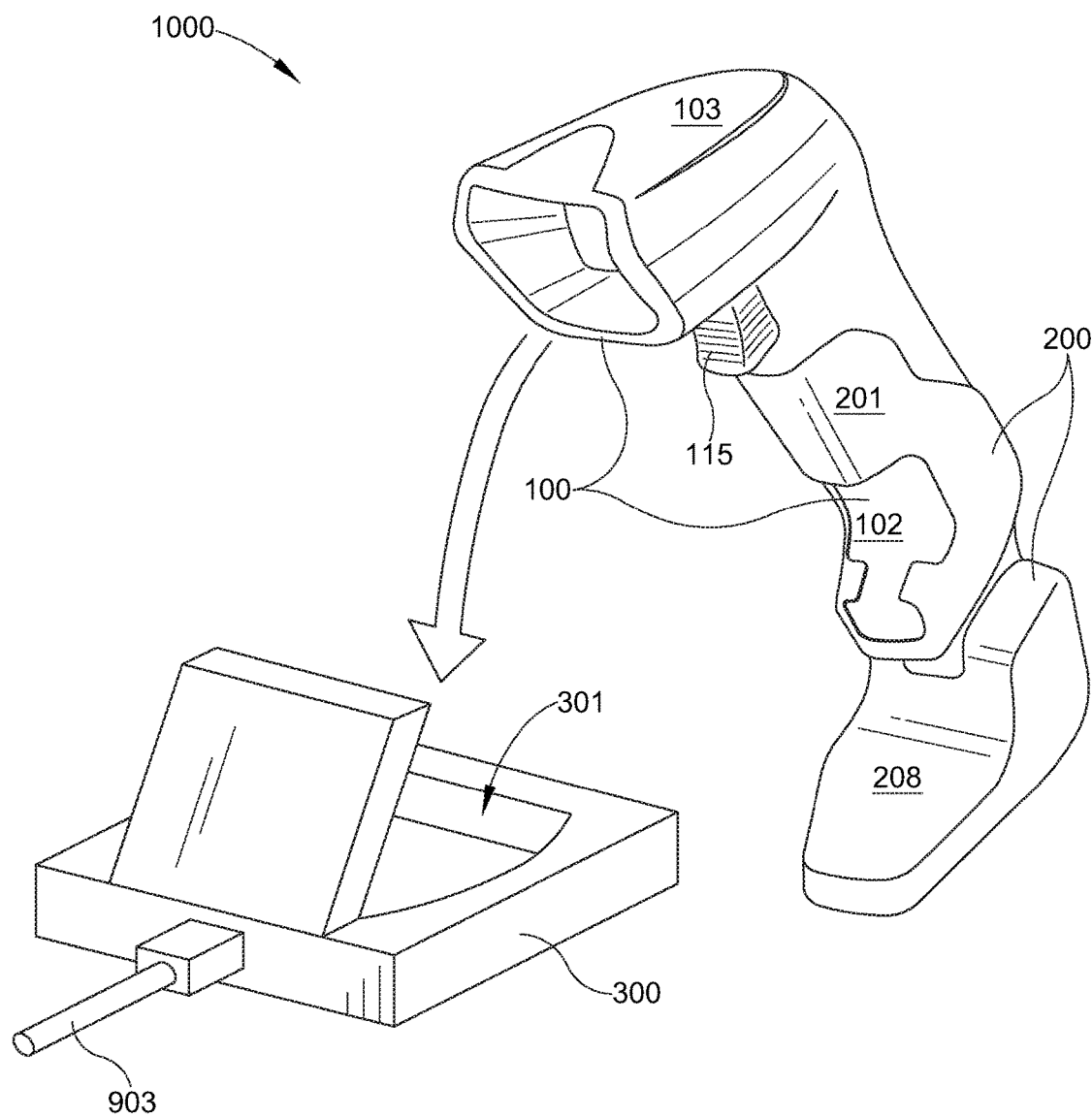

Turning more specifically to FIG. 1C, as an alternative to use of the charging pad 800 to recharge the reader 100 while supported in an upright orientation atop the charging pad 800 by the presentation base 200, the reader 100 may also be charged by insertion of the scanning head 103 into a receptacle 301 of a charging cradle 300 of the system 1000. The receptacle 301 of the charging cradle 301 may be configured to retain a portion of the scanning head 103 therein through use of a friction fit or other mechanism, and this may allow the charging cradle to advantageously be mounted to a wall or other vertical surface to thereby allow the reader 100 to be recharged at a location that does not occupy value table top, counter top or other substantially horizontal surfaces that may be of great value for other uses.

FIG. 2 depicts aspects of an example embodiment of an internal architecture that may be employed among the components 100, 200, 300 and/or 800 of the system 1000 of FIG. 1. More specifically, FIG. 2A provides a block diagram of an embodiment of an internal architecture of the reader 100, focusing more on the decoding and transmitting of data. FIG. 2B provides a block diagram of various paths by which data may be conveyed from the reader 100 and to a point-of-sale (POS) device 900 (e.g., cash registers, checkout devices, credit card readers, etc.). FIG. 2C provides a block diagram of various ways in which electric power may be conveyed from a power source (e.g., the POS device 900), and through different one(s) of the charging cradle 300, the presentation base 200 and/or the charging pad 800 to recharge a battery 140 of the reader 100.

Figure 2A:
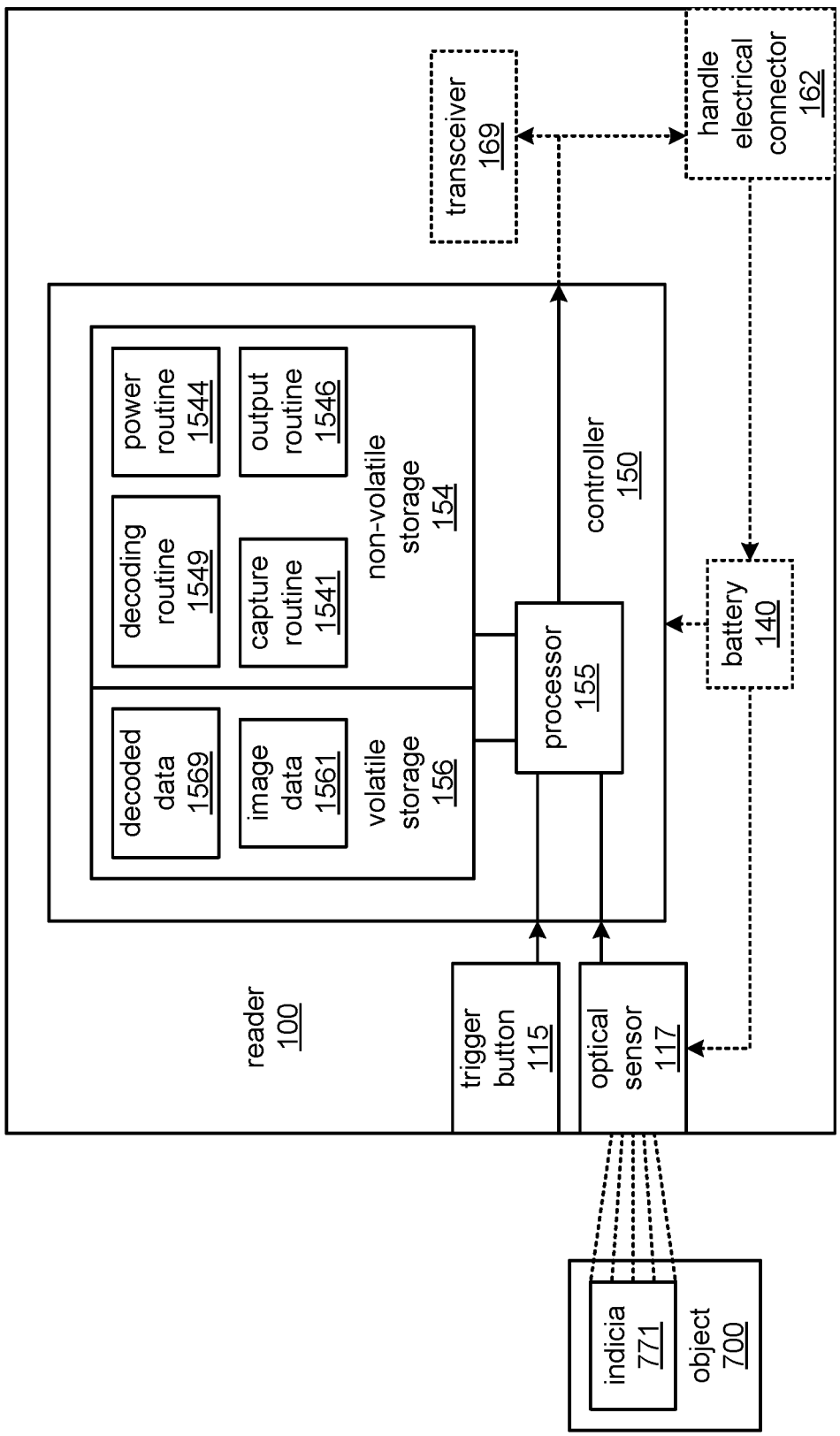
FIGS. 2A, 2B, 2C, 2D, 2E 2F and 2G, collectively referred to herein as FIG. 2, show aspects of an internal architecture of the system of FIG. 1.
Figure 2B:
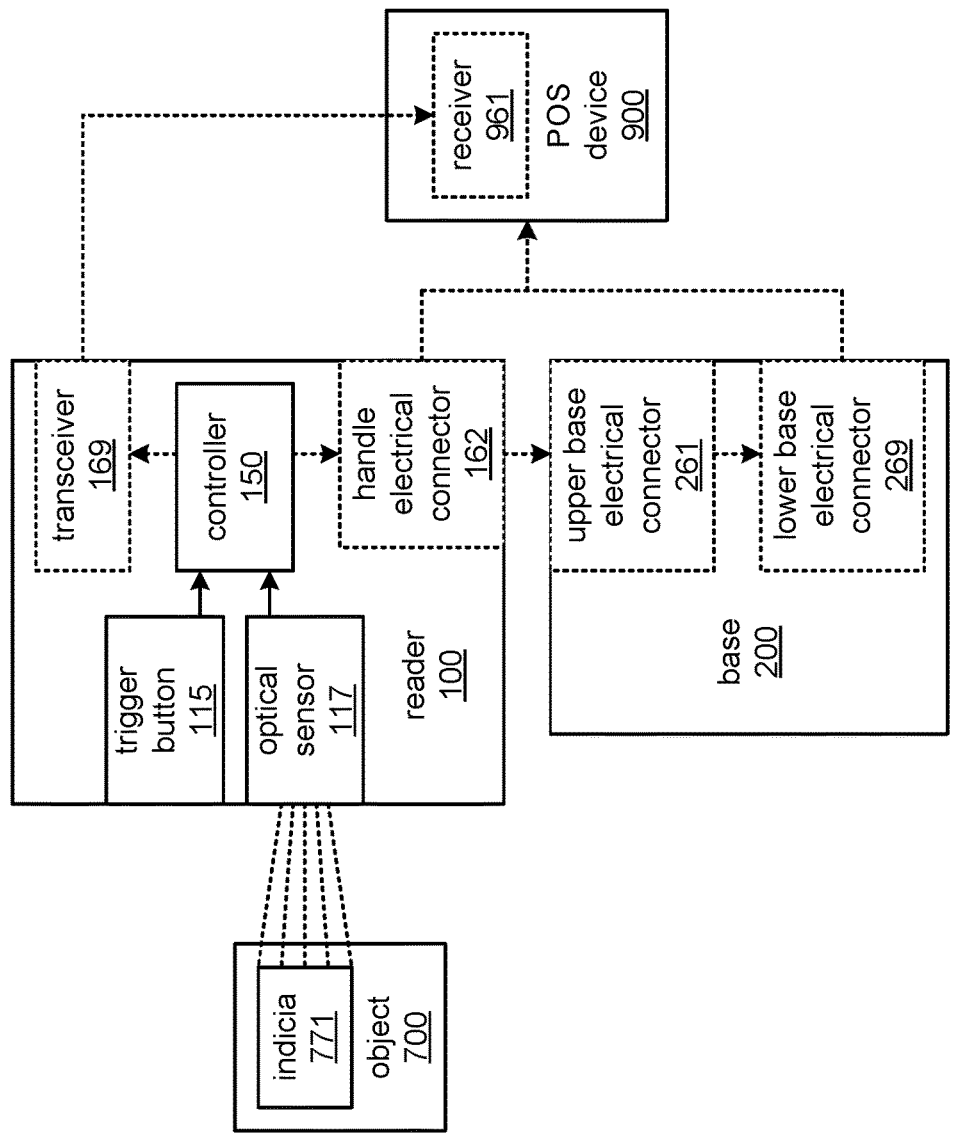
Figure 2C:
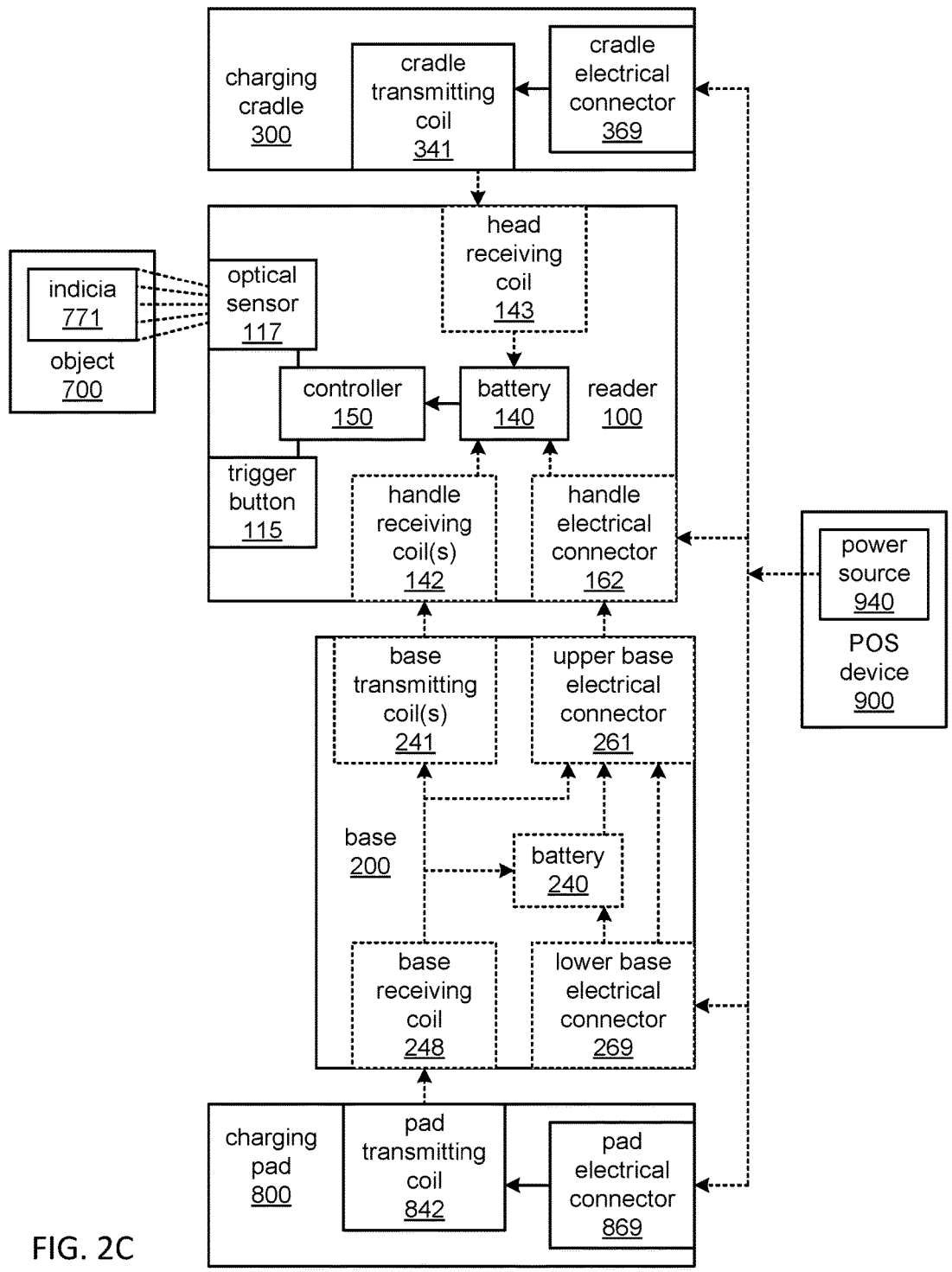
Figure 2D:
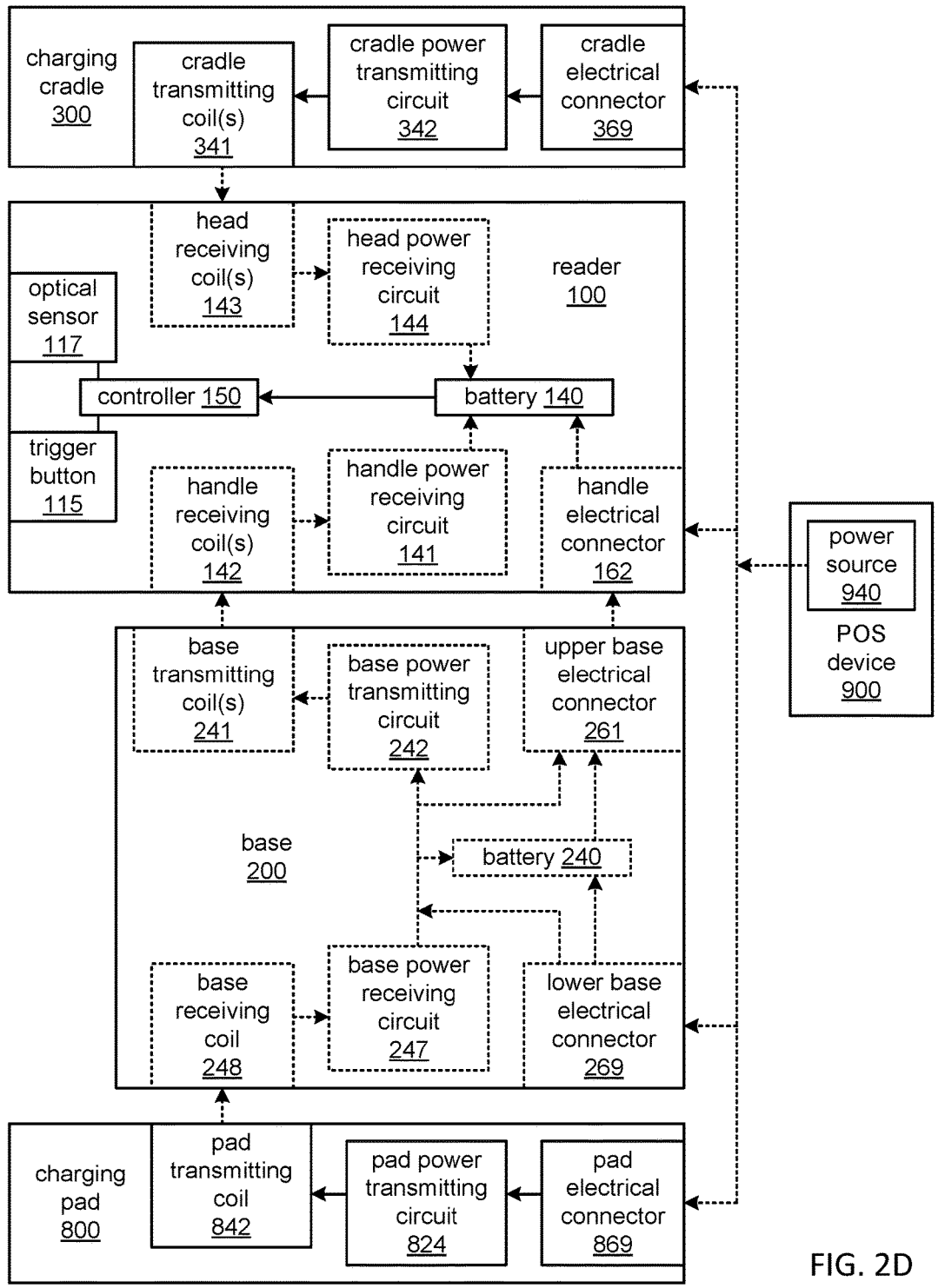
Figure 2E:
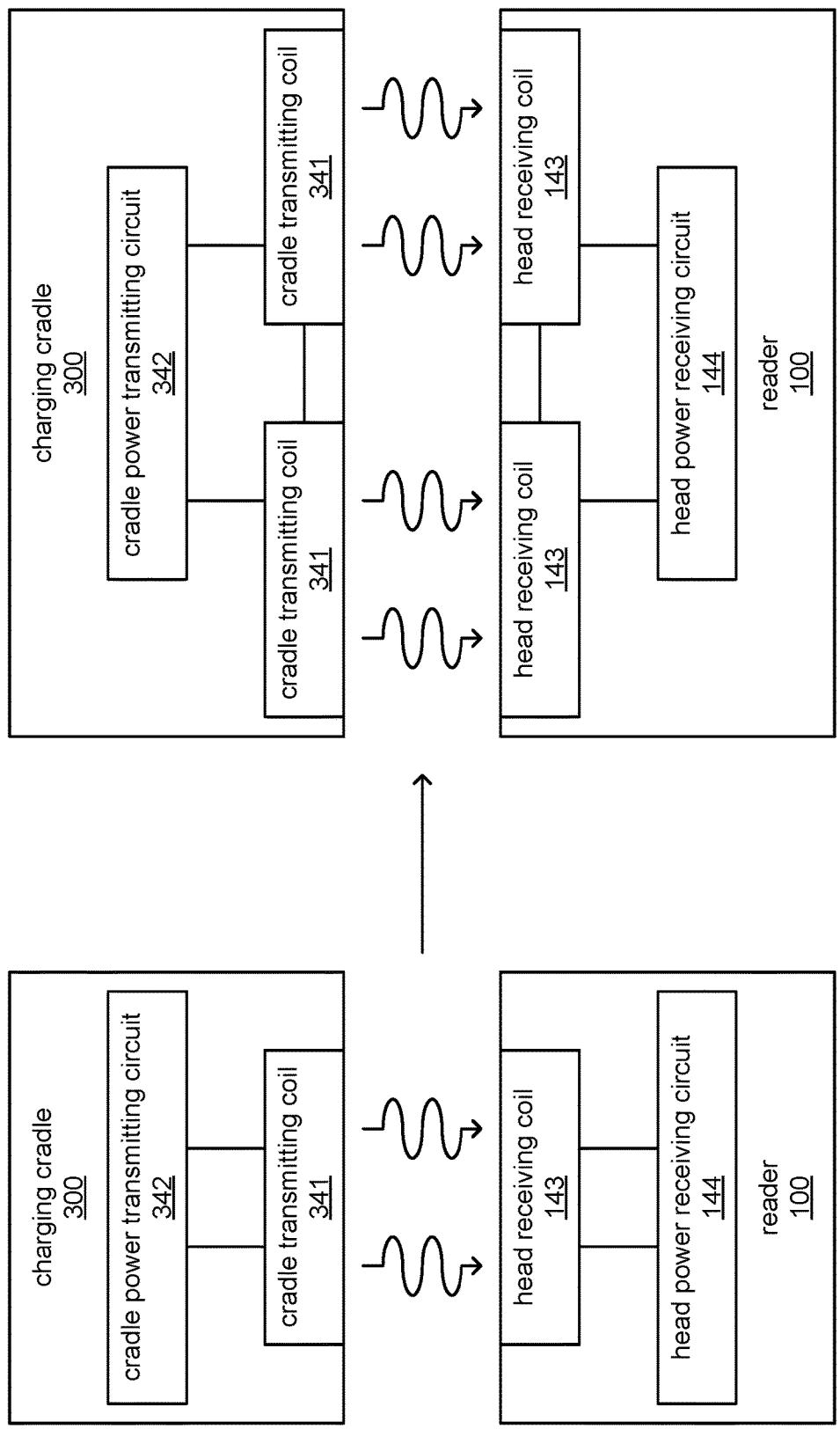
Figure 2F:
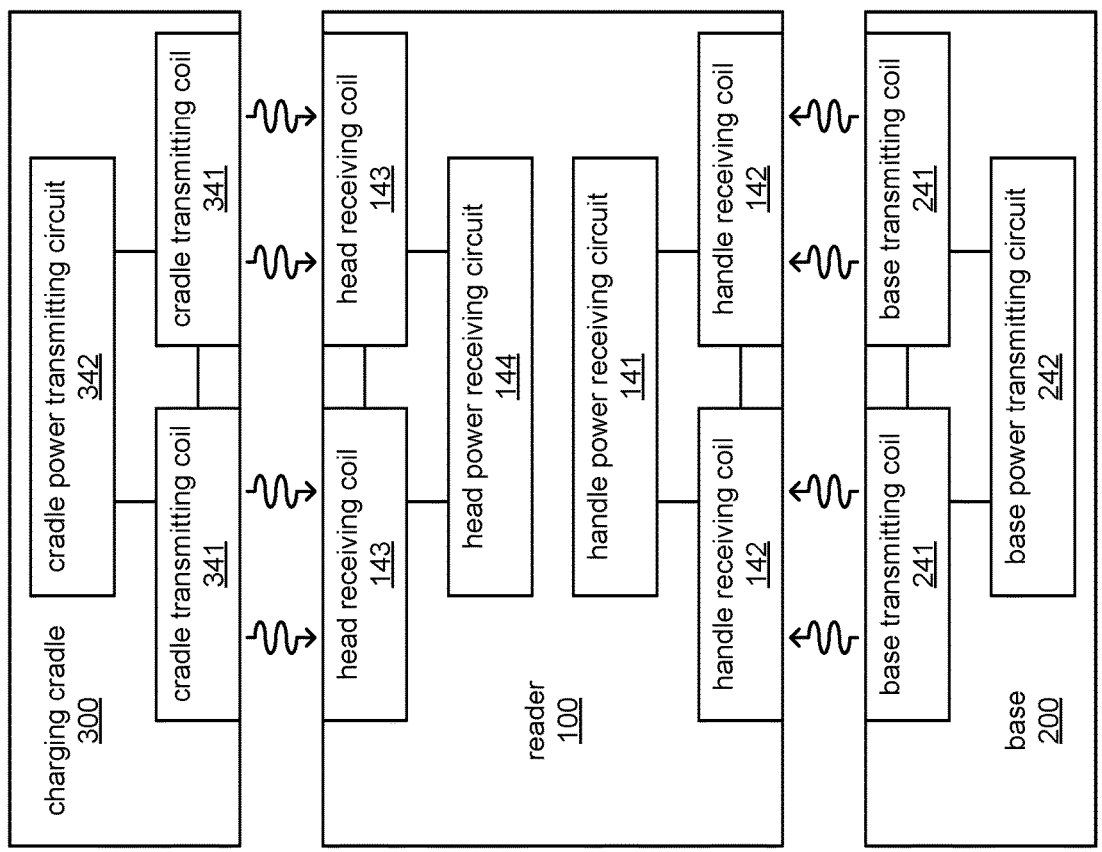
Figure 2G:
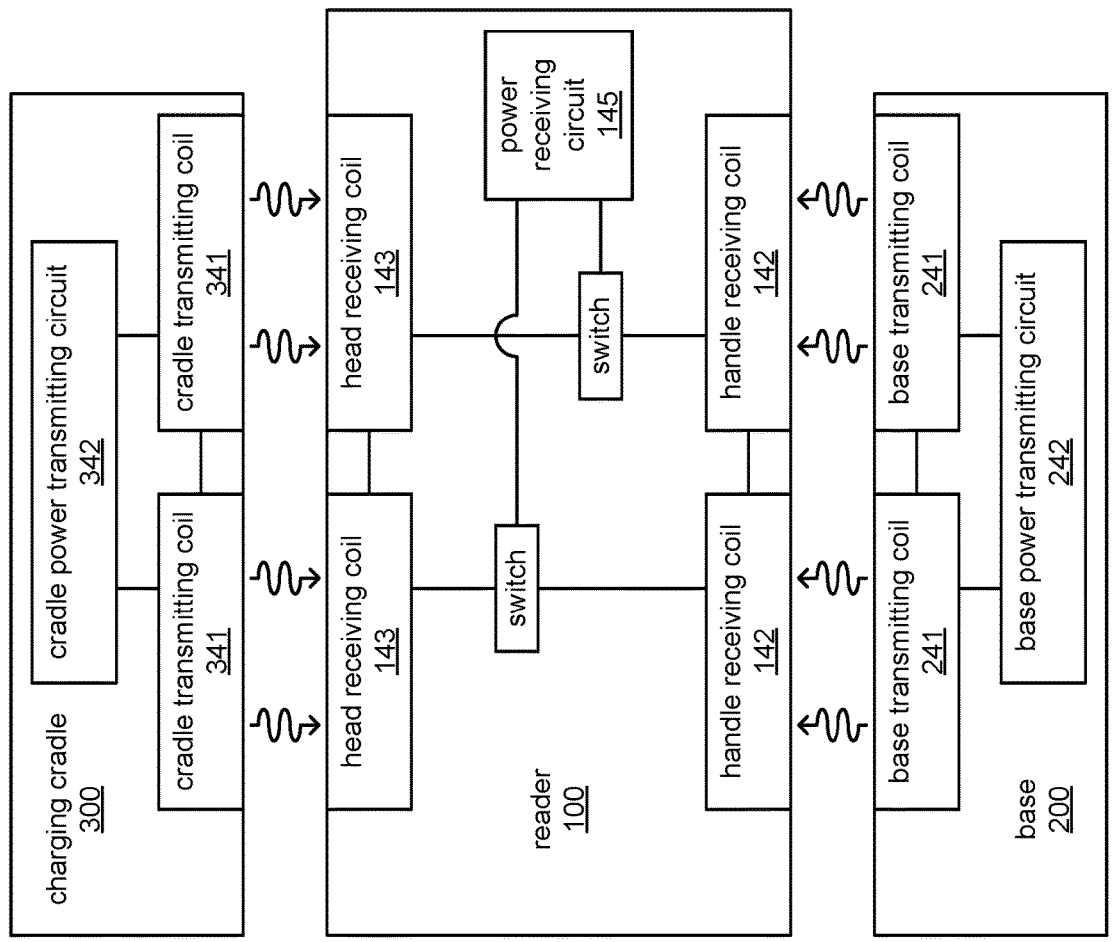

FIG. 2D also provides a block diagram, somewhat similar to FIG. 2C, but depicting a slightly different ways in which electric power may be conveyed from a power source and to the reader 100, as well as more explicitly depicting various power transmitting and receiving circuits. FIG. 2E depicts a difference between FIGS. 2C and 2D in the wireless provision of electric power by the charging cradle 300 to the reader 100. FIGS. 2F and 2G depict contrasting interconnections between receiving coils and power receiving circuit(s).

Turning more specifically to FIG. 2A, the reader 100 may incorporate one or more of a trigger button 115, an optical sensor 117, a battery 140, a handle electrical connector 162 and a transceiver 169. As depicted, the controller 150 may be coupled to the trigger button 115, the optical sensor 117, the battery 140, the handle electrical connector 162 and/or the transceiver 169. The controller may incorporate one or more of a processor 155, volatile storage 156 and non-volatile storage 154. As depicted, the volatile storage may store one or both of image data 1561 and decoded data 1569, and the non-volatile storage may store one or more of a capture routine 1541, a power routine 1544, an output routine 1546 and a decoding routine 1549.

The volatile storage 156 may be based on any of a variety of storage technologies that provide relatively high speeds of access, but which require the continuous provision of electric power to retain any data and/or routines stored therein. Such technologies may include, and are not limited to, random-access memory (RAM), dynamic RAM (DRAM), Double-Data-Rate DRAM (DDR-DRAM), synchronous DRAM (SDRAM), static RAM (SRAM), etc. The non-volatile storage 154 may be based on any of a variety of storage technologies that may not be capable of providing such relatively high speeds of access, but which may be capable of storing with greater density, and capable of retaining data and/or routines stored therein regardless of whether electric power is continuously provided. Such technologies include, and are not limited to, read-only memory (ROM), erasable programmable ROM (EPROM), electrically erasable programmable ROM (EEPROM), flash memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

The processor 155 may include any of a wide variety of processors, microcontrollers, gate-array logic devices, etc. that may be incorporate any of a variety of features to enhance speed and/or efficiency of processing operations. Such features may include and are not limited to, multi-threading support, multiple processing cores, single-instruction multiple-data (SIMD) support, directly integrated memory control functionality, and/or various modes of operation by which speed of throughput and/or level of power consumption may be dynamically altered.

The transceiver 169 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the transceiver 169 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

The handle electrical connector 162 may include electrical contacts by which electric power and/or data transfer signals may be exchanged therethrough and with a mating connector to which the handle electrical connector 162 may be coupled. Additionally, the handle electrical connector 162 may have a physical configuration and/or may be configured to support an exchange of electric power and/or data transmission signals that adhere to one or more known and widely used standards, including and not limited to RS-232C, RS-422, Universal Serial Bus (USB), Ethernet (IEEE-802.3) or IEEE-1394

The battery 140 may be coupled to and provide electric power for the operation of the optical sensor 117, the controller 150 and/or the transceiver 169. The battery 140 may be based on any of a wide variety of energy storage technologies to provide energy storage that enables recharging, including and not limited to, nickel-cadmium (NiCd), nickel-metal hydride (NiMH), lithium-ion and/or lithium-polymer.

The optical sensor 117 may be based on any of a variety of technologies and may employ any of a variety of optical scanning and/or other image capturing techniques to capture indicia 771 carried by a portion of an object 700. More specifically, the optical sensor 117 may include any of a variety of light sensing components to effect the capture of an image of the indicia 771, including and not limited to, a charge-coupled device (CCD) providing a single row of individual light sensors operated in a manner that sweeps over the indicia 771 to scan it, or a CCD providing a two-dimensional (2D) array of individual light sensors to capture a 2D image of the optical sensor 117 in a manner akin to a camera.

In some embodiments, the optical sensor 117 may emit various forms of collimated and/or monochromatic light, including light that projects any of a variety of patterns onto a surface of the object 700 that carries the indicia 771. As those skilled in the art will readily recognize, such emission of light may be to provide sufficient illumination to ensure that the indicia 771 is sufficiently visible to be captured, and/or may be to provide a visible pattern of markers on a surface of the object 700 and/or the indicia 771 as a guide to determining the orientation of indicia 771 relative to the optical sensor 117 to improve the accuracy with which the data encoded within the indicia 771 may be decoded.

The object 700 may be any of a variety of objects that may carry any of a variety of forms of the indicia 771, including and not limited to, a package carrying a shipping label that includes the indicia 771, or a product for sale within retail packaging on which the indicia 771 is printed as part of the graphical artwork thereof. The indicia 771 may encode data, including and not limited to, data indicating the addresses of the sender and intended recipient of a package, or data providing a universal product code (UPC) that uniquely identifies a product for sale.

Thus, the indicia 771 may be any of a variety of forms of bar code or quick-response (QR) code, including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; Data-Glyphs; Data Matrix; Datastrip Code; digital paper; EZcode; Color; High Capacity Color Barcode; HueCode; InterCode; MaxiCode; MMCC; NexCode; Nintendo e-Reader; Dot-code; PDF417; QR code; ShotCode; and SPARQCode.

In some embodiments, in addition to the optical sensor 117, the scanning head may also incorporate a radio-frequency identification (RFID) tag reader to enable reading of RF scanning of RFID tags placed on objects, in addition to or in lieu of the placement of an optically readable indicia 771 on objects. In some embodiments, a single label and/or package associated with an object may carry both an optically readable indicia 771 and a RFID tag.

The processor 155 may access the volatile storage 156 and/or the non-volatile storage 154 to retrieve and/or execute one or more of the routines 1541, 1544, 1546 and 1549 to control various aspects of the operation of the reader 100. In so doing, the processor 155 may be caused to monitor various aspects of the reader 100 and/or of others of the components 200, 300 and/or 800 of the system 1000 with which the reader 100 may interact, and may take various actions in response.

By way of example, the processor 155 may be caused by its execution of the capture routine 1541 to await an indication of manual operation of the trigger button 115, thereby serving to provide a manually entered command to capture an image of and decode the indicia 771. In response, the processor 155 may be caused to operate the optical sensor 117 to so capture an image of the indicia 711, and store the captured image within the volatile storage 156 as the image data 1561.

Such detection of manual operation of the trigger button 115 may also trigger the execution of the decoding routine 1549 by the processor 155. In executing the decoding routine 1549, the processor 155 may be caused to employ any of a variety of algorithms to analyze the captured image of the indicia 771 in the image data 1561 to decode the data that may be encoded within the indicia 771. The processor 155 may then be further caused to store that data within the volatile storage 156 as the decoded data 1569.

Such detection of manual operation of the trigger button 115 may further trigger the execution of the output routine 1546 by the processor 155. In various different embodiments, in executing the output routine 1546, the processor 155 may be caused to operate the transceiver 169 to wirelessly transmit the decoded data 1569 to the POS device 900 (and/or to still another device, not shown). Alternatively or additionally, the processor 155 may be caused to transmit the decoded data 1569 to the POS device 900 (and/or to still another device, not shown) through the handle electrical connector 162.

As depicted in FIG. 2B, the decoded data 1569 may be provided to the POS device 900 through various pathways depending on the features incorporated into the reader 100 and/or on what features are incorporated into the presentation base 200. As just discussed, in embodiments in which the reader 100 incorporates the transceiver 169, the transceiver 169 may be operated to wirelessly transmit the decoded data 1569 to the POS device 900. Alternatively or additionally, in embodiments in which the reader 100 incorporates the handle electrical connector 162, and is not physically coupled to the presentation base 200, the decoded data 1569 may be provided to the POS device 900 via a cable coupled to the handle electrical connector 162 and the POS device 900. As another alternative, in embodiments in which the reader 100 incorporates the handle electrical connector 162, in which the presentation base 200 incorporates both of the depicted base electrical connectors 261 and 269, in which the reader 100 is electrically coupled to the presentation base 200 through the electrical connectors 162 and 261 being connected, and in which the base electrical connectors 261 and 269 of the presentation base 200 are electrically connected therein, the decoded data 1569 may be provided to the POS device 900 via a cable coupled to the lower base electrical connector 269.

Returning to FIG. 2A, the processor 155 may also be caused by execution of the power routine 1544 to monitor the level of electric charge stored within the battery 140. The processor 155 may change one or more aspects of the operation of the reader 100 in response to detecting that the charge stored within the battery 140 is becoming low, thereby implementing one or more lower power and/or power saving modes or states. In such lower power configurations, the processor 155 may reduce its own clock speed and/or speed with which the processor 155 accesses the volatile storage 156. Alternatively or additionally, the processor 155 may lower the brightness of any light emitted by the optical sensor 117. The processor 155 may also respond to an indication that electric power has begun to be provided to the reader 100 from an external source by transitioning the reader 100 back to a higher power state or mode, and/or by controlling the manner in which the battery 140 is recharged by the externally supplied electric power to prevent damage to the battery 140.

Turning to FIG. 2C, as depicted, there may be various pathways offered by the system 1000 to enable the provision of electric power from a power source 940 of the POS device 900 (and/or from another power source external to the reader 100) and to the reader 100 for purposes of supporting operation of the reader 100 and/or recharging the battery 140 therein. As also depicted, which of such numerous pathways for such provision of electric power are able to be used may also depend on the selection of features that may be incorporated into the reader 100, itself.

For example, in embodiments in which the reader 100 is configured to be recharged when the scanning head 103 is releasably retained within the receptacle 301 of the charging cradle 300, the scanning head 103 of the reader 100 may incorporate a head receiving coil 143. In such embodiments, the head receiving coil 143 may be positioned within the scanning head 103 at a location that brings it into close proximity to a cradle transmitting coil 341 of the charging cradle 300 to enable the wireless provision of electric power to the reader 100 via the coils 341 and 143 while the scanning head 103 is inserted and releasably retained within the receptacle 103. The electric power supplied by the charging cradle 300 to the reader 100 may be provided to the charging cradle 300 from the power source 940 by a cable connecting the POS device 900 to a cradle electrical connector 369 of the charging cradle 300.

In embodiments in which the reader 100 incorporates and is configured to be recharged via the handle electrical connector 162, the electric power so received by the reader 100 through the handle electrical connector 162 may be directly provided to the reader 100 via a cable electrically connected to the handle electrical connector 162 from the POS 900. Alternatively, where the presentation base 200 incorporates both of the upper base electrical connector 261 to engage the handle electrical connector 162, and the lower base electrical connector 269 to enable an electrical connection to the POS device 900 via a cable electrically connected thereto, and where the base electrical connectors 261 and 269 are electrically connected within the presentation base 200 to convey electric power therebetween, the reader 100 may be provided with electric power through the combination of the electrical connectors 162, 261 and 269, and via cable electrically connecting the lower base electrical connector 269 to the POS device 900.

As depicted, in embodiments in which the reader 100 may receive electric power through its handle electrical connector 162 when connected to the upper base electrical connector 261 of the presentation base 200, the presentation base 200 may additionally include a battery 240. In such embodiments, where the presentation base 200 is allowed to remain attached to the reader 100 while the reader 100 may be used as mobile scanner, the battery 240 may serve to assist the battery 140 in providing electric power for the operation of the reader 100. Also in such embodiments, the battery 240 may be charged along with the battery 140 when electric power is provided to recharge the battery 140 of the reader 100 through the presentation base 200, as by being provided via a cable connected to the lower base electrical connector 269 of the presentation base 200.

In embodiments in which the reader 100 is configured to be wirelessly recharged through the presentation base 200, the reader 100 may incorporate one or more handle receiving coils 142 within the elongate handle 102. The one or more handle receiving coils 142 may be positioned close to and behind external surfaces of the elongate handle 102 that become closely aligned with (and may be engaged by) interior surfaces of the upper portion 201 of the presentation base 200. Corresponding to the one or more handle receiving coils 142, the upper portion 102 of the presentation base 200 may incorporate matching one or more base transmitting coils 241 positioned close to and behind interior surfaces of the upper portion 201 at locations that cause the one or more base transmitting coils 241 to be positioned closely to the handle receiving coils 142 when the elongate handle 102 is received within the upper portion 201 of the presentation base 200. Such use may be made of the coils 241 and 142 to provide electric power for recharging the battery 140 in environments in which there may be dust and/or other environmental contaminants and/or reactive substances that may damage and/or impede the use of electrical contacts as might otherwise be used to provide electric power to the reader 100.

Further, in some of the embodiments in which the combination of one or more of each of the coils 241 and 142 are used to provide electric power from the presentation base 200 to the reader 100, the presentation base 200 may additionally incorporate a base receiving coil 248 positioned closely behind a bottom surface of the lower portion 208 of the presentation base 200 to receive wirelessly conveyed electric power from a pad transmitting coil 842 of the charging pad 800. The presentation base 200 may be configured to convey electric power received via the base receiving coil 248 from the charging pad 800 to the one or more base transmitting coils 241 for being wirelessly conveyed onward to the reader 100. The charging pad 800 may receive the electric power that it so wirelessly conveys to the presentation base 200 from the POS device 900 via a pad electrical connector 869 incorporated into the charging pad 800 and a cable connecting the POS device 900 thereto.

As still another alternative, the presentation base 200 may incorporate the base receiving coil 248 to wirelessly receive electric power from the charging pad 800, but may incorporate and employ the upper base electrical connector 261 to convey the received electric power onward to the reader 100 via the electrical connectors 261 and 162. In such alternative embodiments, an amount of the electric power wirelessly received via the base receiving coil 248 may be used to also recharge the battery 240 which may subsequently assist the battery 140 of the reader 100 in providing electric power for the operation of the reader 100.

Turning to FIG. 2D, in still other alternate embodiments, there may be somewhat different pathways offered by the system 1000 to enable the provision of electric power from a power source 940 of the POS device 900 (and/or from another power source external to the reader 100) and to the reader 100. Again, which of such numerous pathways for such provision of electric power are able to be used may also depend on the selection of features that may be incorporated into the reader 100, itself.

For example, in embodiments in which the reader 100 is configured to be recharged when the scanning head 103 is releasably retained within the receptacle 301 of the charging cradle 300, the scanning head 103 of the reader 100 may incorporate multiple ones of the head receiving coil 143. In such embodiments, each of the multiple head receiving coils 143 may be positioned at a different location within the scanning head 103, where each such different location bring its corresponding head receiving coil 143 into close proximity to a corresponding one of multiple cradle transmitting coils 341 of the charging cradle 300 to enable the wireless provision of electric power to the reader 100 via the coils 341 and 143 while the scanning head 103 is inserted and releasably retained within the receptacle 103.

As depicted, the electric power provided by the charging cradle 300 to the reader 100 may be provided to the charging cradle 300 from the power source 940 by a cable connecting the POS device 900 to the cradle electrical connector 369 of the charging cradle 300. Within the charging cradle 300, such received electric power may be provided to a single cradle power transmitting circuit 342 that may be coupled to and operate the multiple cradle transmitting coils 341 to cause each to wirelessly transmit electric power to a corresponding one of the multiple head receiving coils 143 within the reader 100 when the scanning head 103 is inserted and releasably retained within the receptacle 103. Within the reader 100, the multiple head receiving coils 143 may be coupled to a single head power receiving circuit 144, which may operate the multiple head receiving coils 143 to receive the wirelessly provided electric power from corresponding ones of the multiple cradle transmitting coils 341. The head power receiving circuit 144 may convert the wirelessly received electric power into a DC current, and may relay that DC current to various others of the electrically operated components within the reader 100, including to the battery 140 to recharge the battery 140. As will be explained in greater detail, in embodiments in which there are multiple cradle transmitting coils 341 within the charging cradle 300, the multiple cradle transmitting coils 341 may be coupled to the cradle power transmitting circuit 342 in series. Correspondingly, in embodiments in which there are multiple head receiving coils 143 within the reader 100, the multiple head receiving coils 143 may be coupled to the head power receiving circuit 144 in series.

In embodiments in which the reader 100 incorporates multiple handle receiving coils 142 within the elongate handle 102, the multiple handle receiving coils 142 may be coupled to a single handle power receiving circuit 141 in series, which may operate the multiple handle receiving coils 142 to receive electric power wirelessly provided to the multiple handle receiving coils 142 by corresponding ones of multiple base transmitting coils 241 within the presentation base 200, when the elongate handle 102 is received within the upper portion 201 of the presentation base 200. Like the head power receiving circuit 144, the handle power receiving circuit 141 may convert such wirelessly received electric power into a DC current and may relay that DC current to various others of the electrically operated components within the reader 100, including the battery 140 to recharge the battery 140. Within the presentation base 200, the multiple base transmitting coils 241 may be coupled to a single base power transmitting circuit 242 in series, which may operate the multiple base transmitting coils 241 to cause each to wirelessly transmit electric power to a corresponding one of the multiple handle receiving coils 142.

As depicted, the electric power provided by the presentation base 200 to the reader 100 may be provided to the presentation base 200 from the power source 940 by a cable connecting the POS device 900 to the lower base electrical connector 269 of the presentation base 200. Alternatively or additionally, in some of the embodiments in which the combination of the multiple coils 241 and 142 are used to provide electric power from the presentation base 200 to the reader 100, the presentation base 200 may additionally incorporate a base power receiving circuit 247 coupled to and operating the base receiving coil 248 to receive wirelessly conveyed electric power from the pad transmitting coil 842 of the charging pad 800. Within such embodiments of the presentation base 200, the base power receiving circuit 247 may convert the wirelessly received electric power to a DC current that may be used to recharge the battery 240 and/or may be provided to the base power transmitting circuit 242 to provide the electric power wirelessly transmitted via the multiple base transmitting coils 241 to corresponding ones of the multiple handle receiving coils 142 within the reader 100.

Turning to FIG. 2E, as more explicitly depicted, a difference between embodiments of FIGS. 2C (depicted on the left) and 2D (depicted on the right) is the number of coils employed in the wireless provision of electric power by the charging cradle 300 to the reader 100. More specifically, and as will be explained in greater detail, embodiments of FIG.

2D in which the charging cradle 300 employs multiple cradle transmitting coils 341 wirelessly provide electric power, and in which the reader 100 employs multiple head receiving coils 143 to receive the wirelessly provided power, may have multiple advantages over the use of single coils 341 and 143 in embodiments of FIG. 2C, including and not limited to, greater flexibility in coil placement (e.g., as a result of each coil of such multiple coils being able to be made smaller in one or more dimensions, such as thickness) and/or greater efficiency in the provision of electric power.

As also more explicitly depicted, and as previously mentioned, embodiments of FIG. 2D the multiple cradle transmitting coils 341 may be coupled to the single cradle power transmitting circuit 342 in series, and the multiple head receiving coils 143 may be coupled to the single head power receiving circuit 144 also in series. As will be explained in greater detail, such coupling of multiple coils to a transmitting or receiving circuit in series may enable the wireless provision of electric power with greater efficiency than if the multiple coils were to be coupled to a transmitting or receiving circuit in parallel, or in any of a variety of combinations of serial and parallel interconnections thereamong. As will also be explained in greater detail, such a coupling of multiple coils to a single transmitter or receiver may beget greater efficiency than coupling each coil to a separate transmitter or receiver, in addition to begetting the cost saving benefits of not requiring multiple transmitters or multiple receivers.

Turning to FIG. 2F, a power provision architecture of an embodiment of the reader 100 of FIG. 2D is more explicitly depicted in which the reader 100 incorporates both a head power receiving circuit 144 and a separate handle power receiving circuit 141, each of which is coupled in series to multiple receiving coils 143 and 142, respectively. As has been discussed, such embodiments enable the reader 100 to wirelessly receive electric power through either the presentation base 200 or the charging cradle 300. However, and turning to FIG. 2G, a further reduction in the number of components and/or a further simplification of electrical circuitry may be realized by enabling a single power receiving circuit 145 to be selectively coupled in series to either the multiple head receiving coils 143 or the multiple handle receiving coils 142. Such a selective coupling to one set of multiple receiving coils 143 or the other 142 may be enabled by interposing switch components between the power receiving circuit 145 and each of the sets of multiple receiving coils 142 and 143. Any of a variety of switching components may be employed that are appropriate in view of the frequency of signals conveyed to and from the coils, including and not limited to one or more electromechanical relays, at least one pair of MOSFETs operated to cooperatively to form at least one SPDT switching device, etc.

In some embodiments, at times when electric power is not already being received through the multiple head receiving coils 143 or the through the multiple handle receiving coils 142, the switching components may be operated at a recurring interval (e.g., a fraction of a minute, or one or more minutes) to recurringly alternate between checking for the start of receipt of electric power via the multiple head receiving coils 143 and checking for the start of receipt of electric power via the multiple handle receiving coils 142 until electric power is detected as having started to be provided through one or the other of these sets of multiple receiving coils.

FIG. 3 depicts aspects of embodiments of the hinge portion 220 of the presentation base 200 in greater detail. As previously discussed, the hinge portion 220 may be implemented using any of a variety of hardware components to define a hinge by which the upper portion 201 of the presentation 200 may rotationally move relative to the lower portion 208. FIG. 3B provides a cross-sectional view of one embodiment of the hinge portion 220 along a sectional line A-A in a front elevational view of the combination of the reader 100 and the presentation base 200 provided in FIG. 3A. In the sectional view of FIG. 3B, the pivot axis 222 of the hinge portion 220 can be seen extending straight out from the plane of view of FIG. 3B.

Figure 3A:
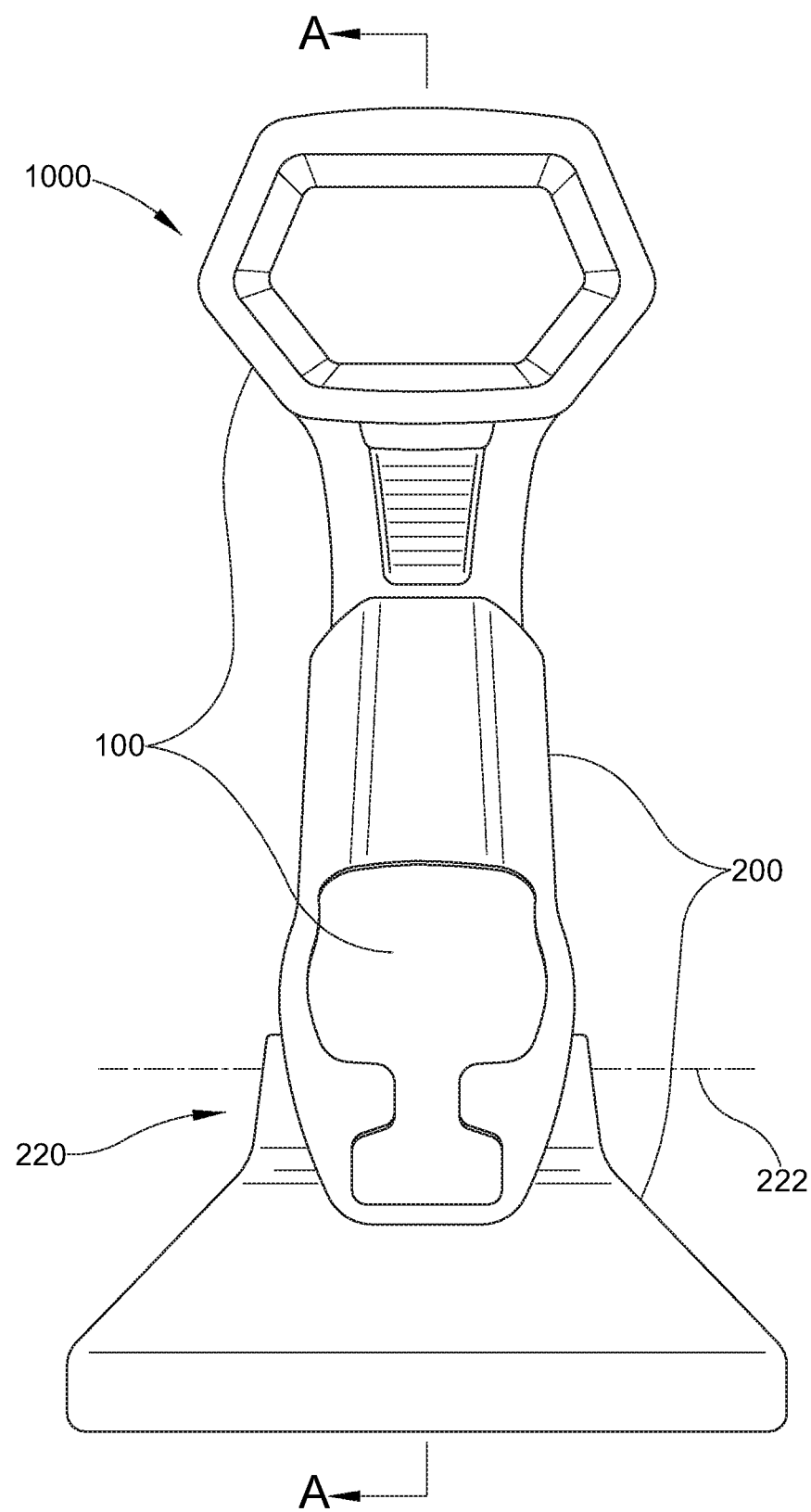
FIGS. 3A, 3B, 3C, 3D and 3E, collectively referred to herein as FIG. 3, are depictions of a first handheld scanning device configuration of the system of FIG. 1.
Figure 3B:
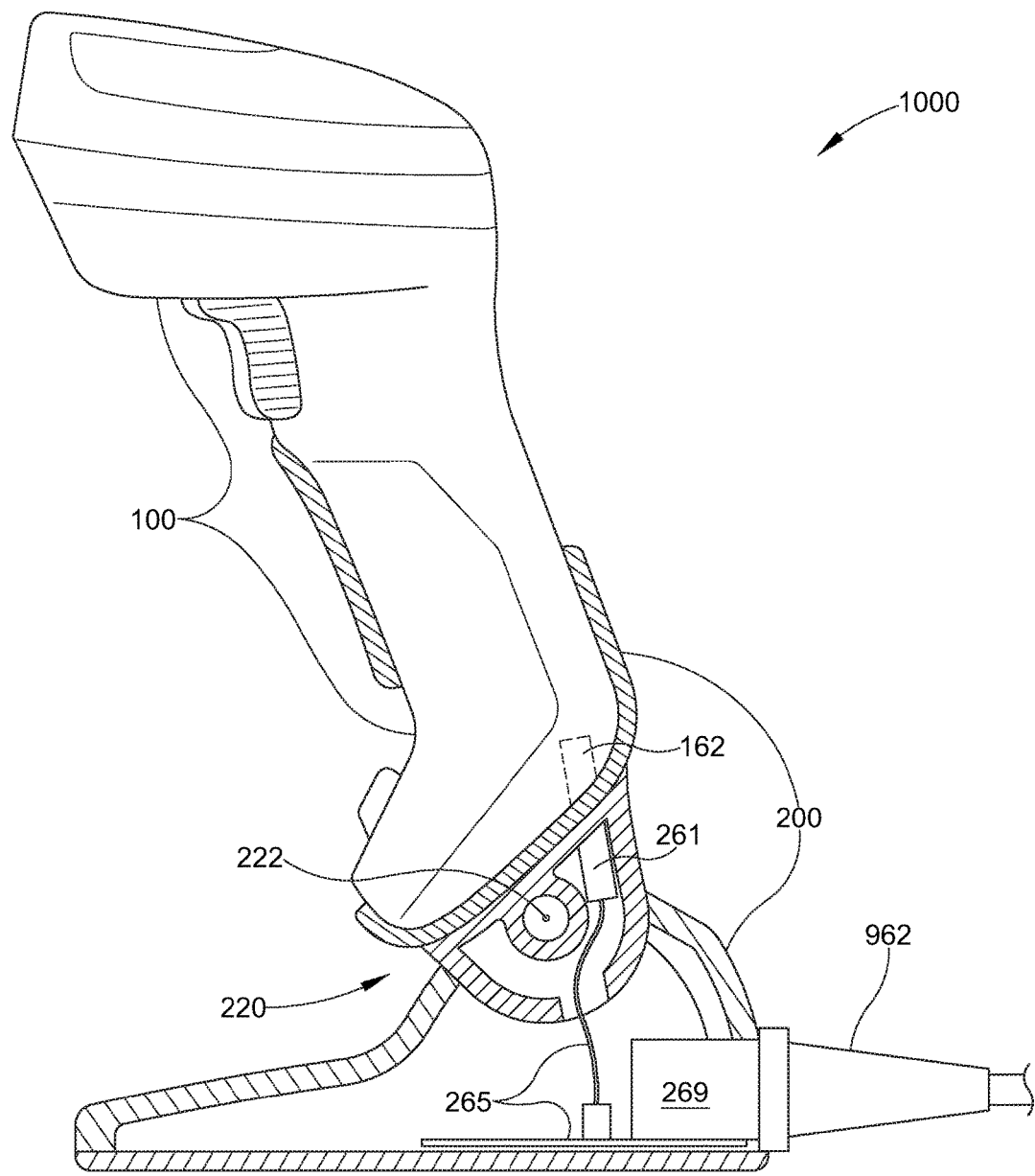

Also directly visible in cross-sectional view of the presentation base 200 in FIG. 3B are the base electrical connectors 269 and 261 incorporated into the lower portion 208 and the upper portion 201, respectively. Additionally directly visible is an embodiment of electrically connective components 265 by which the base electrical connectors 269 and 261 may be electrically connected to each other to enable the conveyance of electric power and/or data signals conveying the decoded data 1569 therebetween. As depicted, the electrically connective components 265 may include a circuitboard onto which the lower base electrical connector 269 may be soldered and/or a ribbon-like electrical cable connecting that circuitboard to the upper base electrical connector 261. Also additionally directly visible is the electrical connection of the lower base electrical connector 269 to a cable 962 that, in turn, may electrically couple the lower base electrical connector 269 to the POS device 900.

Also visible in FIG. 3B as a hidden object indicated with broken lines is the handle electrical connector 162 that may electrically connect with the upper base electrical connector 261 at times when the elongate handle 102 of the reader 100 is inserted and releasably retained within the upper portion 201 of the presentation base 200. Through this connection, electric power and/or data signals conveying the decoded data 1569 may be conveyed through all three of the electrical connectors 162, 261 and 269, and thereby between the reader 100 and the POS device 900.

Figure 3C:
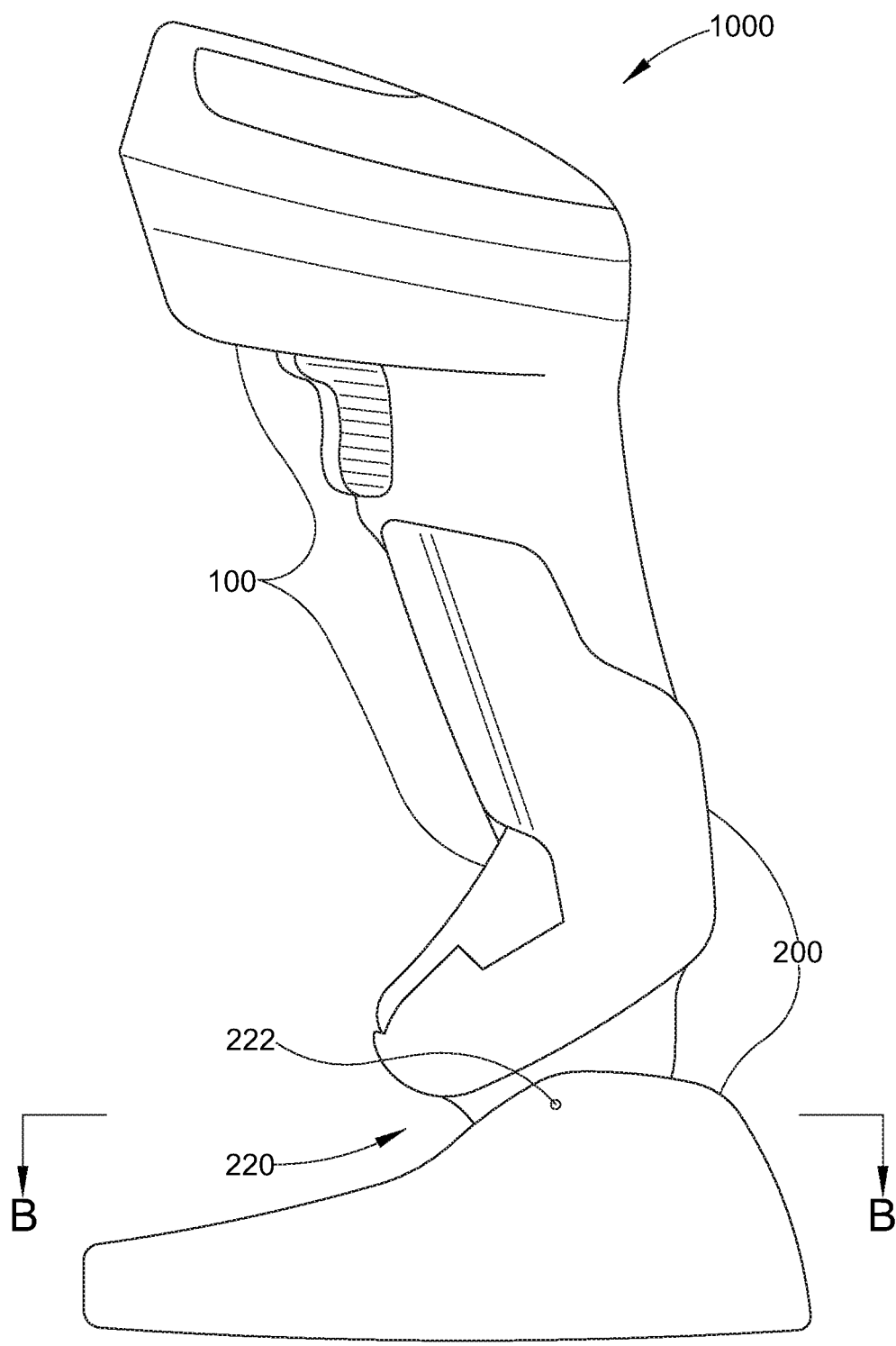
Figure 3D:
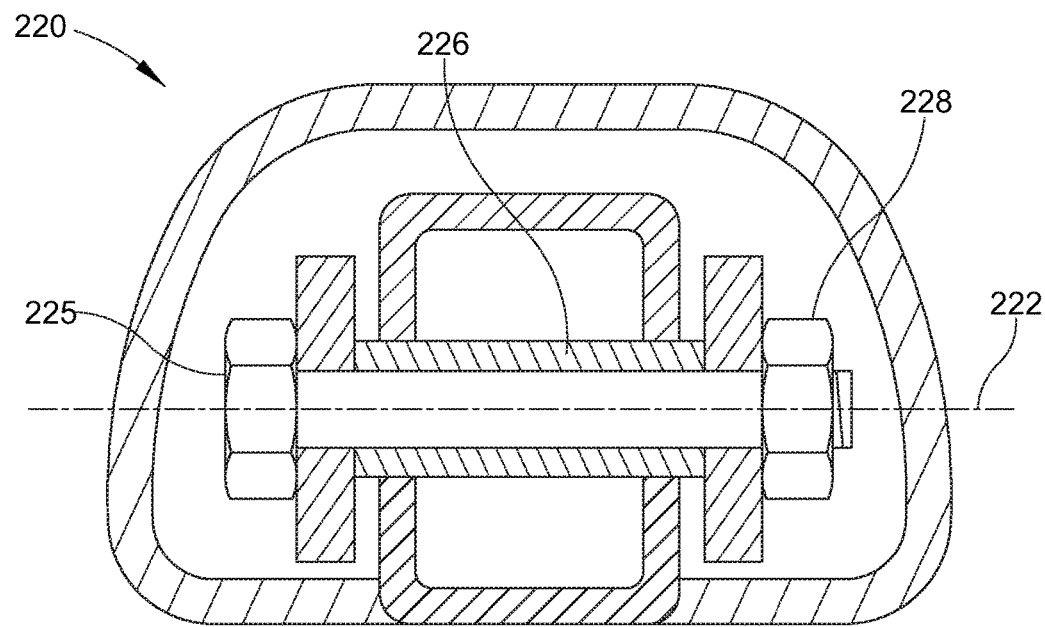
Figure 3E:
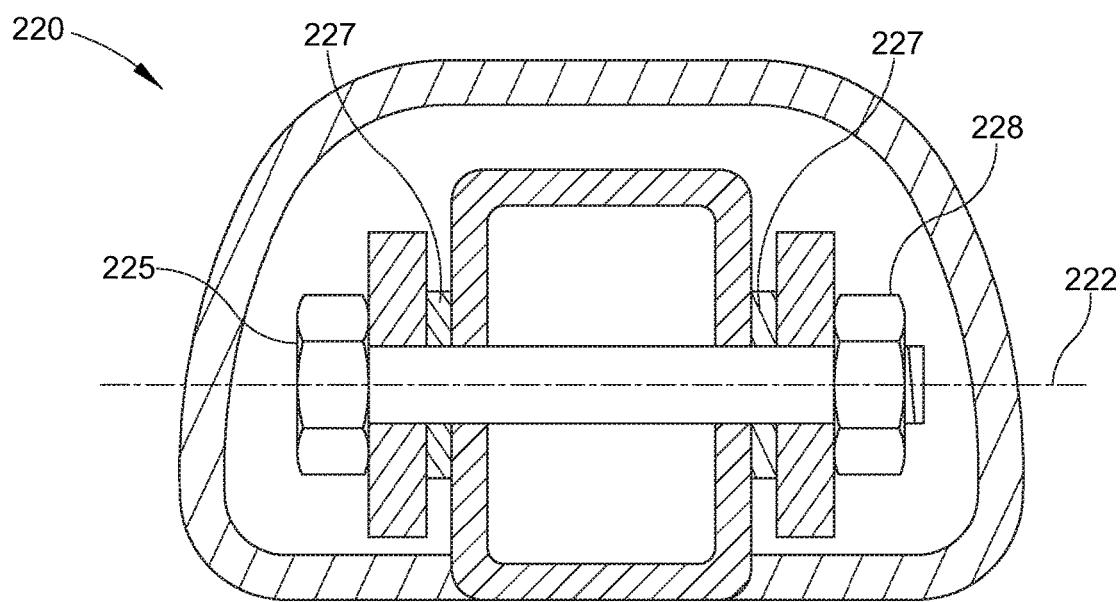

Each of FIGS. 3D and 3E provides a cross-sectional view of an embodiment of the hinge portion 220 along a sectional line B-B in a side elevational view of the combination of the reader 100 and the presentation base 200 provided in FIG. 3C. In each of the sectional views FIGS. 3D and 3E a different combination of hardware components is depicted as implementing the hinge portion 220. More specifically, in FIG. 3D, a tubular bushing 226 made from material selected to impart a degree of smoothness in the bending of the hinge portion 220 is sleeved over a portion of the bolt 225. In contrast, in FIG. 3E, a pair of disc-shaped bushings 227 also made from material selected to impart a degree of smoothness in the bending of the hinge portion 220 may be installed along different portions of the length of the bolts 225.

FIG. 4 depicts aspects of embodiments of the system 1000 in which the reader 100 may incorporate one or more of the head receiving coil 143 to support recharging of the battery 140 via the charging cradle 300, and the handle electrical connector 162 to support recharging of the battery 140 via an electrical connection to the handle electrical connector 162 (e.g., via the depicted electrical cable 961 of the POS device 900). As depicted in FIG. 4A, a single one of the head receiving coil 143 may be positioned close to and just behind an uppermost exterior surface of the scanning head 103, while the handle electrical connector 162 may be positioned within the end of the elongate handle 102 that is to mate with the upper base electrical connector 261 within the upper portion 201 of the presentation base 200 (as was depicted in the sectional view of FIG. 3B) when the reader 100 and the presentation base 200 are coupled.

FIG. 4B similarly echoes the positioning depicted in the section view of FIG. 3B of the base electrical connectors 261 and 269 within the presentation base 200. However, FIG. 4B additionally depicts the battery 240 that may additionally be incorporated into the presentation base 200 as being disposed within the lower portion 208 at a bottom-most location where the battery 240 may provide the presentation base 200 with a lower center of gravity, thereby increasing the stability of the presentation base 200 in physically supporting the reader 100 atop a substantially horizontal support surface atop which the presentation base 200, itself, may be supported.

Figure 4A:
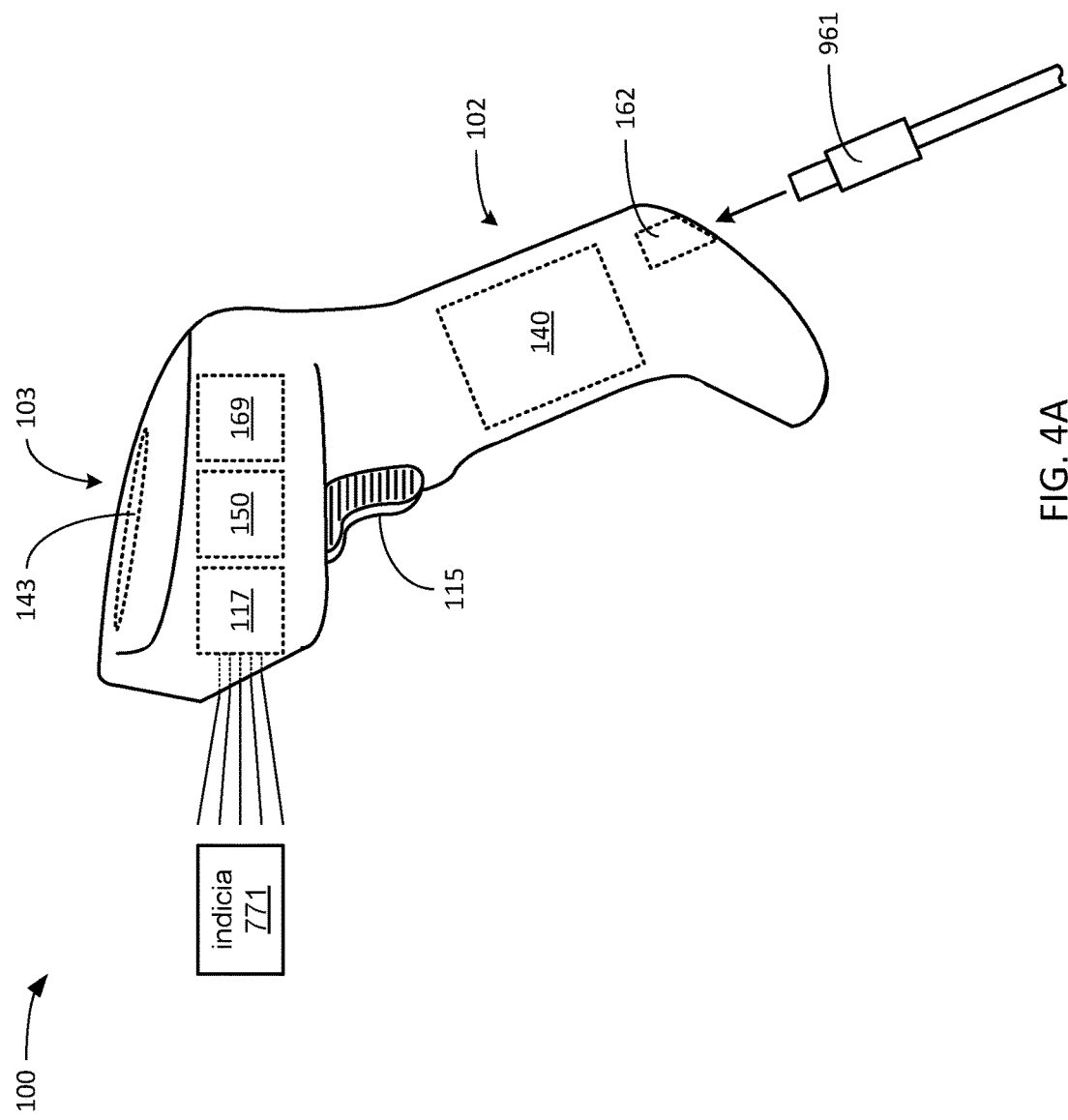
Figure 4C:
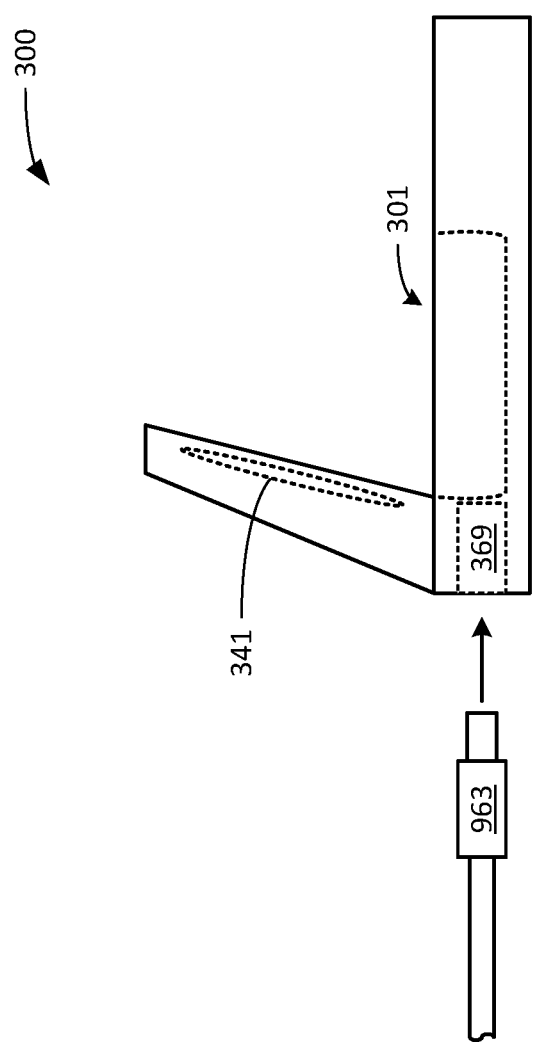
Figure 4D:
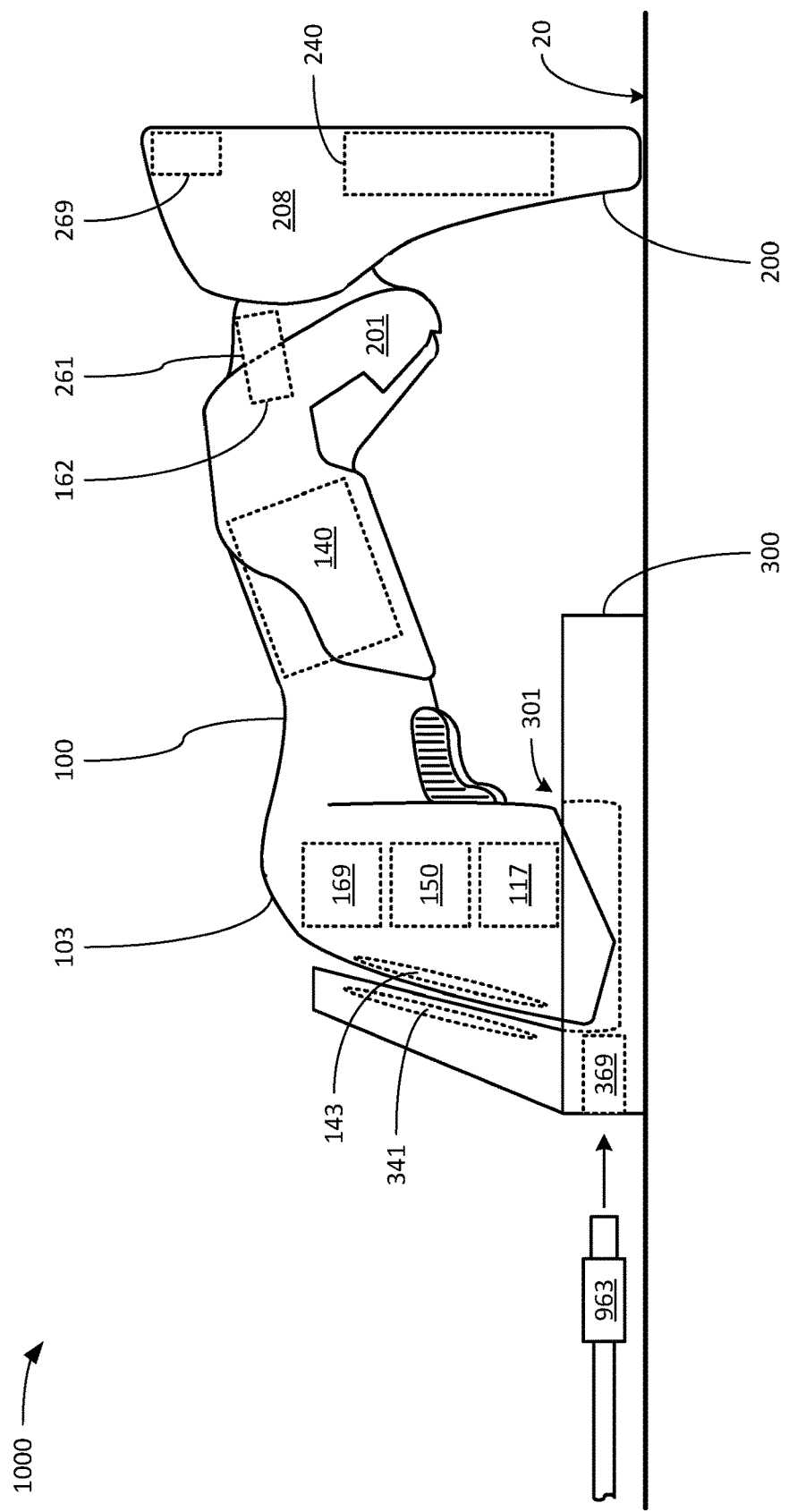

As depicted in FIGS. 4C and 4D, a single one of the cradle transmitting coil 341 of the charging cradle 300 may be positioned adjacent the receptacle 301 of the charging cradle 300 such that it becomes closely aligned with the depicted single one of the head receiving coil 143 of the reader 100 when the scanning head 103 of the reader 100 is inserted into the receptacle 301. Additionally, as depicted in FIG. 4D, when the scanning head 103 of the reader 100 is so inserted into the receptacle 301, such close alignment of the coils 341 and 143 may be aided and/or improved if the presentation base 200 is still releasably connected to the elongate handle 102 when the scanning head 103 is so inserted. More specifically, a part of the lower portion 208 that extends in a direction generally parallel to the direction in which the scanning head extends to enter into the receptacle 301 may engage the same support surface 20 that supports the charging cradle 300. Such engagement with the support surface 20 may cause the elongate handle 102 of the reader 100 to be pushed by a small distance further away from the support surface 20, to thereby cause a small amount of pivoting of the scanning head 103 within the confines of the receptacle 301, and thereby slightly rotate the depicted single head receiving coil 143 into a closer-spaced and more parallel alignment with the depicted single cradle transmitting coil 341.

Figure 4E:
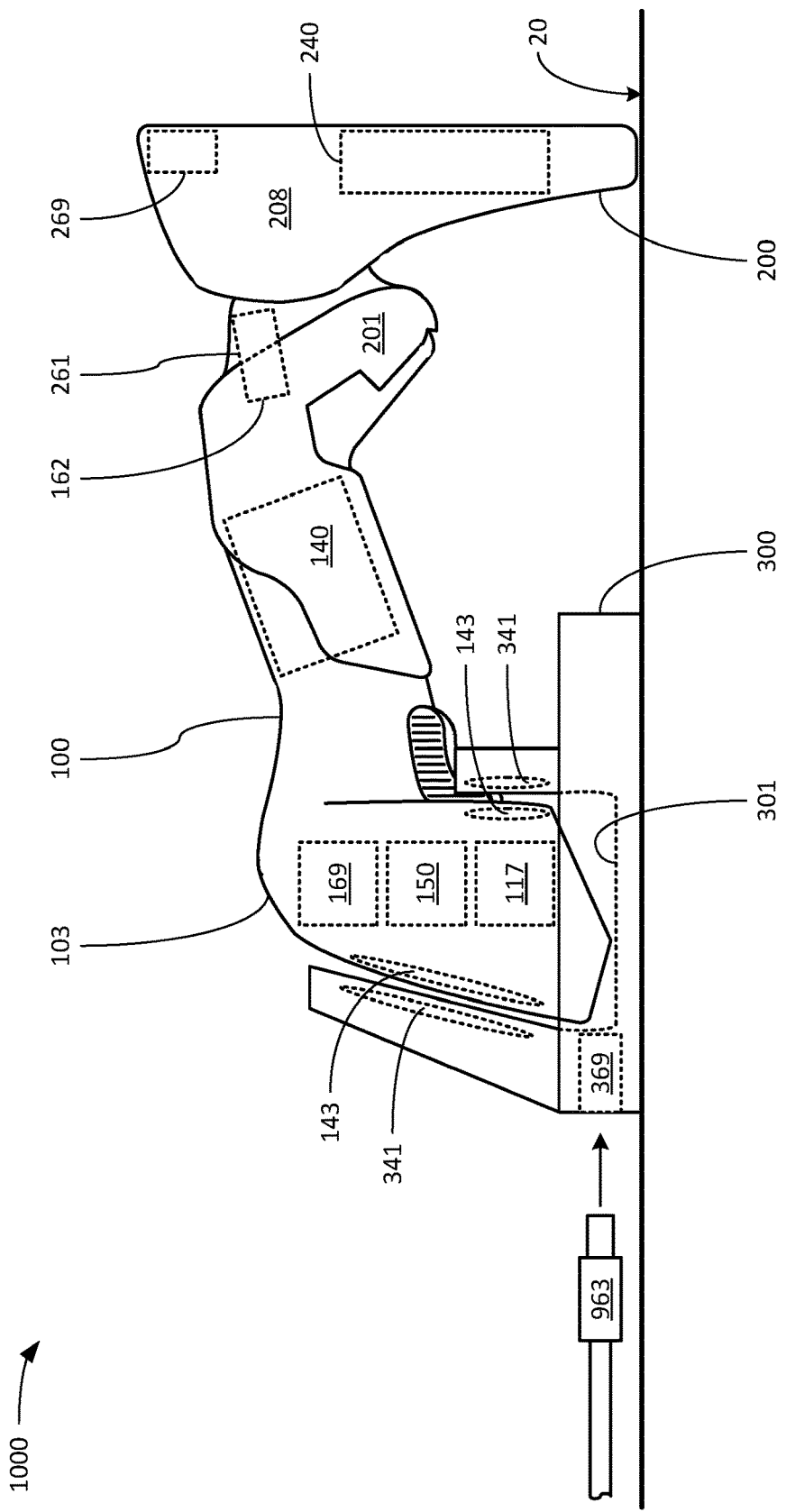

Alternatively, as depicted in FIG. 4E, instead of a single one of the cradle transmitting coils 341 and a single one of the head receiving coil 143, a pair of the cradle transmitting coils 341 of the charging cradle 300 may be positioned adjacent different portions of the receptacle 301 of the charging cradle 300 so as to become closely aligned with the depicted corresponding pair of the head receiving coil 143 positioned within different portions of the scanning head 103 of the reader 100 when the scanning head 103 of the reader 100 is inserted into the receptacle 301. Additionally, in a manner similar to what was depicted in FIG. 4D, when the scanning head 103 of the reader 100 is so inserted into the receptacle 301, such close alignment of the coils 341 and 143 may be aided and/or improved if the presentation base 200 is still releasably connected to the elongate handle 102 such that the lower portion 208 that extends in a direction generally parallel to the direction in which the scanning head extends to enter into the receptacle 301 may engage the same support surface 20 that supports the charging cradle 300.

As previously discussed in reference to FIG. 2F, the depicted pair of cradle transmitting coils 341 may be coupled in series to the cradle power transmitting circuit 342, and correspondingly, the depicted pair of head receiving coils 143 may be coupled in series to the head power receiving circuit 144 (or coupled in series through switching component(s) to a single power receiving circuit 145, as depicted in FIG. 2G). As will be explained in greater detail, in some embodiments where multiple transmitting coils or multiple receiving coils are coupled together in series, such multiple coupled coils may be similar characteristics (e.g., similar coil dimensions, similar inductance, similar number of turns of a conductor, similar DC resistance, similar thickness and/or cross section of conductor, etc.). However, other embodiments are possible in which multiple coils so coupled in series may be greatly differing characteristics, such as being of different dimensions in response to differences in available physical space into which each may be installed, as depicted in FIG. 4E, where more physical space may be available behind the uppermost exterior surface of the scanning head 103 than may be available behind the lowermost exterior surface of scanning head 103.

Regardless of the quantity of coils used in various embodiments, as previously discussed, the charging cradle 300 either may be supported atop a horizontal form of the support surface 20 or may be mounted by mechanical fasteners, adhesive and/or in other ways to a vertical form of the support surface 20. The engagement of the outwardly extending part of the lower portion 208 of the presentation base 200 may achieve the same improvement in alignment between the coils 143 and 341, regardless of whether the support surface 20 is oriented horizontally or vertically.

As another alternative, as depicted in FIG. 4F, instead of a pair of the head receiving coils 143 being positioned behind portions of the uppermost and lowermost external surfaces of the scanning head 103 of the reader 100, a pair of the head receiving coils 143 may be positioned behind portions of the leftmost and rightmost external surfaces of the scanning head 103 of the reader 100. Correspondingly, and as becomes clear by comparing the depiction of the charging cradle 300 in FIG. 4F to that of FIG. 4E, the corresponding pair of the cradle transmitting coils 341 of the charging cradle 300 may be positioned adjacent different portions of the receptacle 301 of the charging cradle 300 so as to be in the vicinity of the leftmost and rightmost external surfaces of the scanning head 103 when the scanning head 103 of the reader 100 is inserted into the receptacle 301.

FIG. 4F also depicts an example use of coils that are fabricated to have one portion that extends within a first plane and another portion that extends within a second plane that intersects the first plane. Such "bent" or "folded" coils may be used in embodiments of the reader 100 at locations where there is a bend, curve, fold or other form of convolution in the external surface, such as behind the folds depicted in FIG. 4F as present in the leftmost and rightmost external surfaces of the scanning head 103. As also depicted, the receptacle 301 of the charging cradle 300 may be shaped to enable the use of corresponding bent or folded coils. More specifically, where each of the coils of the pair of head receiving coils 143 and cradle transmitting coils 341 is such a bent or folded coil, each of the cradle transmitting coils 341 may be positioned adjacent the receptacle 301 in an orientation that causes both planes to be aligned with the corresponding two planes within its corresponding one of the head receiving coils 143 when the scanning head 103 is inserted into and releasably retained within the receptacle 301.

FIG. 4G also depicts an example use of coils shaped to extend within a curved plane (or other form of curved surface). In a manner similar to the bent or folded coils depicted in FIG. 4F, such curved coils as depicted in FIG. 4G may be used in embodiments of the reader 100 at locations where there is a bend, curve, fold or other form of convolution in the external surface. Also in a manner similar to what is depicted in FIG. 4F, the charging cradle 300 may be shaped to enable the use of corresponding ones of such curved coils. More specifically, where each of the coils of the pair of head receiving coils 143 and cradle transmitting coils 341 is such a curved coil, each of the cradle transmitting coils 341 may be positioned adjacent the receptacle 301 in an orientation that causes the curved shape of the cradle transmitting coils 341 to extend along a curve that follows the curved shape of the head receiving coils 143 so as to cause a selected distance to be maintained therebetween throughout the overlapping portions thereof when the scanning head 103 is inserted into and releasably retained within the receptacle 301.

FIG. 5 depicts aspects of an embodiment of the system 1000 in which the reader 100 may incorporate a pair of the handle receiving coils 142 in lieu of at least the handle electrical connector 162 to support wireless recharging of the battery 140 from electric power provided wirelessly by the presentation base 200. As depicted in FIGS. 5A and 5B, the pair of handle receiving coils 142 may be positioned close to and just behind oppositely facing external surfaces (specifically, left and right facing surfaces of oppositely facing left and right sides) of the elongate handle 102 at a location close to the end that is received within the upper portion 201 of the presentation base 200. In some embodiments, advantage may be taken of the fact that the battery 140 may be co-located with the handle receiving coils 142 within the same general part of the elongate handle 102 to configure the battery 140 to carry the pair of handle receiving coils 142 on opposite sides of the battery 140. This may be deemed electrically advantageous as the combination of the battery 140 and the pair of handle receiving coils 142 may additionally incorporate the electronics required (e.g., the handle power receiving circuit 141) to generate a DC current flow for the recharging of the battery 140 from the pair of handle receiving coils 142.

Figure 5A:
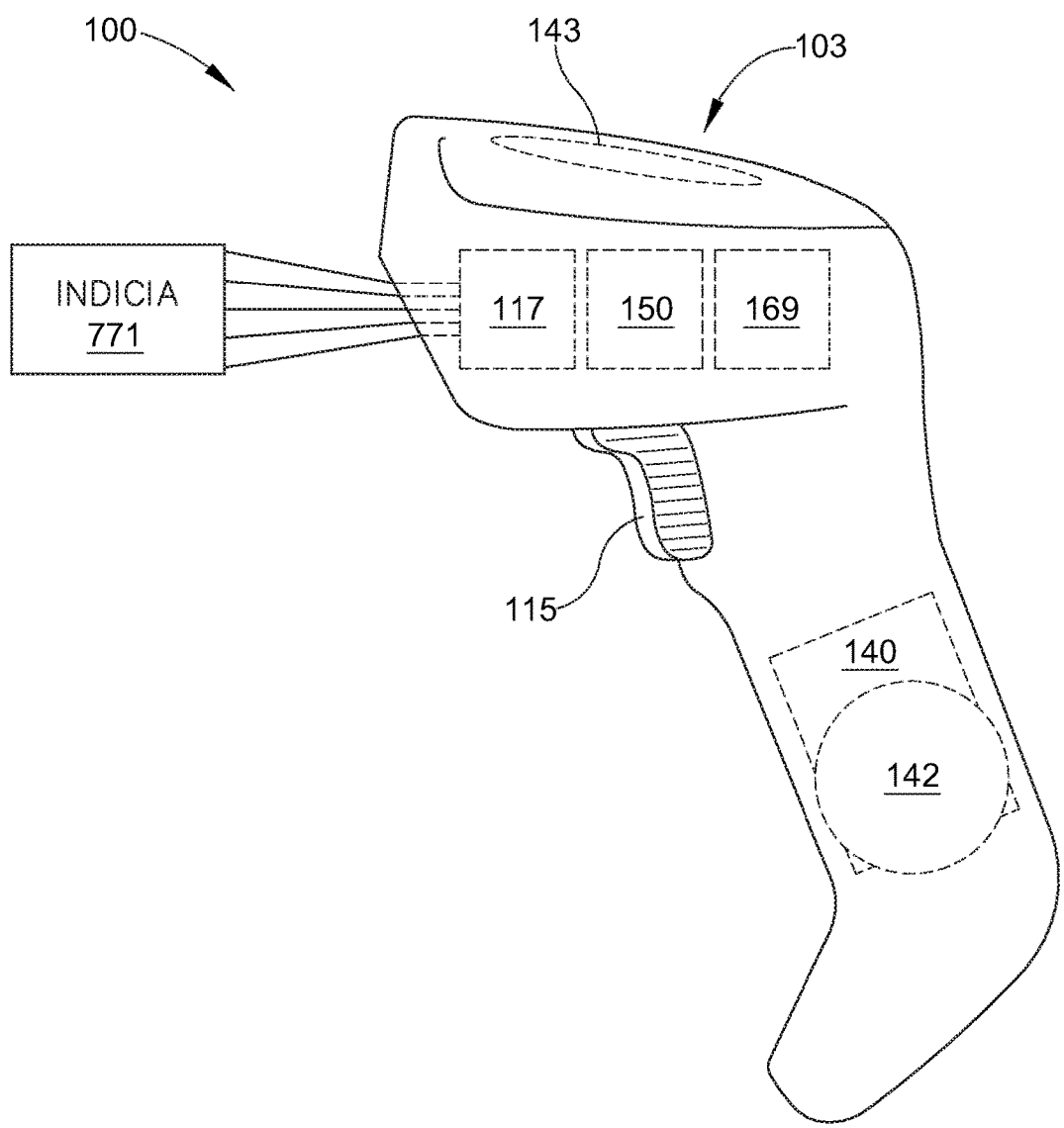
Figure 5B:
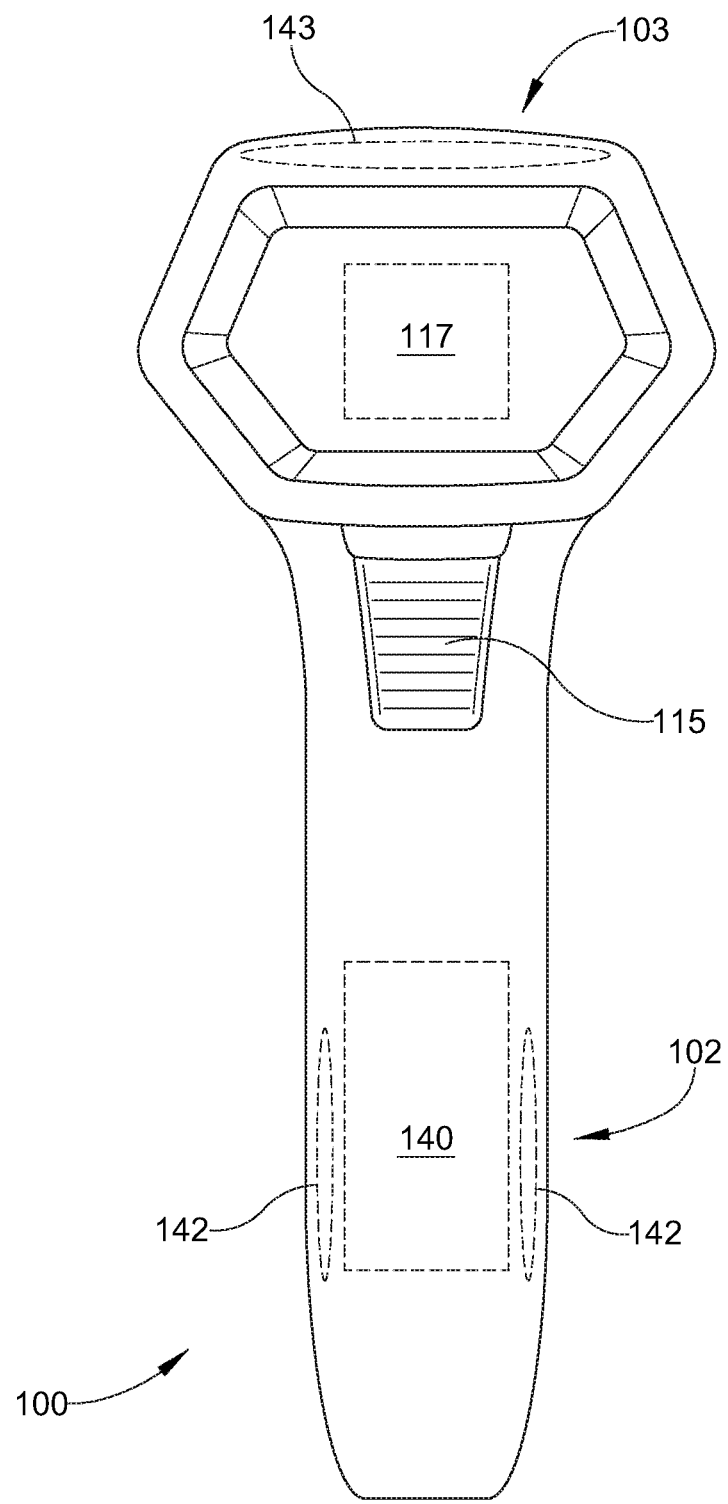
Figure 5C:
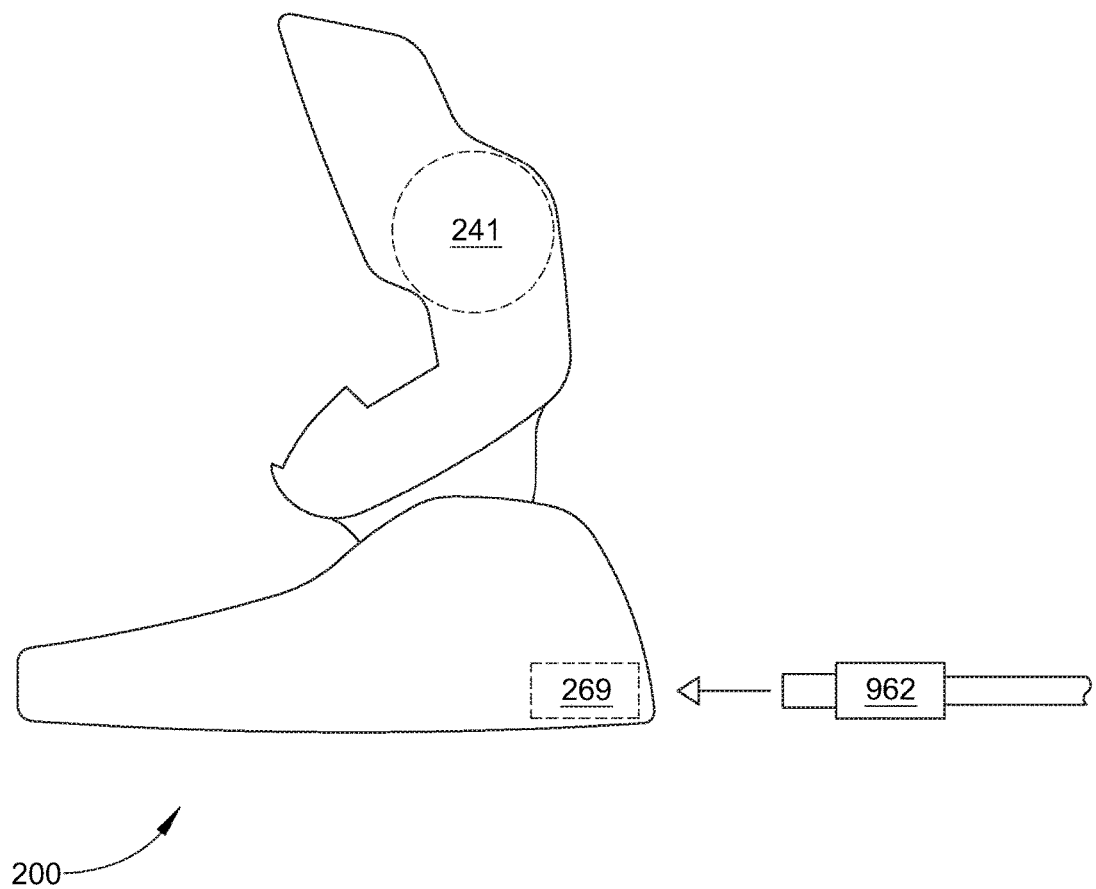
Figure 5D:
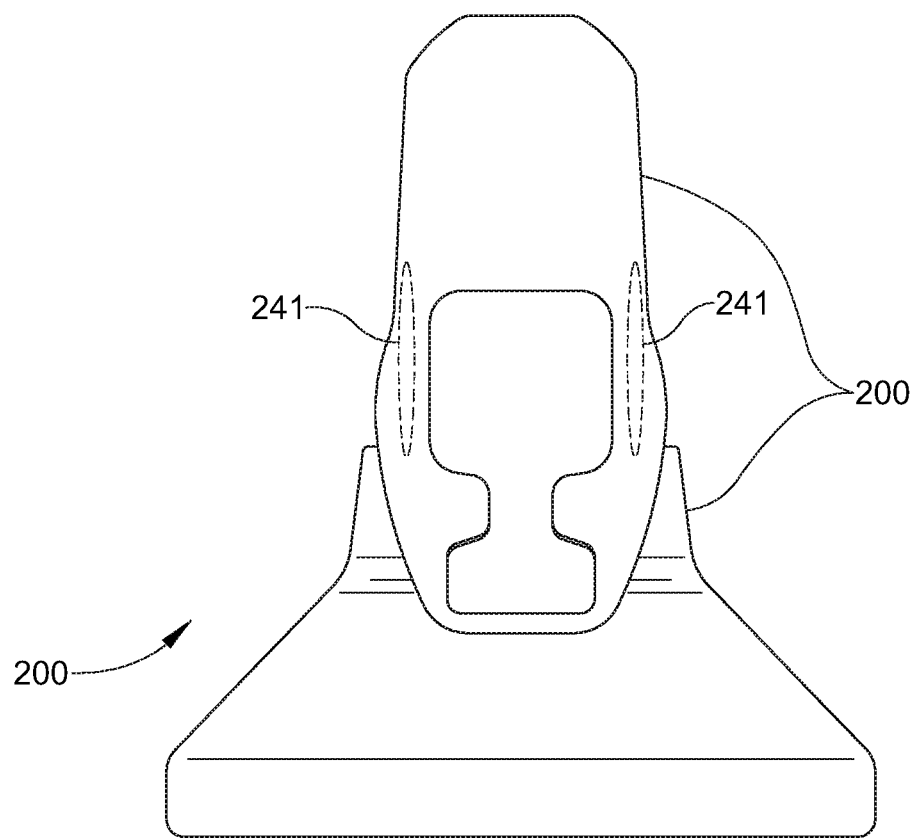
Figure 5E:
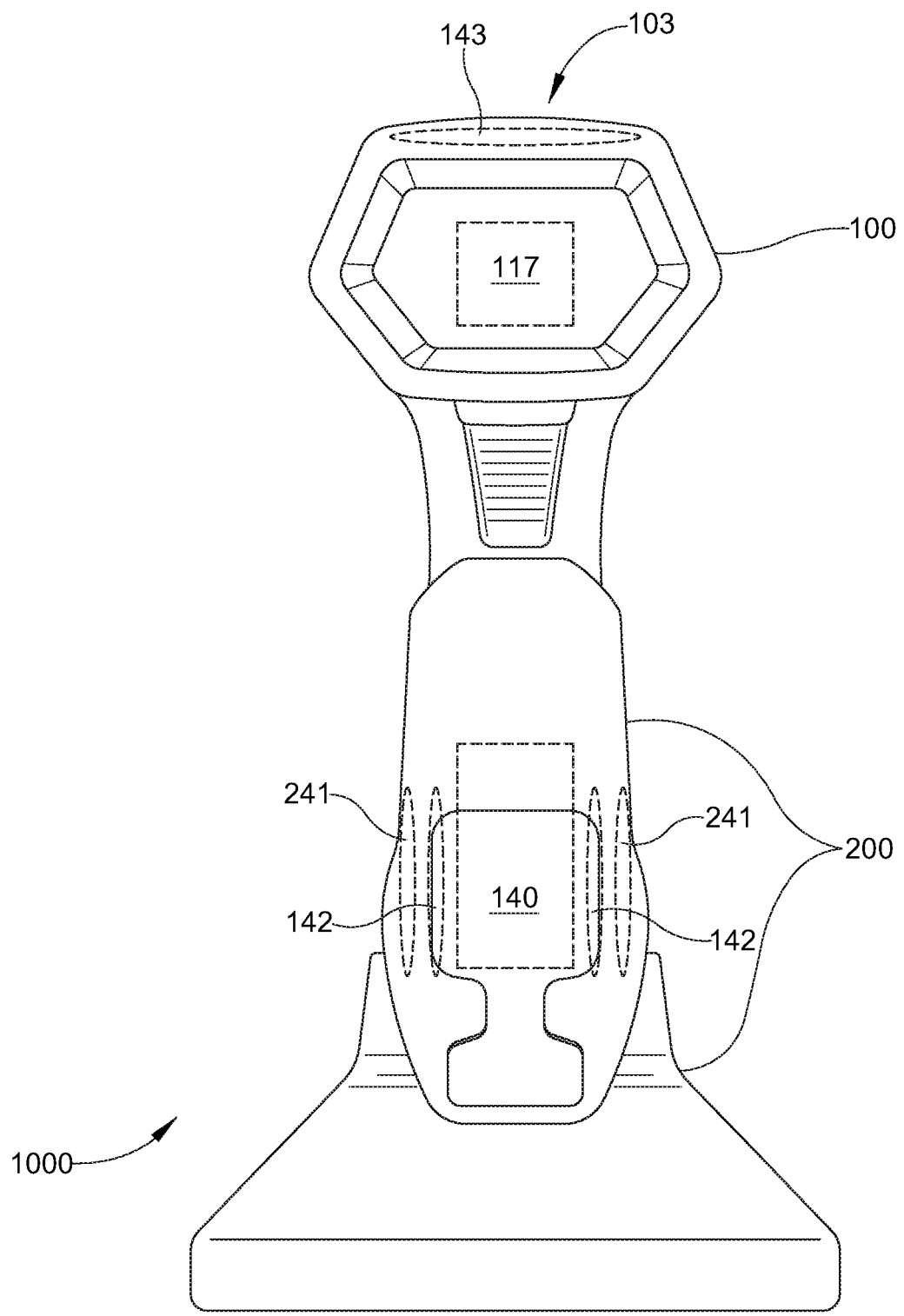

As depicted in FIGS. 5C and 5D, the pair of base transmitting coils 241 may be positioned within opposed walls of the upper portion 201 of the presentation base 200 (specifically, left and right side walls). Such positioning may be selected to cause each of the base transmitting coils 241 to become closely aligned with one of the handle receiving coils 142 when the elongate handle 102 of the reader 100 is inserted into and releasably retained within the upper portion 201, as depicted in FIG. 5E.

It should be noted that the use of a pair of the handle receiving coils 142, within the elongate handle 102 may be deemed more desirable than a single one of the handle receiving coils 142 due to the relatively small amount of surface area of any relatively flat surface that may be provided by the shape of exterior of the elongate handle 102. As familiar to those skilled in the art, the amount of coextending parallel surface area between a transmitting coil and a receiving coil may be a significant factor in determining how much electric power is able to be conveyed therebetween.

FIG. 5F provides a cross-sectional view of the elongate handle 102. Although much of the discussion and depiction of various ones of the coils 142, 143, 241 and/or 341 herein centers on embodiments thereof in which one or more portions extend in one or more flat planes (e.g., a single flat plane, or two flat planes that intersect at an angle), FIG. 5F depicts an example of an alternate implementation in which at least a portion of such coils may be formed to extend within and/or define a curved plane (e.g., a curved surface akin to a flat plane that has been "rolled up" such as was depicted in FIG. 4G), or that may be formed to extend within and/or define a more complex curved surface (e.g., a convex or concave surface), or that may be formed to extend within and/or define a still more complex shape.

As also depicted in FIG. 5F (and as was also discussed in reference to FIG. 4G), the curve of one coil of a matched pair of transmitting and receiving coils may be shaped and/or oriented to follow the curve of the other. As familiar to those skilled in the art, the strength of a magnetic field decreases as the distance from its source increases. Causing the curve of one of such a matched pair of coils to follow the curve of the other may be done maintain a single consistent distance (as measured along a line that extends perpendicularly to the curve of each of the coils) to be maintained across the entirety of the portions of the surfaces of the two coils that directly face each other. In a manner similar to what was discussed in relation to FIG. 4G about using curved coils to accommodate a fold, curve or other convolution in the exterior of the head 103, FIG. 5F depicts the manner in which curved coils may be used to accommodate a generally round or oval-shaped cross-section of the elongate handle 102. Indeed, as further depicted in FIG. 5F, with such relative positioning of the handle receiving coils 142, the exterior surfaces of the adjacent sides of the elongate handle 102 and the base transmitting coils 241, that it may be possible for a set of corresponding tangent planes T, U and V, respectively, (edge views of each of which are shown) to extend in parallel to each other.

Figure 5G:
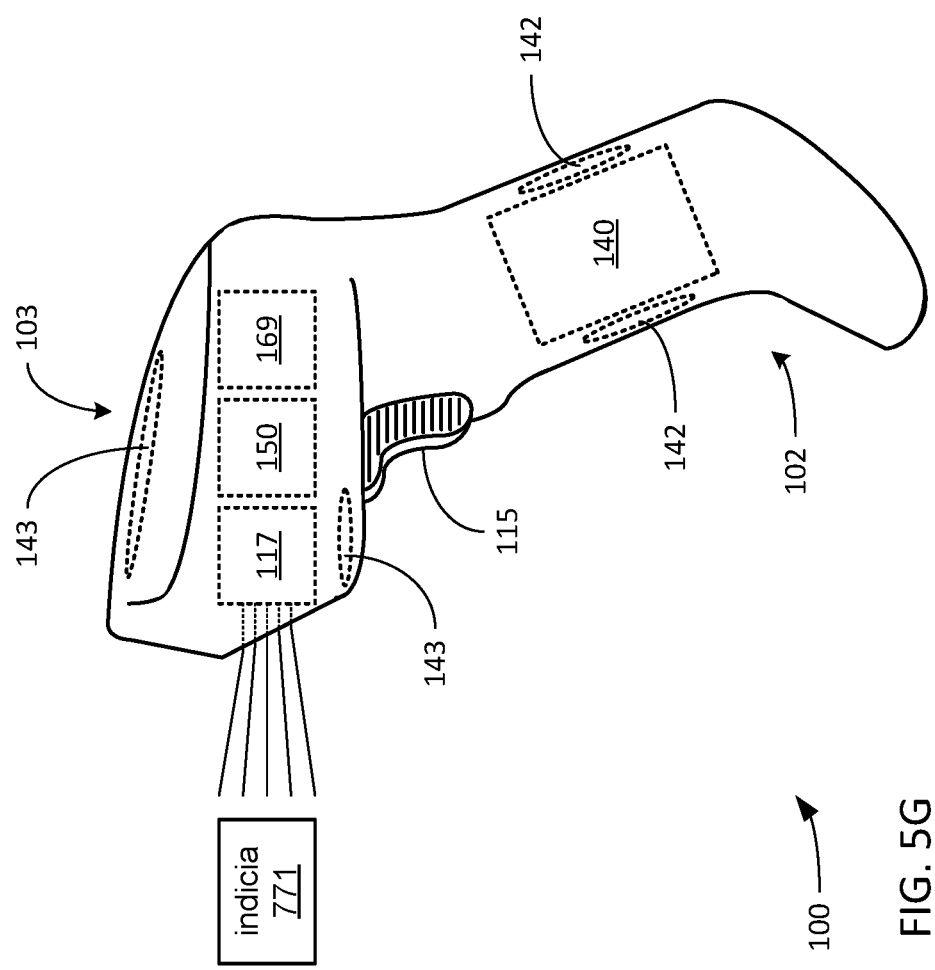
Figure 5H:
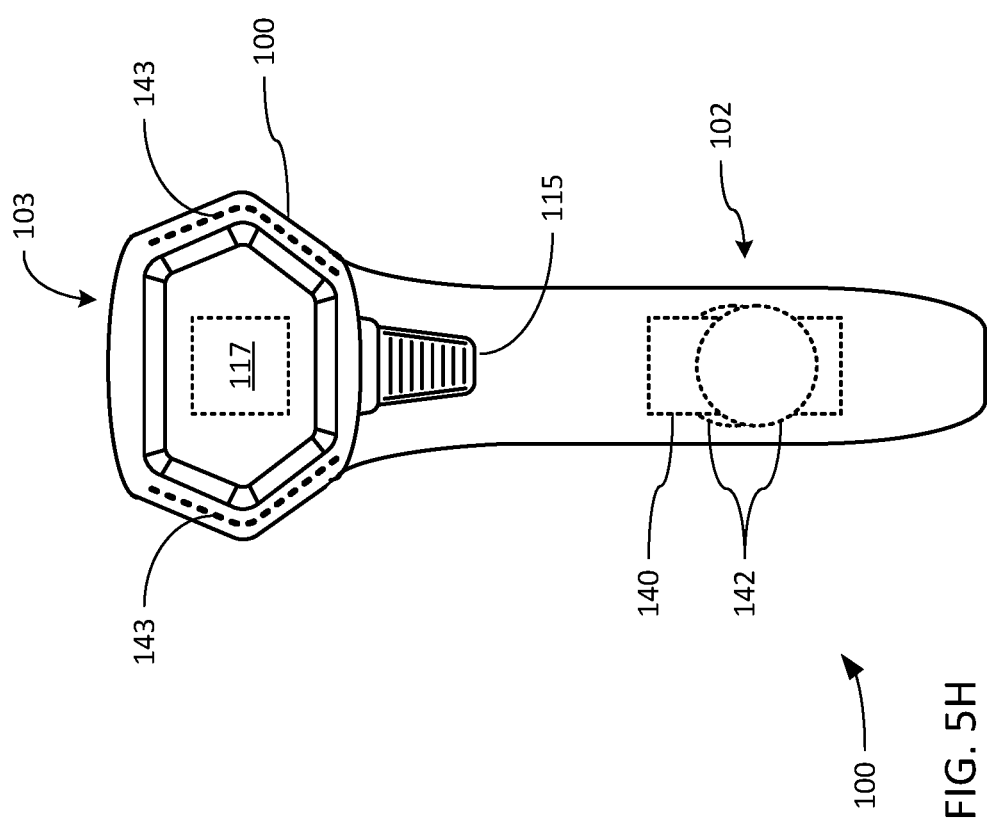

As depicted in FIGS. 5G and 5H, as an alternative to the positioning of the pair of handle receiving coils 142 behind left and right facing external surfaces of the elongate handle 102, in other embodiments, the pair of handle receiving coils 142 may be positioned behind front and rear facing external surfaces of the elongate handle 102. Again, in some of such embodiments, advantage may be taken of the fact that the battery 140 may be co-located with the handle receiving coils 142 within the same general part of the elongate handle 102 to configure the battery 140 to carry the pair of handle receiving coils 142 on opposite sides of the battery 140.

Although not specifically shown, corresponding to such positioning of the pair of handle receiving coils 142 behind such front and rear facing external surfaces, a corresponding pair of the base transmitting coils 241 may be positioned within opposed front and rear walls of the upper portion 201 of the presentation base 200. Such positioning may be selected to cause each of the base transmitting coils 241 to become closely aligned with one of the handle receiving coils 142 when the elongate handle 102 of the reader 100 is inserted into and releasably retained within the upper portion 201.

Figure 6B:
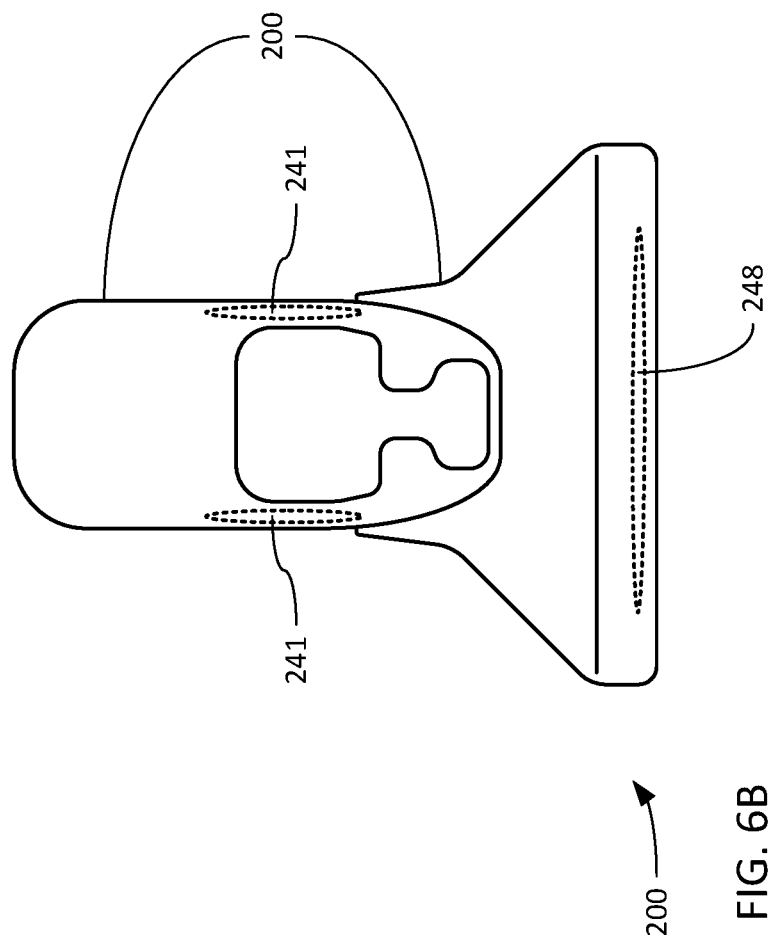

FIG. 6 depicts aspects of an embodiment of the system 1000 in which, in addition to the reader 100 incorporating the pair of the handle receiving coils 142 as discussed in reference to FIG. 5, the presentation base 200 may incorporate the base receiving coil 248 in lieu of at least the lower base electrical connector 269 to support the provision of electric power to the presentation base 200 from the charging pad 800. As depicted in FIGS. 6A and 6B, the base receiving coil 248 may be positioned close to and just behind the bottom-most surface of the presentation base 200 by which the presentation base 200 may be supported atop a support surface, such as the support surface 20 or the charging pad 800.

Figure 6C:
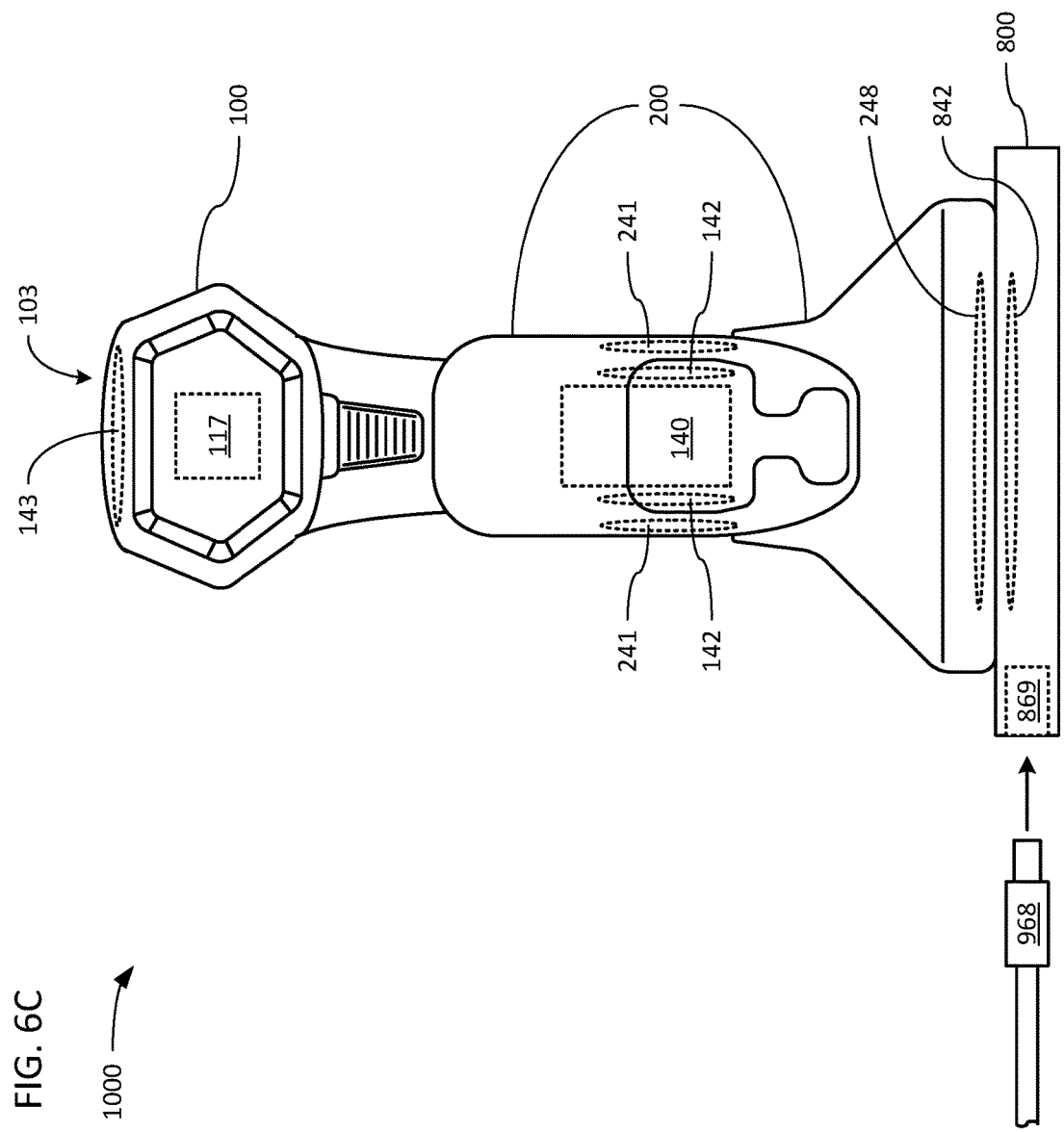

As depicted in FIG. 6C, with such an embodiment of the presentation base 200 supported atop the charging pad 800, the base receiving coil 248 is put into close and parallel alignment with the pad transmitting coil 842 of the charging pad 800. As also depicted, the charging pad 800 may receive the electric power that it wirelessly conveys to the presentation base 200 via the pad electrical connector 869 and a cable 968 connected thereto that is also connected to the POS device 900.

In some embodiments, the base receiving coil 248 and/or other aspects of the manner in which the presentation base 200 wirelessly receives electric power may be configured to adhere to one or more industrial standards for the wireless transmission of electric power promulgated by the Wireless Power Consortium of Piscataway, N.J., USA. This may be done based on a presumption that at least the majority of implementations of the charging pad 800 atop which the presentation base 200 may be supported may generate an electromagnetic field for the wireless transmission of electric power in a manner that conforms to specifications for one or more of such standards.

Figure 7A:
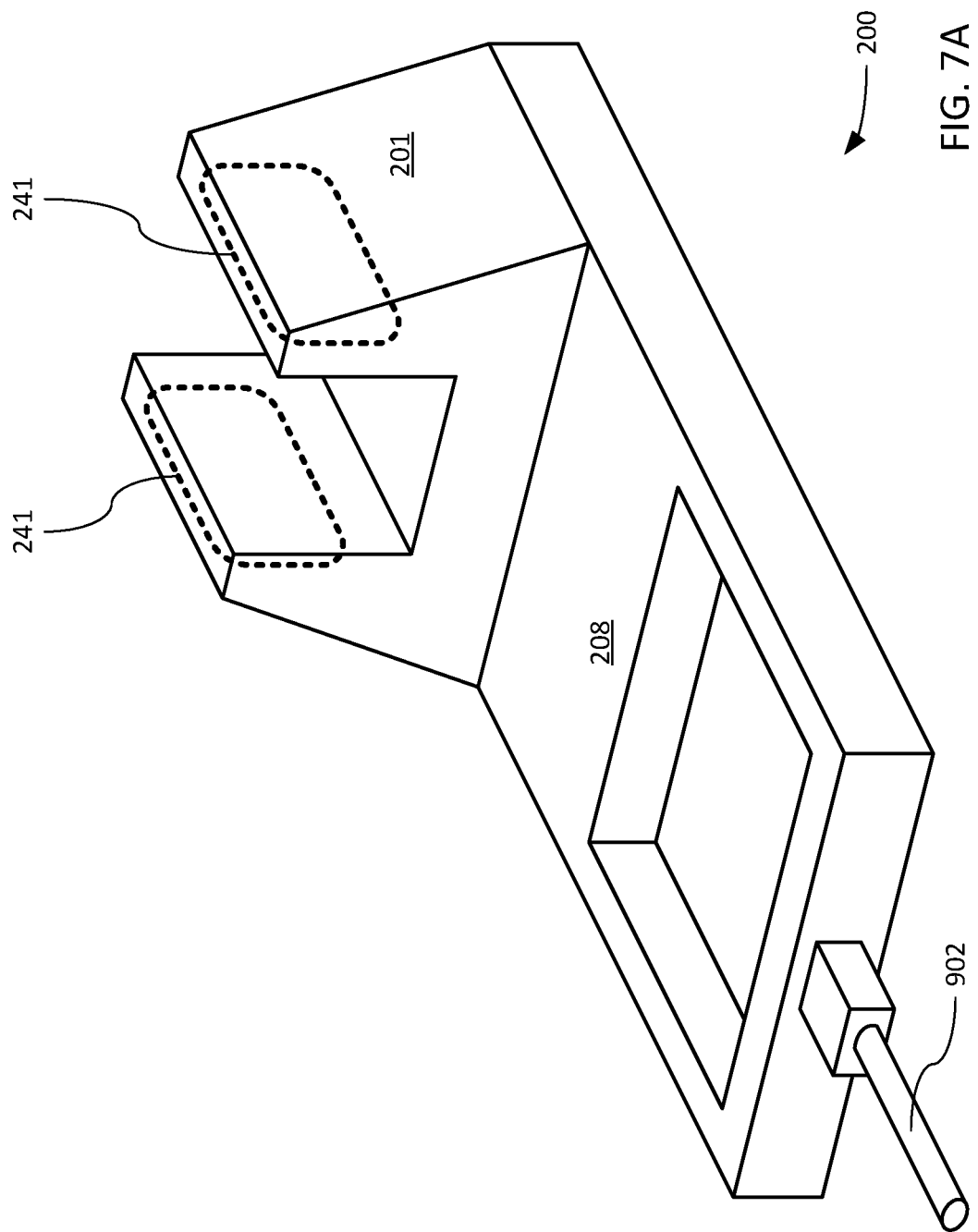
FIGS. 7A and 7B, collectively referred to herein as FIG. 7, are depictions of a fifth handheld scanning device configuration of the system of FIG. 1.
Figure 7B:
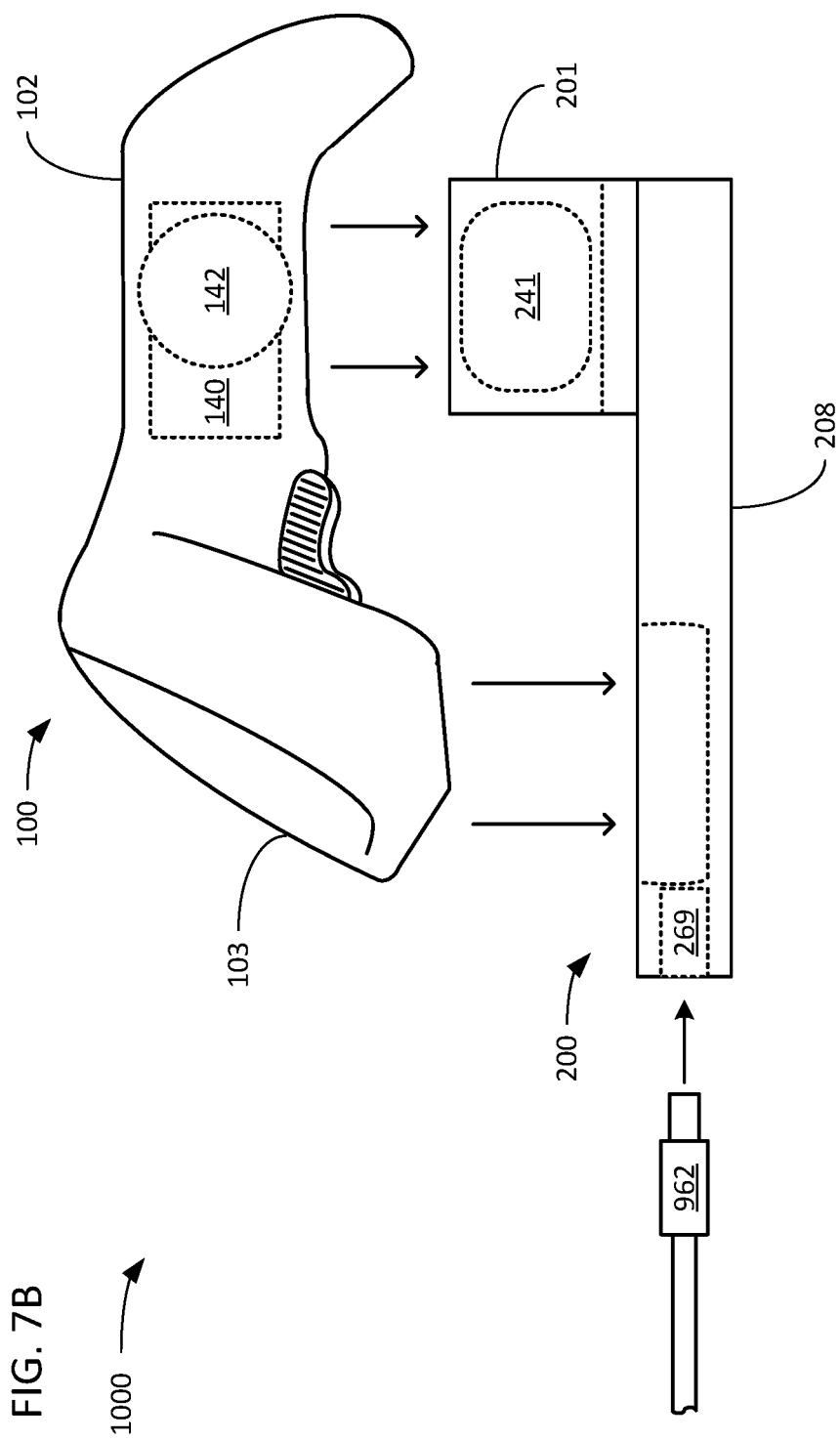

FIG. 7 depicts aspects of an alternate embodiment of the system 1000 in which the reader 100 incorporates a pair of the handle receiving coils 142 in a manner similar to the embodiment of FIG. 5, but in which wireless recharging of the battery 140 is performed using a different embodiment of a base 200. In a manner similar to FIGS. 5A and 5B, as depicted in FIGS. 7A and 7B, the pair of handle receiving coils 142 may be positioned close to and just behind oppositely facing external surfaces (specifically, left and right facing surfaces of oppositely facing left and right sides) of the elongate handle 102. However, unlike the presentation base 200 in which the reader 100 is supported by the elongate handle 102 in a presentation mode that enables the reader 100 to be used to scanned indicia while maintained in a stationary position atop a support surface, the scanning head 103 of the reader 100 in the non-presentation base 200 of FIGS. 7A and 7B support the scanning head 103 within a receptacle of the non-presentation base 200 such that the reader 100 cannot be used to scan indicia. Such a configuration of non-presentation base 200 may be deemed desirable in a situation in which there is a need to recharge the battery 140 at a location other than atop an accessible surface atop which there is room available for the scanning of indicia, such as on a shelf, or with the non-presentation base 200 mounted on a wall in a vertical orientation.

FIG. 8 depicts aspects of the use of multiple transmitting and receiving coils in series, and of the use of coils that include different portions that extend within different intersecting planes. More specifically, FIGS. 8A and 8B, taken together, contrast aspects of the prior art use depicted in FIG. 8A of only a single coil with each power transmitting circuit or power receiving circuit with the use depicted in FIG. 8B of more than one coil coupled in series with a power transmitting circuit or power receiving circuit. FIG. 8C depicts aspects of a "bent" or "folded" coil in which each of two portions of the coil extends in a different plane, and FIG. 8D depicts aspects of aligning one of such coils used in transmitting electric power with another of such coils used in receiving the transmitted electric power. FIG. 8E depicts aspects of a curved coil in which at least a portion of the coil extends in a curved plane.

As will be familiar to those skilled in the art, coils of the type that are typically used in wirelessly conveying electric power are planar coils that are typically formed from a conductor formed into a spiral configuration that extends within a single plane—not unlike the spiral form of typical electrically driven ceramic heating elements of commonplace electric cooktops and plate warmers. This planar spiral configuration differs from coils made for most other applications in which a conductor is formed into a generally tube-like configuration that may or may not surround an elongate core formed from a rod-like piece of metal. Although it is commonplace to form planar spirals to have a generally circular peripheral shape, other peripheral shapes may be and often are formed, including and not limited to, various oval shapes, and various polygonal shapes (e.g., a square, a pentagon, a hexagon, an octagon, a rectangle, a rhombus, a trapezoid, etc.) that may have either pointed or rounded corners. The exact shape and dimensions of the periphery of such a coil is often determined by the shape and dimensions of the physical space that is available within a portion of the casing of a device into which the coil is to be installed.

When operated to wirelessly transmit electric power, such a planar coil is typically driven with an oscillating current of a selected frequency that causes the generation of an electromagnetic field that oscillates at that same selected frequency. A significant portion of the oscillating electromagnetic field flows back and forth in a direction that is perpendicular to the plane in which the planar spiral extends. In some coils, more than one of such planar spirals may be formed, and each such spiral may be treated as a layer with the coil being assembled by "stacking" two or more of such layers together such that the planes of each such layer extend adjacent to each other and in parallel. With such stacking, that same significant portion of the oscillating electromagnetic field flows back and forth in a perpendicular direction through all of the two or more layers from which the coil is so assembled. It is due to this behavior that even a multilayer form of such a coil is still often depicted, discussed and treated in various analyses as if it were a coil formed from a single spiral of a conductor that extends within a single plane.

The inductance of such a planar coil is determined largely by the number of turns or windings of the conductor used to make the coil. The DC resistance of such a planar coil is determined largely by the thickness or gauge of the conductor used to form the spiral. The efficiency of such a planar coil is inversely correlated to its DC resistance. Thus, a thicker conductor begets decreased DC resistance, and accordingly, begets increased efficiency. As a result, a planar coil formed from a thinner conductor is less efficient such that it generates more heat due to the higher DC resistance of the thinner conductor. Thus, it may be deemed preferable to form a planar coil used in transmitting or receiving electric power from a thicker conductor, if possible. However, the use of a thicker conductor unavoidably increases the dimensions of the periphery of the coil, and it may be that the device into which the planar coil is to be installed is not be able to provide the physical space required to accommodate such increased dimensions.

The use of planar coils to wirelessly provide electric power has become increasingly commonplace for an increasing variety of portable electronic devices. Many portable electronic devices are employed in environments in which there is a preference for avoiding the use of electrical connectors and cabling to convey electric power and/or other electrical signals. Indeed, the Wireless Power Consortium now promulgates the "Qi" wireless power specification, which was created as part of an effort across multiple industries to standardize various wireless power provision parameters. The intention is to enable the benefits of economies of scale to be realized such that manufacturers of portable electronic devices have greater access to less expensive and more easily interoperable components (e.g., so-called "off-the-shelf" components), including and not limited to, planar coils, power transmitting circuits and power receiving circuits that adhere to a set of standardized characteristics.

Unfortunately, built into this standard, as well as other similar standards that have been proposed, is an assumption that there will always be a separate power transmitting circuit or separate power receiving circuit for each coil. FIG. 8A depicts this prior art approach. This assumption seems to be based on the fact that the vast majority of portable devices that may use wireless provisioning of electric power are often so small in their physical dimensions that providing space within their casings for even a single planar coil for use in wirelessly receiving electric power can be a considerable challenge. Unfortunately, this assumption results in the lack of consideration of alternate solutions that may be more appropriate for other portable devices in which the provision of space for planar coils, though not necessarily easy, is not quite as challenging.

More specifically, a review of many of the figures of the present application reveals that, despite the desirability of making the casing of the reader 100 as small as possible to enhance portability, the fact that the reader 100 is given a physical configuration that is intended to be held comfortably within an adult-sized hand in a manner somewhat akin to a hand-held gun results in the various depicted embodiments of the reader 100 having a casing in which there is space available for planar coils to be installed. Instead, the reader 100 is subject to a somewhat different challenge in which there is the lack of easily usable locations within the casing into which a single relatively large planar coil may be installed. However, the fact of the various depicted embodiments of the reader 100 having considerable left-right symmetry in its physical configuration results in the casing of each of the embodiments of the reader 100 depicted herein as having pairs of symmetrically similar locations into which a pair of planar coils may be installed.

It should be noted that the "Qi" specification and/or other standards for the wireless provision of electric power could be used to take advantage of the fact of that there are such symmetric pairs of locations into which planar coils may be installed. However, such use of such standards would entail the installation of a separate power receiving circuit for each power receiving coil so installed. Additionally, still more circuitry would be required to combine the multiple DC outputs of the multiple power receiving circuits. Thus, following the approach depicted in FIG. 8A may be deemed undesirable for the reader 100.

Fortunately, through some considerable experimentation, it has been determined that at least some of the benefits of economies of scale made possible by such wireless power provision standards may still be realized by coupling multiple coils to power receiving circuits and/or to power transmitting circuits in series. More precisely, it has been found that a power transmitting circuit or a power receiving circuit designed to conform to the "Qi" specification may be used, without any modification, with multiple planar coils by coupling the multiple planar coils to it in series, and by ensuring that the sum of the inductances of the multiple planar coils falls within a range of values for inductance that such a power receiving circuit was designed to support as a result of having been designed to be coupled to a single planar coil that would also be designed to conform to the "Qi" specification.

Figure 8B:
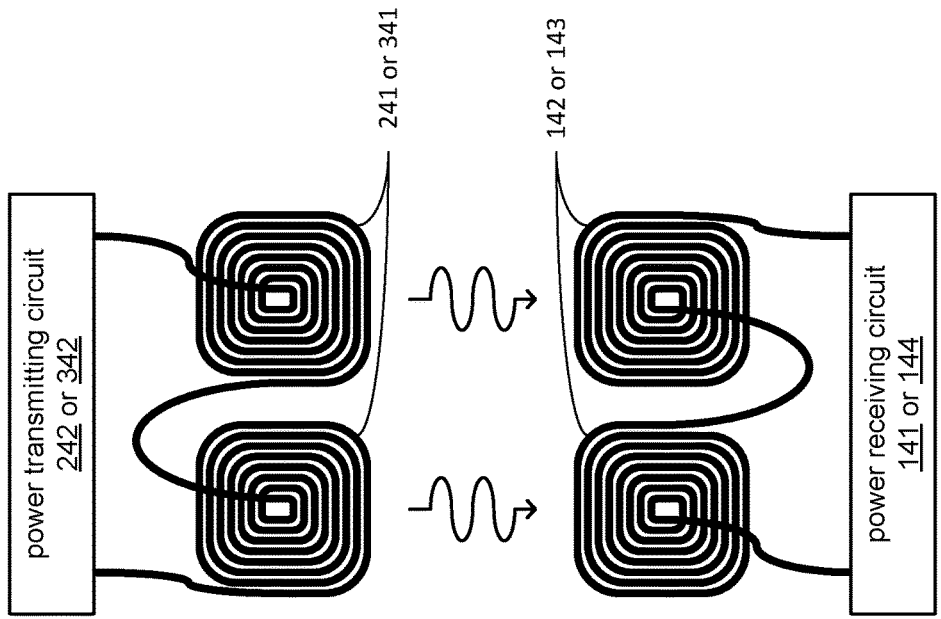
Figure 8A:
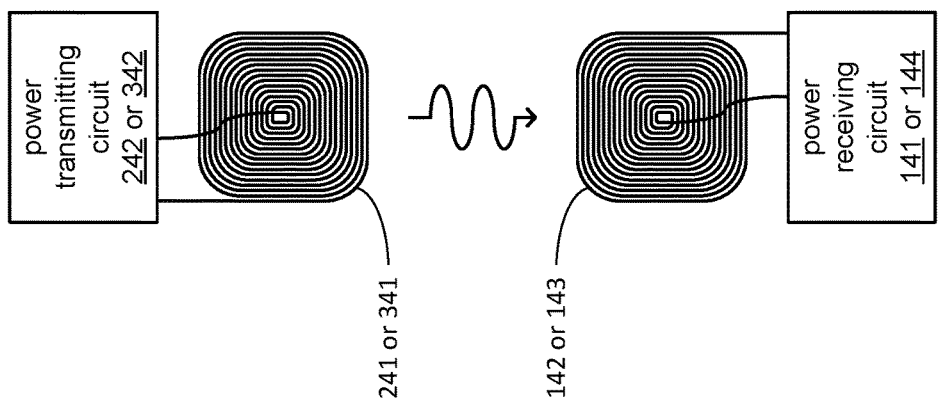

Thus, as has been depicted in some of FIGS. 4-6, pairs of receiving coils 142 and/or 143 may be installed within symmetrically similar portions of the casing of the reader 100, and each such pair may be coupled to a single power receiving circuit 141 or 144, respectively, as depicted in FIG. 8B. Correspondingly, pairs of transmitting coils 241 or 341 may be installed in corresponding portions of the charging cradle 300 and/or of the presentation base 200, and each such pair may be coupled to a single power transmitting circuit 242 or 342, respectively, as also depicted in FIG. 8B.

Since the sum of the inductances of each such pair of coils, being connected in series to a power transmitting circuit or a power receiving circuit, must fall within the range of what inductances were expected with a single coil by the manufacturers of those circuits, the inductance of each coil in the pair of coils must be a lesser value. As a result of the aforedescribed correlation between inductance and number of turns or windings in a planar coil, such a need for a lower inductance results in a need for fewer turns or windings of the conductor within each of the coils in the pair of coils. This may lead to an opportunity to use a thicker conductor, thereby lowering the DC resistance of each coil of the pair of coils. Such a reduction in DC resistance within each coil may, in turn, lead to an increase in efficiency for each coil, and the increase in efficiency has been found to be enough to compensate for the use of two coils in series. Indeed, a comparison of the coils depicted in each of FIGS. 8A and 8B reveals that each of the coils in each pair coils depicted in FIG. 8B has fewer turns or windings of a conductor, and the conductor so used is thicker.

Such greater efficiencies per coil in a pair of coils coupled to a power receiving circuit in series may add an increased degree of safety to the design of the reader 100 and/or increase the lifespan of various components of the reader 100. By way of example, and turning to FIGS. 5A-B and 5E-G in which the battery 140 is located adjacent to a pair of the handle power receiving coils 142, the fact that each coil of the pair is more efficient results in each coil emitting less heat in the vicinity of the battery 140. As those skilled in the art will readily recognize, many types of rechargeable battery are not able to be recharged and/or may become prone to leakage and/or catching fire when at a temperature above a particular threshold temperature. A single less efficient power receiving coil located adjacent to the battery 140 may provide a point heat source of sufficient heat output as to raise the temperature of the battery 140 beyond such a threshold. However, the use of a pair of the power receiving coils 142 that are each more efficient as a result of the use of thicker conductors results in an overall lesser output of heat adjacent to the battery 140, and also results in a spreading out of the overall smaller amount of heat that is produced, thereby avoiding a single point source of any significant amount of heat.

It should be further noted that, in embodiments of the reader 100 in which two or more receiving coils are used within the elongate handle 102 or within the scanning head 103, it may be deemed desirable to avoid, or to at least minimize, any magnetic coupling thereamong. As will be familiar to those skilled in the art, where multiple receiving coils are allowed to be magnetically coupled to each other, their otherwise separate magnetic fields may interfere with each other in a manner that degrades the efficiency that may otherwise be achieved in the wirelessly conveyance of electric power thereto. Similarly, it may also be deemed desirable to avoid, or to at least minimize, any magnetic coupling among multiple transmitting coils within the base 200 (either of the presentation or non-presentation variants) or the charging cradle 300. In some embodiments, the two or more receiving coils within a portion of the reader 100 may simply be positioned at locations sufficiently distant from each other as to avoid such magnetic coupling. Alternatively or additionally, such multiple receiving coils may be oriented relative to each other as to take advantage of directional aspects of magnetic fields (e.g., directions of flow of magnetic flux) to avoid such magnetic coupling, and/or any of a variety of types of shielding may be employed therebetween (e.g., use of one or more pieces of mu-metal). Correspondingly, in some embodiments, one or more of such approaches may be similarly used to avoid such magnetic coupling among two or more transmitting coils.

Figure 8D:
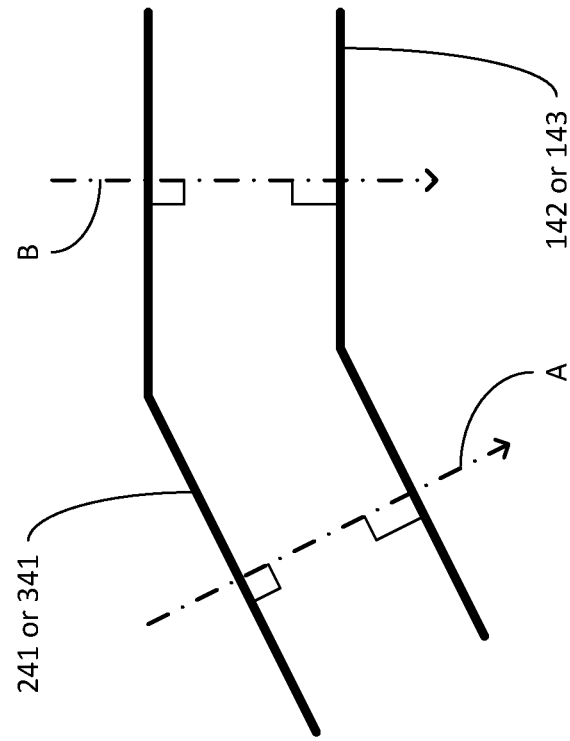
Figure 8C:
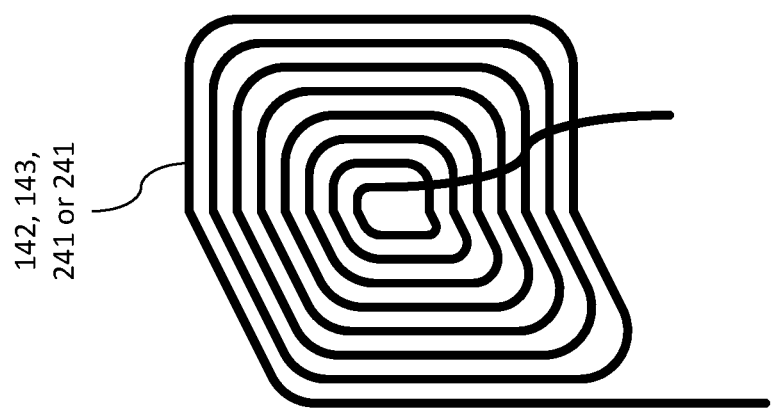

Turning to FIGS. 8C and 8D, as was discussed in reference to FIG. 4F, some symmetrical pairs of locations within the casing of the reader 100 may be appropriate for the use of a pair of folded or bent implementation of power receiving coils. FIG. 8C depicts an example of a rectangular coil in which approximately half of the overall length of the conductor therein extends in one plane while the other approximately half of the overall length extends in another plane, and in which the two planes intersect at an angle that effectively defines a fold-like structure that extends approximately through the middle of the coil.

As earlier discussed, a significant portion of the oscillating electromagnetic field that is present during operation of a planar coil flows in a direction that is perpendicular to the plane of the coil. However, where the coil is such a folded or bent coil as depicted in FIG. 8C, there may arise two different perpendicular directions along which two separate significant portions of the oscillating electromagnetic field may flow through the coil. This is depicted in FIG. 8D as direction A and direction B. More precisely, FIG. 8D depicts one of the power transmitting coils 241 or 341 being operated to wirelessly provide electric power to a corresponding one of the power receiving coils 142 or 143. In recognition of the perpendicular geometry of each of these two directions A and B, and in an effort to increase the efficiency of the provision of electric power, the power receiving coil 142 or 143 has been selected to have a pair of planes that meet at an angle identical to the angle at which the two planes of the power transmitting coil 241 or 341 meet. Additionally, the power receiving coil 142 or 143 has been oriented relative to the power transmission coil 241 or 341 in a manner that causes the two planes of power receiving coil 142 or 143 to extend in parallel with the two corresponding planes of the power transmitting coil 241 or 341.

As will also be familiar to those skilled in the art, the strength of a magnetic field varies in relation to distance from its source. Thus, where a receiving coil is positioned closer to a transmitting coil, the magnetic field of the transmitting coil will be stronger at the location of the receiving coil, thereby allowing a greater amount of electric power to be conveyed therebetween. As a result, the amount of electric power that is able to be conveyed from a transmitting coil to a receiving coil can be adversely affected by improper or imprecise position of that receiving coil relative to that transmitting coil such that a greater distance is caused to be placed therebetween. Such adverse affects can be compensated for by positioning a pair of receiving coils adjacent opposite external surfaces of a portion of the reader 100 to interact with a corresponding pair of transmitting coils of either the presentation base 200 or the charging cradle 300 that are positioned to parallel the receiving coils, as depicted and discussed in reference to FIGS. 4E-F, 5E-G and 6C.

More specifically, and referring to either FIG. 5E or 6C as a specific example, if the elongate handle 102 of the reader 100 is positioned within the upper portion 201 of the presentation base 200 in a manner that causes one of the handle receiving coils 142 to be further away from its corresponding one of the base transmitting coils 241, the fact that the pair of handle receiving coils 142 are positioned adjacent opposite sides of the elongate handle 102 results in the other one of the handle receiving coils 142 to be closer to its corresponding one of the base transmitting coils 241. As a result, while one of the handle receiving coils 142 is exposed to a somewhat weaker magnetic field due to the greater distance from its corresponding one of the base transmitting coils 241, the other of the receiving coils 142 is exposed to a somewhat stronger magnetic field due to the less distance from its corresponding one of the base transmitting coils 241. In this way, the reduction in ability to transmit electric power through the weaker magnetic field between one paired set of the handle receiving coil 142 and base transmitting coil 241 may be at least partially compensated for by the increase in ability to transmit electric power through the stronger magnetic field between the other paired set of the handle receiving coil 142 and base transmitting coil 241.

Turning to FIG. 8E, as was discussed in reference to FIGS. 4G and 5F, some symmetrical pairs of locations within the casing of the reader 100 may be appropriate for the use of a pair of curved implementation of power receiving coils. Again, a significant portion of the oscillating electromagnetic field that is present during operation of a planar coil flows in a direction that is perpendicular to the plane of the coil. Again, the strength of a magnetic field varies in relation to distance from its source. Thus, again, the curves of a matched pair of transmitting and receiving coils may be selected and/or oriented relative to each other so as to cause one to follow the other such that the normal distance therebetween remains at least relatively constant across the entirety of the portions of each that directly face the other.

There is thus disclosed a reader to capture encoded data. A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle; a second handle receiving coil disposed at the second end, and oriented parallel to a second side of the elongate handle that is opposite the first side of the elongate handle; and a battery to provide electric power to the processor and the optical sensor, and configured to be recharged via the first and second handle receiving coils.

The second end of the elongate handle may be configured to be releasably connected to a presentation base. The presentation base may be configured to support the reader atop a support surface in a presentation scanning mode that orients the optical sensor to capture the indicia on an object also supported atop the support surface. The presentation base may include a first base transmitting coil configured to be oriented parallel to the first handle receiving coil and to transmit electric power to the first handle receiving coil when the presentation base is releasably connected to the second end of the elongate handle, and a second base transmitting coil configured to be oriented parallel to the second handle receiving coil and to transmit electric power to the second handle receiving coil when the presentation base is releasably connected to the second end of the elongate handle.

The presentation base may include a first lower base electrical connector that is configured to convey, to the first and second base transmitting coils, the electric power transmitted by the first and second base transmitting coils to the first and second handle receiving coils, respectively.

The presentation base may include a base receiving coil configured to receive electric power wirelessly transmitted to the presentation base by a pad transmitting coil of a charging pad and to convey the wirelessly received electric power to the first and second base transmitting coils to be transmitted to the first and second handle receiving coils, respectively, when the presentation base is supported atop the charging pad as the support surface in the presentation mode.

The first and second handle receiving coils may be carried on opposite sides of the battery.

The reader may further include a head receiving coil disposed in the scanning head to wirelessly receive electric power transmitted by a cradle transmitting coil of a charging cradle when the scanning head is received in the charging cradle, and the battery may be further configured to be recharged by via the head receiving coil.

The second end of the elongate handle may be configured to be releasably connected to a presentation base, and the presentation base may be configured to engage a support surface atop which the charging cradle is also supported to orient the head receiving coil into parallel alignment with the cradle transmitting coil to enable charging of the battery via the cradle transmitting coil.

The reader may further include a data transmitter operable by the processor to wirelessly transmit the decoded data to a point-of-sale device, wherein the battery is configured to provide electric power to the data transmitter.

The reader may further include a radio frequency identification (RFID) sensor to capture wirelessly transmitted data from a RFID tag.

A scanning system may include a reader, a charging cradle and a presentation base. The reader may include a scanning head that includes a head receiving coil, an optical sensor to capture an indicia that encodes data, and a processor to interpret the indicia to decode the data. The reader may also include an elongate handle connected at a first end to the scanning head and graspable to orient the optical sensor toward the indicia. The elongate handle may include a handle electrical connector disposed at a second end of the elongate handle opposite the first end, and a first battery to provide electric power to the processor and the optical sensor, wherein the first battery may be configured to be recharged via the head receiving coil or the handle electrical connector. The charging cradle may be configured to receive the scanning head, and may include a cradle transmitting coil configured to wirelessly transmit electric power to the head receiving coil when the scanning head is received in the charging cradle, and a cradle electrical connector to receive the electric power transmitted by the cradle transmitting coil. The presentation base may be configured to be releasably connected to the second end of the elongate handle. When the base is connected to the second end, the presentation base may be configured to support the reader atop a first support surface in a presentation scanning mode, and the presentation base may be configured to engage a second support surface atop which the charging cradle is also supported to orient the head receiving coil into parallel alignment with the cradle transmitting coil to enable charging of the first battery via the cradle transmitting coil.

The scanning head may further include a data transmitter operable by the processor to wirelessly transmit the decoded data to a point-of-sale device, and the first battery may be configured to provide electric power to the data transmitter.

The processor may be configured to transmit the decoded data to a point-of-sale device through the handle electrical connector.

The scanning head may further include a radio frequency identification (RFID) sensor to capture wirelessly transmitted data from a RFID tag.

The presentation base may be configured to support the reader in the presentation scanning mode with the elongate handle oriented to extend within less than 30 degrees of a vertical orientation, and with the optical sensor oriented to capture the indicia on an object also supported atop the first support surface.

The presentation base may include an upper base electrical connector configured to mate with the handle electrical connector when the presentation base is releasably connected to the second end of the elongate handle, and a second battery to provide electric power to the reader through the handle electrical connector and the upper base electrical connector when the handle electrical connector and the upper base electrical connector are mated.

The presentation base may include a an upper base electrical connector configured to mate with the handle electrical connector when the presentation base is releasably connected to the second end of the elongate handle, and a lower base electrical connector that is electrically connected to the upper base electrical connector and is configured to convey electric power received at the lower base electrical connector to the reader through the handle electrical connector and the upper base electrical connector when the handle electrical connector and the upper base electrical connector are mated.

The presentation base may include a an upper base electrical connector configured to mate with the handle electrical connector when the presentation base is releasably connected to the second end of the elongate handle. The presentation base may further include a base receiving coil configured to receive electric power wirelessly transmitted to the presentation base by a pad transmitting coil of a charging pad when the presentation base is supported atop the charging pad as the first support surface in the presentation mode, and configured to convey the wirelessly received electric power to the reader through the handle electrical connector and the upper base electrical connector when the handle electrical connector and the upper base electrical connector are mated.

The elongate handle may include a first handle receiving coil toward the second end of the elongate handle, and oriented parallel to a first side of the elongate handle. The first battery may be further configured to be recharged via the first handle receiving coil. The presentation base may include a first base transmitting coil configured to be oriented parallel to the first handle receiving coil and to transmit electric power to the first handle receiving coil when the presentation base is releasably connected to the second end of the elongate handle.

The elongate handle may include a second handle receiving coil toward the second end of the elongate handle, and oriented parallel to a second side of the elongate handle that is opposite the first side of the elongate handle. The first battery may be further configured to be recharged via the second handle receiving coil. The presentation base may include a second base transmitting coil configured to be oriented parallel to the second handle receiving coil and to transmit electric power to the second handle receiving coil when the presentation base is releasably connected to the second end of the elongate handle.

The presentation base may include a base receiving coil configured to receive electric power wirelessly transmitted to the presentation base by a pad transmitting coil of a charging pad when the presentation base is supported atop the charging pad as the first support surface in the presentation mode, and configured to convey the wirelessly received electric power to the reader through the first base transmitting coil when the presentation base is releasably connected to the second end of the elongate handle.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first side that extends at least partially between the first end and a second end of the handle that is opposite the first end, and that has a first tangent plane that extends tangent to the first side; a second side that extends at least partially between the first and second ends, that is distinct from the first side, and that has a second tangent plane that extends tangent to the second side; a first handle receiving coil, wherein at least a portion of the first handle receiving coil is configured to extend in a third plane parallel to the first tangent plane; a second handle receiving coil, wherein at least a portion of the second handle receiving coil is configured to extend in a fourth plane parallel to the second tangent plane; a battery to provide electric power to the processor and the optical sensor; and a handle power receiving circuit coupled to the first and second handle receiving coils in series, and configured to operate the first and second handle receiving coils together to wirelessly receive electric power to charge the battery.

The first side may be opposite the second side.

At least one of the first handle receiving coil and the second handle receiving coil may extend within a curved plane.

The second end may be configured to be releasably connected to a base. The base may include a first base transmitting coil, wherein at least a portion of the first base transmitting coil is configured to extend parallel to the third plane when the base is releasably connected to the second end of the elongate handle; a second base transmitting coil, wherein at least a portion of the second base transmitting coil is configured to extend parallel to the fourth plane when the base is releasably connected to the second end of the elongate handle; and a base power transmitting circuit coupled to the first and second base transmitting coils in series, and configured to operate the first and second base transmitting coils to transmit electric power to the first and second handle receiving coils, respectively, when the base is releasably connected to the second end of the elongate handle.

Another portion of the first handle receiving coil may be configured to extend in a fifth plane that intersects the third plane at an angle, and another portion of the second handle receiving coil may be configured to extend in a sixth plane that intersects the fourth plane at an angle.

Another portion of the first base transmitting coil may be configured to extend parallel to the fifth plane when the base is releasably connected to the second end of the elongate handle, and another portion of the second base transmitting coil may be configured to extend parallel to the sixth plane when the base is releasably connected to the second end of the elongate handle.

The base may include a lower base electrical connector that is configured to convey, to the base power transmitting circuit, the electric power transmitted by the first and second base transmitting coils to the first and second handle receiving coils, respectively.

The base may include a presentation base that is configured to support the reader atop a support surface in a presentation scanning mode that orients the optical sensor to capture the indicia on an object.

The base may include a base receiving coil; and a base power receiving circuit configured to operate the base receiving coil to receive electric power wirelessly transmitted to the base from a charging pad, and to convey the wirelessly received electric power to the base power transmitting circuit.

The charging pad may include a pad transmitting coil; a pad power transmitting circuit configured to operate the pad transmitting coil to wirelessly transmit electric power to the base receiving coil when the base is supported atop the charging pad as the support surface; and a pad electrical connector configured to convey, to the pad power transmitting circuit, the electric power wirelessly transmitted by the pad transmitting coil.

The reader may further include a data transmitter operable by the processor to wirelessly transmit the decoded data to a point-of-sale device, wherein the battery is configured to provide electric power to the data transmitter.

The reader may further include a radio frequency identification (RFID) sensor to capture wirelessly transmitted data from a RFID tag.

A scanning system may include a reader and a base. The reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil, wherein at least a portion of the first handle receiving coil is configured to extend at least partially in a third plane; a second handle receiving coil, wherein at least a portion of the second handle receiving coil is configured to extend at least partially in a fourth plane; a battery to provide electric power to the processor and the optical sensor; and a handle power receiving circuit coupled to the first and second handle receiving coils in series, and configured to operate the first and second handle receiving coils together to wirelessly receive electric power to charge the battery. The base may be configured to be releasably connected to a second end of the elongate handle opposite the first end. The base may include a first base transmitting coil configured to extend at least partially in parallel to the third plane when the base is releasably connected to the second end of the elongate handle; a second base transmitting coil configured to extend at least partially in parallel to the fourth plane when the base is releasably connected to the second end of the elongate handle; and a base power transmitting circuit coupled to the first and second base transmitting coils in series, and configured to operate the first and second base transmitting coils to transmit electric power to the first and second handle receiving coils, respectively, when the base is releasably connected to the second end of the elongate handle.

The first handle receiving coil may be disposed at the second end of the elongate handle, and may be oriented to extend at least partially in parallel to a first tangent plane of a first side of the elongate handle. The second handle receiving coil may be disposed at the second end of the elongate handle, and may be oriented to extend at least partially in parallel to a second tangent plane of a second side of the elongate handle. The second side may be distinct from the first side.

Another portion of the first handle receiving coil may be configured to extend in a fifth plane that intersects the third plane at an angle, and another portion of the second handle receiving coil may be configured to extend in a sixth plane that intersects the fourth plane at an angle.

Another portion of the first base transmitting coil may be configured to extend parallel to the fifth plane when the base is releasably connected to the second end of the elongate handle, and another portion of the second base transmitting coil may be configured to extend parallel to the sixth plane when the base is releasably connected to the second end of the elongate handle.

The base may include a presentation base that is configured to support the reader atop a support surface in a presentation scanning mode that orients the optical sensor to capture the indicia on an object. The base may further include a base receiving coil, and a base power receiving circuit configured to operate the base receiving coil to receive electric power wirelessly transmitted to the base, and to convey the wirelessly received electric power to the base power transmitting circuit. A charging pad may be configured to serve as the support surface. The charging pad may include a pad transmitting coil; a pad power transmitting circuit configured to operate the pad transmitting coil to wirelessly transmit electric power to the base receiving coil when the base is supported atop the charging pad; and a pad electrical connector configured to convey, to the pad power transmitting circuit, the electric power wirelessly transmitted by the pad transmitting coil.

The base receiving coil may be configured to extend parallel to a bottom surface of the base, and the pad transmitting coil may be configured to extend parallel to the base receiving coil when the base is supported atop the charging pad.

The handle power receiving circuit may be configured to support a single receiving coil having an inductance that falls within a predetermined range of inductances, and a sum of the inductances of the first and second handle receiving coils may falls within the predetermined range.

Each of the first and second handle receiving coils may include a quantity of turns of a conductor, a dimension of the conductor, and a quantity of layers of the conductor selected to enable the sum of the inductances of the first and second handle receiving coils to fall within the predetermined range; and the dimension of the conductor may be selected from a group consisting of a diameter of the conductor and a thickness of the conductor.

The quantity of turns of the conductor, the dimension of the conductor and the quantity of layers of the conductor of each of the first and second handle receiving coils may be derived based, at least in part, on the sum of the inductances of the first and second handle receiving coils and a dimension of each of the first and second handle receiving coils; and the dimension of each of the first and second handle receiving coils may be selected from a group consisting of a diameter, a width and a thickness.

The dimension of the first handle receiving coil may be at least partially based on a limitation of available space, within the elongate handle, between the battery and a first side of the elongate handle; and the dimension of the second handle receiving coil may be at least partially based on a limitation of available space, within the elongate handle, between the battery and a second side of the elongate handle opposite the first side.

The predetermined range of inductances may conform to the Qi wireless power standard promulgated by the Wireless Power Consortium of Piscataway, N.J., USA.

The base power transmitting circuit may be configured to support a single transmitting coil having an inductance that falls within a predetermined range of inductances, and a sum of the inductances of the first and second base transmitting coils may fall within the predetermined range.

Each of the first and second base transmitting coils may include a quantity of turns of a conductor, a dimension of the conductor, and a quantity of layers of the conductor selected to enable the sum of the inductances of the first and second base transmitting coils to fall within the predetermined range; and the dimension of the conductor may be selected from a group consisting of a diameter of the conductor and a thickness of the conductor.

The quantity of turns of the conductor, the dimension of the conductor and the quantity of layers of the conductor of each of the first and second base transmitting coils may be derived based, at least in part, on the sum of the inductances of the first and second base transmitting coils and a dimension of each of the first and second base transmitting coils; and the dimension of each of the first and second base transmitting coils may be selected from a group consisting of a diameter, a width and a thickness.

The dimension of the first base transmitting coil may be at least partially based on a limitation of available space within a first portion of the base that extends alongside a first side of the elongate handle when the base is releasably connected to the second end of the elongate handle; and the dimension of the second base transmitting coil may be at least partially based on a limitation of available space within a second portion of the base that extends alongside a second side of the elongate handle that is opposite the first side when the base is releasably connected to the second end of the elongate handle.

The predetermined range of inductances may conform to the Qi wireless power standard promulgated by the Wireless Power Consortium of Piscataway, N.J., USA.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. A selected one of the scanning head and the elongate handle may include a first receiving coil; a second receiving coil; a battery to provide electric power to the processor and the optical sensor; and a power receiving circuit coupled to the first and second receiving coils in series, and configured to operate the first and second receiving coils together to wirelessly receive electric power to charge the battery.

The first and second receiving coils may not be magnetically coupled.

The selected one of the scanning head and the elongate handle may include the elongate handle. A second end of the elongate handle that is opposite the first end may be configured to be releasably connected to a presentation base configured to support the reader atop a support surface. At least a portion of the first receiving coil may be configured to extend at least partially in a third plane. At least a portion of the second receiving coil may be configured to extend at least partially in a fourth plane. The presentation base may include a first base transmitting coil, wherein at least a portion of the first base transmitting coil is configured to extend parallel to the third plane when the presentation base is releasably connected to the second end of the elongate handle; a second base transmitting coil, wherein at least a portion of the second base transmitting coil is configured to extend parallel to the fourth plane when the presentation base is releasably connected to the second end of the elongate handle; and a base power transmitting circuit coupled to the first and second base transmitting coils in series, and configured to operate the first and second base transmitting coils to transmit electric power to the first and second receiving coils, respectively, when the presentation base is releasably connected to the second end of the elongate handle.

The battery may be configured to be inserted into the handle, and the first and second receiving coils may be carried on opposite sides of the battery.

Another portion of the first receiving coil may be configured to extend in a fifth plane that intersects the third plane at an angle, and another portion of the second receiving coil is configured to extend in a sixth plane that intersects the fourth plane at an angle.

Another portion of the first base transmitting coil may be configured to extend parallel to the fifth plane when the presentation base is releasably connected to the second end of the elongate handle, and another portion of the second base transmitting coil may be configured to extend parallel to the sixth plane when the presentation base is releasably connected to the second end of the elongate handle.

The presentation base may include a base receiving coil; and a base power receiving circuit configured to operate the base receiving coil to receive electric power wirelessly transmitted to the presentation base from a charging pad, and to convey the wirelessly received electric power to the base power transmitting circuit.

The charging pad may include a pad transmitting coil; a pad power transmitting circuit configured to operate the pad transmitting coil to wirelessly transmit electric power to the base receiving coil when the presentation base is supported atop the charging pad as the support surface; and a pad electrical connector configured to convey, to the pad power transmitting circuit, the electric power wirelessly transmitted by the pad transmitting coil.

The selected one of the scanning head and the elongate handle may include the scanning head. The scanning head may be configured to be received within a charging cradle. At least a portion of the first receiving coil may be configured to extend at least partially in a third plane. At least a portion of the second receiving coil may be configured to extend at least partially in a fourth plane. The charging cradle may include a first cradle transmitting coil, wherein at least a portion of the first cradle transmitting coil is configured to extend parallel to the third plane when the scanning head is received in the charging cradle; a second cradle transmitting coil, wherein at least a portion of the second cradle transmitting coil is configured to extend parallel to the fourth plane when the scanning head is received in the charging cradle; and a cradle power transmitting circuit coupled to the first and second cradle transmitting coils in series, and configured to operate the first and second cradle transmitting coils to transmit electric power to the first and second receiving coils, respectively, when the scanning head is received in the charging cradle.

Another portion of the first receiving coil may be configured to extend in a fifth plane that intersects the third plane at an angle, and another portion of the second receiving coil may be configured to extend in a sixth plane that intersects the fourth plane at an angle.

Another portion of the first cradle transmitting coil may be configured to extend parallel to the fifth plane when the scanning head is received in the charging cradle, and another portion of the second cradle transmitting coil may be configured to extend parallel to the sixth plane when the scanning head is received in the charging cradle.

A second end of the elongate handle opposite the first end may be configured to be releasably connected to a presentation base; and the presentation base may be configured to engage a support surface atop which the charging cradle is also supported to orient the first receiving coil into parallel alignment with the first cradle transmitting coil and to orient the second receiving coil into parallel alignment with the second cradle transmitting coil to enable charging of the battery via the first and second cradle transmitting coils.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a first handle receiving coil disposed at a second end of the elongate handle opposite the first end, and oriented parallel to a first side of the elongate handle; a second handle receiving coil disposed at the second end, and oriented parallel to a second side of the elongate handle that is opposite the first side of the elongate handle; and a battery to provide electric power to the processor and the optical sensor, and configured to be recharged via the first and second handle receiving coils. The second end may be configured to be releasably connected to a presentation base. The presentation base may include a first base transmitting coil configured to be oriented parallel to the first handle receiving coil and to transmit electric power to the first handle receiving coil when the presentation base is releasably connected to the second end of the elongate handle; and a second base transmitting coil configured to be oriented parallel to the second handle receiving coil and to transmit electric power to the second handle receiving coil when the presentation base is releasably connected to the second end of the elongate handle.

The presentation base may be configured to support the reader atop a support surface in a presentation scanning mode that orients the optical sensor to capture the indicia on an object.

The presentation base may include a lower base electrical connector that is configured to convey, to the first and second base transmitting coils, the electric power transmitted by the first and second base transmitting coils to the first and second handle receiving coils, respectively.

The presentation base may include a base receiving coil configured to receive electric power wirelessly transmitted to the presentation base by a pad transmitting coil of a charging pad and to convey the wirelessly received electric power to the first and second base transmitting coils to be transmitted to the first and second handle receiving coils, respectively, when the presentation base is supported atop the charging pad as the support surface in the presentation mode.

The charging pad may include a pad electrical connector that is configured to convey, to the pad transmitting coil, the electric power transmitted by the pad transmitting coil to the base receiving coil.

The first and second handle receiving coils may be carried on opposite sides of the battery.

The reader may further include a head receiving coil disposed in the scanning head to wirelessly receive electric power transmitted by a cradle transmitting coil of a charging cradle when the scanning head is received in the charging cradle, wherein the battery is further configured to be recharged via the head receiving coil.

The presentation base may be configured to engage a support surface atop which the charging cradle is also supported to orient the head receiving coil into parallel alignment with the cradle transmitting coil to enable charging of the battery via the cradle transmitting coil.

The reader may further include a data transmitter operable by the processor to wirelessly transmit the decoded data to a point-of-sale device, wherein the battery is configured to provide electric power to the data transmitter.

The reader may further include a radio frequency identification (RFID) sensor to capture wirelessly transmitted data from a RFID tag.

A reader may include a scanning head that includes an optical sensor to capture an indicia that encodes data and a processor to interpret the indicia to decode the data, and an elongate handle connected at a first end to the scanning head and graspable to orient the optical sensor toward the indicia. The elongate handle may include a battery to provide electric power to the processor and the optical sensor. The scanning head may include a first side that has a first tangent plane that extends tangent to the first side; a second side that is distinct from the first side, and that has a second tangent plane that extends tangent to the second side; a first head receiving coil, wherein at least a portion of the first head receiving coil is configured to extend in a third plane parallel to the first tangent plane; a second head receiving coil, wherein at least a portion of the second head receiving coil is configured to extend in a fourth plane parallel to the second tangent plane; and a handle power receiving circuit coupled to the first and second head receiving coils in series, and configured to operate the first and second head receiving coils together to wirelessly receive electric power to charge the battery.

The first side may be opposite the second side.

At least one of the first head receiving coil and the second head receiving coil may extend within a curved plane.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A reader comprising:
   a scanning head that comprises an optical sensor to capture an indicia that encodes data and a processor to interpret the indicia to decode the data; and
   an elongate handle connected at a first end to the scanning head and graspable to orient the optical sensor toward the indicia, wherein the elongate handle comprises:
      a first side that extends at least partially between the first end and a second end of the handle that is opposite the first end, and that has a first tangent plane that extends tangent to the first side;
      a second side that extends at least partially between the first and second ends, that is distinct from the first side, and that has a second tangent plane that extends tangent to the second side;
      a first handle receiving coil, wherein at least a portion of the first handle receiving coil is configured to extend in a third plane parallel to the first tangent plane;
      a second handle receiving coil, wherein at least a portion of the second handle receiving coil is configured to extend in a fourth plane parallel to the second tangent plane;
      a battery to provide electric power to the processor and the optical sensor; and
      a handle power receiving circuit coupled to the first and second handle receiving coils in series, and configured to operate the first and second handle receiving coils together to wirelessly receive electric power to charge the battery.

2. The reader of claim 1, wherein the first side is opposite the second side.

3. The reader of claim 1, wherein at least one of the first handle receiving coil and the second handle receiving coil extends within a curved plane.

4. The reader of claim 1, further comprising a data transmitter operable by the processor to wirelessly transmit the decoded data to a point-of-sale device, wherein the battery is configured to provide electric power to the data transmitter.

5. The reader of claim 1, further comprising a radio frequency identification (RFID) sensor to capture wirelessly transmitted data from a RFID tag.

6. A scanning system comprising:
   a reader comprising:
      a scanning head that comprises an optical sensor to capture an indicia that encodes data and a processor to interpret the indicia to decode the data; and
      an elongate handle connected at a first end to the scanning head and graspable to orient the optical sensor toward the indicia, wherein the elongate handle comprises:
         a first handle receiving coil, wherein at least a portion of the first handle receiving coil is configured to extend at least partially in a first plane;
         a second handle receiving coil, wherein at least a portion of the second handle receiving coil is configured to extend at least partially in a second plane;
         a battery to provide electric power to the processor and the optical sensor; and
         a handle power receiving circuit coupled to the first and second handle receiving coils in series, and configured to operate the first and second handle receiving coils together to wirelessly receive electric power to charge the battery; and
a base configured to be releasably connected to a second end of the elongate handle opposite the first end, wherein the base comprises:
- a first base transmitting coil configured to extend at least partially in parallel to the first plane when the base is releasably connected to the second end of the elongate handle;
- a second base transmitting coil configured to extend at least partially in parallel to the second plane when the base is releasably connected to the second end of the elongate handle; and
- a base power transmitting circuit coupled to the first and second base transmitting coils in series, and configured to operate the first and second base transmitting coils to transmit electric power to the first and second handle receiving coils, respectively, when the base is releasably connected to the second end of the elongate handle.

7. The scanning system of claim 6, wherein:
another portion of the first handle receiving coil is configured to extend in a third plane that intersects the first plane at an angle; and
another portion of the second handle receiving coil is configured to extend in a fourth plane that intersects the second plane at an angle.

8. The scanning system of claim 7, wherein:
another portion of the first base transmitting coil is configured to extend parallel to the third plane when the base is releasably connected to the second end of the elongate handle; and
another portion of the second base transmitting coil is configured to extend parallel to the fourth plane when the base is releasably connected to the second end of the elongate handle.

9. The scanning system of claim 6, wherein:
the base comprises a presentation base that is configured to support the reader atop a support surface in a presentation scanning mode that orients the optical sensor to capture the indicia on an object;
the base further comprises:
- a base receiving coil; and
- a base power receiving circuit configured to operate the base receiving coil to receive electric power wirelessly transmitted to the base, and to convey the wirelessly received electric power to the base power transmitting circuit;
a charging pad is configured to serve as the support surface; and
the charging pad comprises:
- a pad transmitting coil;
- a pad power transmitting circuit configured to operate the pad transmitting coil to wirelessly transmit electric power to the base receiving coil when the base is supported atop the charging pad; and
- a pad electrical connector configured to convey, to the pad power transmitting circuit, the electric power wirelessly transmitted by the pad transmitting coil.

10. The scanning system of claim 9, wherein:
the base receiving coil is configured to extend parallel to a bottom surface of the base; and
the pad transmitting coil is configured to extend parallel to the base receiving coil when the base is supported atop the charging pad.

11. The scanning system of claim 6, wherein:
the handle power receiving circuit is configured to support being coupled to a single receiving coil having an inductance that falls within a predetermined range of inductances; and
the first and second handle receiving coils are selected to cause a sum of the inductances of the first and second handle receiving coils to fall within the predetermined range to enable the handle power receiving circuit to be coupled to the first and second handle receiving coils, instead of being coupled to the single receiving coil.

12. The scanning system of claim 11, wherein:
each of the first and second handle receiving coils comprises a quantity of turns of a conductor, a dimension of the conductor, and a quantity of layers of the conductor selected to enable the sum of the inductances of the first and second handle receiving coils to fall within the predetermined range; and
the dimension of the conductor is selected from a group consisting of a diameter of the conductor and a thickness of the conductor.

13. The scanning system of claim 12, wherein:
the quantity of turns of the conductor, the dimension of the conductor and the quantity of layers of the conductor of each of the first and second handle receiving coils are derived based, at least in part, on the sum of the inductances of the first and second handle receiving coils and a dimension of each of the first and second handle receiving coils; and
the dimension of each of the first and second handle receiving coils is selected from a group consisting of a diameter, a width and a thickness.

14. The scanning system of claim 13, wherein:
the dimension of the first handle receiving coil is at least partially based on a limitation of available space, within the elongate handle, between the battery and a first side of the elongate handle; and
the dimension of the second handle receiving coil is at least partially based on a limitation of available space, within the elongate handle, between the battery and a second side of the elongate handle opposite the first side.

15. The scanning system of claim 6, wherein:
the base power transmitting circuit is configured to support being coupled to a single transmitting coil having an inductance that falls within a predetermined range of inductances; and
the first and second base transmitting coils are selected to cause a sum of the inductances of the first and second base transmitting coils to fall within the predetermined range to enable the base power transmitting circuit to be coupled to the first and second base transmitting coils, instead of being coupled to the single transmitting coil.

16. The scanning system of claim 15, wherein:
each of the first and second base transmitting coils comprises a quantity of turns of a conductor, a dimension of the conductor, and a quantity of layers of the conductor selected to enable the sum of the inductances of the first and second base transmitting coils to fall within the predetermined range; and
the dimension of the conductor is selected from a group consisting of a diameter of the conductor and a thickness of the conductor.

17. The scanning system of claim 16, wherein:
the quantity of turns of the conductor, the dimension of the conductor and the quantity of layers of the conductor of each of the first and second base transmitting coils are derived based, at least in part, on the sum of the inductances of the first and second base transmitting coils and a dimension of each of the first and second base transmitting coils; and the dimension of each of the first and second base transmitting coils is selected from a group consisting of a diameter, a width and a thickness.

18. The scanning system of claim 17, wherein:

the dimension of the first base transmitting coil is at least partially based on a limitation of available space within a first portion of the base that extends alongside a first side of the elongate handle when the base is releasably connected to the second end of the elongate handle; and the dimension of the second base transmitting coil is at least partially based on a limitation of available space within a second portion of the base that extends alongside a second side of the elongate handle that is opposite the first side when the base is releasably connected to the second end of the elongate handle.

19. A reader comprising:

a scanning head that comprises an optical sensor to capture an indicia that encodes data and a processor to interpret the indicia to decode the data; and an elongate handle connected at a first end to the scanning head and graspable to orient the optical sensor toward the indicia, wherein a selected one of the scanning head and the elongate handle comprises:
  a first receiving coil;
  a second receiving coil;
  a battery to provide electric power to the processor and the optical sensor; and
  a power receiving circuit coupled to the first and second receiving coils in series, and configured to operate the first and second receiving coils together to wirelessly receive electric power to charge the battery, wherein:
    the selected one of the scanning head and the elongate handle comprises the elongate handle;
    a second end of the elongate handle that is opposite the first end is configured to be releasably connected to a presentation base configured to support the reader atop a support surface;
    at least a portion of the first receiving coil is configured to extend at least partially in a first plane;
    at least a portion of the second receiving coil is configured to extend at least partially in a second plane; and
    the presentation base comprises:
      a first base transmitting coil, wherein at least a portion of the first base transmitting coil is configured to extend parallel to the first plane when the presentation base is releasably connected to the second end of the elongate handle;
      a second base transmitting coil, wherein at least a portion of the second base transmitting coil is configured to extend parallel to the second plane when the presentation base is releasably connected to the second end of the elongate handle; and
      a base power transmitting circuit coupled to the first and second base transmitting coils in series, and configured to operate the first and second base transmitting coils to transmit electric power to the first and second receiving coils, respectively, when the presentation base is releasably connected to the second end of the elongate handle.

20. The reader of claim 19, wherein:

the battery is configured to be inserted into the handle; and the first and second receiving coils are carried on opposite sides of the battery.

21. A reader comprising:

a scanning head that comprises an optical sensor to capture an indicia that encodes data and a processor to interpret the indicia to decode the data; and an elongate handle connected at a first end to the scanning head and graspable to orient the optical sensor toward the indicia, wherein a selected one of the scanning head and the elongate handle comprises:
  a first receiving coil;
  a second receiving coil;
  a battery to provide electric power to the processor and the optical sensor; and
  a power receiving circuit coupled to the first and second receiving coils in series, and configured to operate the first and second receiving coils together to wirelessly receive electric power to charge the battery, wherein:
    the selected one of the scanning head and the elongate handle comprises the scanning head;
    the scanning head is configured to be received within a charging cradle;
    at least a portion of the first receiving coil is configured to extend at least partially in a first plane;
    at least a portion of the second receiving coil is configured to extend at least partially in a second plane; and
    the charging cradle comprises:
      a first cradle transmitting coil, wherein at least a portion of the first cradle transmitting coil is configured to extend parallel to the first plane when the scanning head is received in the charging cradle;
      a second cradle transmitting coil, wherein at least a portion of the second cradle transmitting coil is configured to extend parallel to the second plane when the scanning head is received in the charging cradle; and
      a cradle power transmitting circuit coupled to the first and second cradle transmitting coils in series, and configured to operate the first and second cradle transmitting coils to transmit electric power to the first and second receiving coils, respectively, when the scanning head is received in the charging cradle.

22. The reader of claim 21, wherein:

another portion of the first receiving coil is configured to extend in a third plane that intersects the first plane at an angle; and another portion of the second receiving coil is configured to extend in a fourth plane that intersects the second plane at an angle.

23. The reader of claim 22, wherein:

another portion of the first cradle transmitting coil is configured to extend parallel to the third plane when the scanning head is received in the charging cradle; and another portion of the second cradle transmitting coil is configured to extend parallel to the fourth plane when the scanning head is received in the charging cradle.

24. The reader of claim 21, wherein:
a second end of the elongate handle opposite the first end is configured to be releasably connected to a presentation base; and
the presentation base is configured to engage a support surface atop which the charging cradle is also supported to orient the first receiving coil into parallel alignment with the first cradle transmitting coil and to orient the second receiving coil into parallel alignment with the second cradle transmitting coil to enable charging of the battery via the first and second cradle transmitting coils.

25. A reader comprising:
a scanning head that comprises an optical sensor to capture an indicia that encodes data and a processor to interpret the indicia to decode the data; and
an elongate handle connected at a first end to the scanning head and graspable to orient the optical sensor toward the indicia, wherein:
the elongate handle comprises:
a first handle receiving coil disposed at a second end of the elongate handle opposite the first end, and oriented parallel to a first side of the elongate handle;
a second handle receiving coil disposed at the second end, and oriented parallel to a second side of the elongate handle that is opposite the first side of the elongate handle; and
a battery to provide electric power to the processor and the optical sensor, and configured to be recharged via the first and second handle receiving coils; and
the second end is configured to be releasably connected to a presentation base that comprises:
a first base transmitting coil configured to be oriented parallel to the first handle receiving coil and to transmit electric power to the first handle receiving coil when the presentation base is releasably connected to the second end of the elongate handle; and
a second base transmitting coil configured to be oriented parallel to the second handle receiving coil and to transmit electric power to the second handle receiving coil when the presentation base is releasably connected to the second end of the elongate handle.

26. The reader of claim 25, wherein the presentation base is configured to support the reader atop a support surface in a presentation scanning mode that orients the optical sensor to capture the indicia on an object.

27. The reader of claim 26, wherein the presentation base comprises a lower base electrical connector that is configured to convey, to the first and second base transmitting coils, the electric power transmitted by the first and second base transmitting coils to the first and second handle receiving coils, respectively.

28. The reader of claim 25, further comprising a head receiving coil disposed in the scanning head to wirelessly receive electric power transmitted by a cradle transmitting coil of a charging cradle when the scanning head is received in the charging cradle, wherein the battery is further configured to be recharged via the head receiving coil.

29. A reader comprising:
a scanning head that comprises an optical sensor to capture an indicia that encodes data and a processor to interpret the indicia to decode the data; and
an elongate handle connected at a first end to the scanning head and graspable to orient the optical sensor toward the indicia, wherein:
the elongate handle comprises a battery to provide electric power to the processor and the optical sensor; and
the scanning head comprises:
a first side that has a first tangent plane that extends tangent to the first side;
a second side that is distinct from the first side, and that has a second tangent plane that extends tangent to the second side;
a first head receiving coil, wherein at least a portion of the first head receiving coil is configured to extend in a third plane parallel to the first tangent plane;
a second head receiving coil, wherein at least a portion of the second head receiving coil is configured to extend in a fourth plane parallel to the second tangent plane; and
a handle power receiving circuit coupled to the first and second head receiving coils in series, and configured to operate the first and second head receiving coils together to wirelessly receive electric power to charge the battery.

* * * * *